US009912554B2

(12) United States Patent
Kirner et al.

(10) Patent No.: US 9,912,554 B2
(45) Date of Patent: *Mar. 6, 2018

(54) END-TO-END POLICY ENFORCEMENT IN THE PRESENCE OF A TRAFFIC MIDPOINT DEVICE

(71) Applicant: Illumio, Inc., Sunnyvale, CA (US)

(72) Inventors: Paul J. Kirner, Palo Alto, CA (US); Hai Xiao, Fremont, CA (US); Juraj G. Fandli, Campbell, CA (US); Michael J. Carlton, Los Altos Hills, CA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/352,365

(22) Filed: Nov. 15, 2016

(65) Prior Publication Data

US 2017/0063649 A1 Mar. 2, 2017

Related U.S. Application Data

(63) Continuation of application No. 14/934,850, filed on Nov. 6, 2015, now Pat. No. 9,509,574.

(Continued)

(51) Int. Cl.
*H04L 12/24* (2006.01)
*H04L 12/26* (2006.01)

(52) U.S. Cl.
CPC ...... *H04L 41/5054* (2013.01); *H04L 41/0893* (2013.01); *H04L 43/10* (2013.01);
(Continued)

(58) Field of Classification Search
CPC ........................ H04L 41/5054; H04L 41/5058
USPC .......................................................... 709/220
See application file for complete search history.

(56) References Cited

U.S. PATENT DOCUMENTS 7,185,073 B1 2/2007 Gai et al.
8,489,735 B2 * 7/2013 Befort ................ G06F 11/0709 709/224

(Continued)

OTHER PUBLICATIONS

PCT International Search Report and Written Opinion for PCT/US16/17384, dated Apr. 19, 2016, 14 pages.

(Continued)

*Primary Examiner* — Tauqir Hussain
(74) *Attorney, Agent, or Firm* — Fenwick & West LLP

(57) ABSTRACT

A global manager computer generates management instructions for a particular managed server within an administrative domain according to a set of rules. A global manager computer identifies a traffic midpoint device through which the provider managed server provides a service to a user device. The global manager determines a relevant rule from the set of rules that is applicable to communication between the provider managed server and the user device and generates a backend rule that is applicable to communication between the provider managed server and the traffic midpoint device. The global managed generates a backend function-level instruction including a reference to an actor-set authorized to communicate with the provider managed server to use the service. The global manager sends the backend function-level instruction to the provider managed server to configure the provider managed server to enforce the backend rule on communication with the actor-set including the traffic midpoint device.

20 Claims, 15 Drawing Sheets

Related U.S. Application Data

(60) Provisional application No. 62/142,968, filed on Apr. 3, 2015.

(52) U.S. Cl.
CPC ...... *H04L 41/5096* (2013.01); *H04L 43/0876* (2013.01); *H04L 43/16* (2013.01)

(56) References Cited

U.S. PATENT DOCUMENTS

| | | | | |
|---|---|---|---|---|
| 8,614,945 | B2 * | 12/2013 | Brunnenmeyer .. | H04B 7/18584 370/230 |
| 2004/0039798 | A1 * | 2/2004 | Hotz ................... | H04L 61/1511 709/219 |
| 2005/0002335 | A1 * | 1/2005 | Adamczyk ............ | H04L 63/102 370/230 |
| 2010/0083145 | A1 * | 4/2010 | Schang .................. | G06Q 10/06 715/760 |
| 2010/0217841 | A1 * | 8/2010 | Schneider ............. | G06F 15/177 709/220 |
| 2014/0229593 | A1 | 8/2014 | Burke et al. | |
| 2014/0310415 | A1 * | 10/2014 | Kirner ................... | H04L 41/082 709/225 |

OTHER PUBLICATIONS

Extended European Search Report for European Patent Application No. EP 16773627.1, dated Nov. 30, 2017, 8 Pages.

* cited by examiner

END-TO-END POLICY ENFORCEMENT IN THE PRESENCE OF A TRAFFIC MIDPOINT DEVICE

CROSS-REFERENCE TO RELATED APPLICATION

This application is a continuation of U.S. patent application Ser. No. 14/934,850, filed on Nov. 6, 2015, which claims the benefit of U.S. Provisional Application No. 62/142,968, filed Apr. 3, 2015, each of which is incorporated by reference in its entirety.

BACKGROUND

1. Technical Field

The subject matter described herein generally relates to the field of managing computer servers (physical or virtual) of an administrative domain and, in particular, to enforcing security policies on network traffic relayed through a traffic midpoint device.

2. Background Information

Servers (physical or virtual) of an administrative domain are managed according to a policy. For example, a security policy might specify access control and/or secure connectivity, while a resource-usage policy might specify usage of the administrative domain's computing resources (e.g., disks and/or peripherals). Conventional policies reference physical devices and are expressed in terms of low-level constructs such as Internet Protocol (IP) addresses, IP address ranges, subnetworks, and network interfaces. These low-level constructs make it difficult to write a fine-grained policy in an abstract and natural way. Moreover, conventional policies tied to physical devices and low-level constructs do not adapt to changing configurations of routers, switches, server load balancers, and other devices that direct traffic between servers.

SUMMARY

The above and other issues are addressed by a method, non-transitory computer-readable storage medium, and system for generating management instructions for a particular managed server within an administrative domain according to an administrative domain-wide management policy that comprises a set of one or more rules. The administrative domain includes a plurality of managed servers. An embodiment of the method comprises the following steps. A traffic midpoint device is identified through which the provider managed server of the plurality of managed servers provides a service to a user device. A relevant rule is determined from the set of rules that specifies the service and that is applicable to communication between the provider managed server and the user device. Based on the relevant rule, a backend rule is generated that specifies the service and that is applicable to communication between the provider managed server and the traffic midpoint device. Based on the backend rule, a backend function-level instruction is generated including a reference to an actor-set authorized to communicate with the provider managed server to use the service. The actor-set includes the traffic midpoint device and excludes the user device. The backend function-level instruction is sent to the provider managed server to configure the provider managed server to enforce the backend rule on communication with the actor-set including the traffic midpoint device.

An embodiment of the medium stores computer program modules executable by one or more processors to perform the following steps. A traffic midpoint device is identified through which the provider managed server of the plurality of managed servers provides a service to a user device. A relevant rule is determined from the set of rules that specifies the service and that is applicable to communication between the provider managed server and the user device. Based on the relevant rule, a backend rule is generated that specifies the service and that is applicable to communication between the provider managed server and the traffic midpoint device. Based on the backend rule, a backend function-level instruction is generated including a reference to an actor-set authorized to communicate with the provider managed server to use the service. The actor-set includes the traffic midpoint device and excludes the user device. The backend function-level instruction is sent to the provider managed server to configure the provider managed server to enforce the backend rule on communication with the actor-set including the traffic midpoint device.

An embodiment of the system comprises one or more processors and a non-transitory computer-readable storage medium storing computer program modules executable by the one or more processors to perform the following steps. A traffic midpoint device is identified through which the provider managed server of the plurality of managed servers provides a service to a user device. A relevant rule is determined from the set of rules that specifies the service and that is applicable to communication between the provider managed server and the user device. Based on the relevant rule, a backend rule is generated that specifies the service and that is applicable to communication between the provider managed server and the traffic midpoint device. Based on the backend rule, a backend function-level instruction is generated including a reference to an actor-set authorized to communicate with the provider managed server to use the service. The actor-set includes the traffic midpoint device and excludes the user device. The backend function-level instruction is sent to the provider managed server to configure the provider managed server to enforce the backend rule on communication with the actor-set including the traffic midpoint device.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
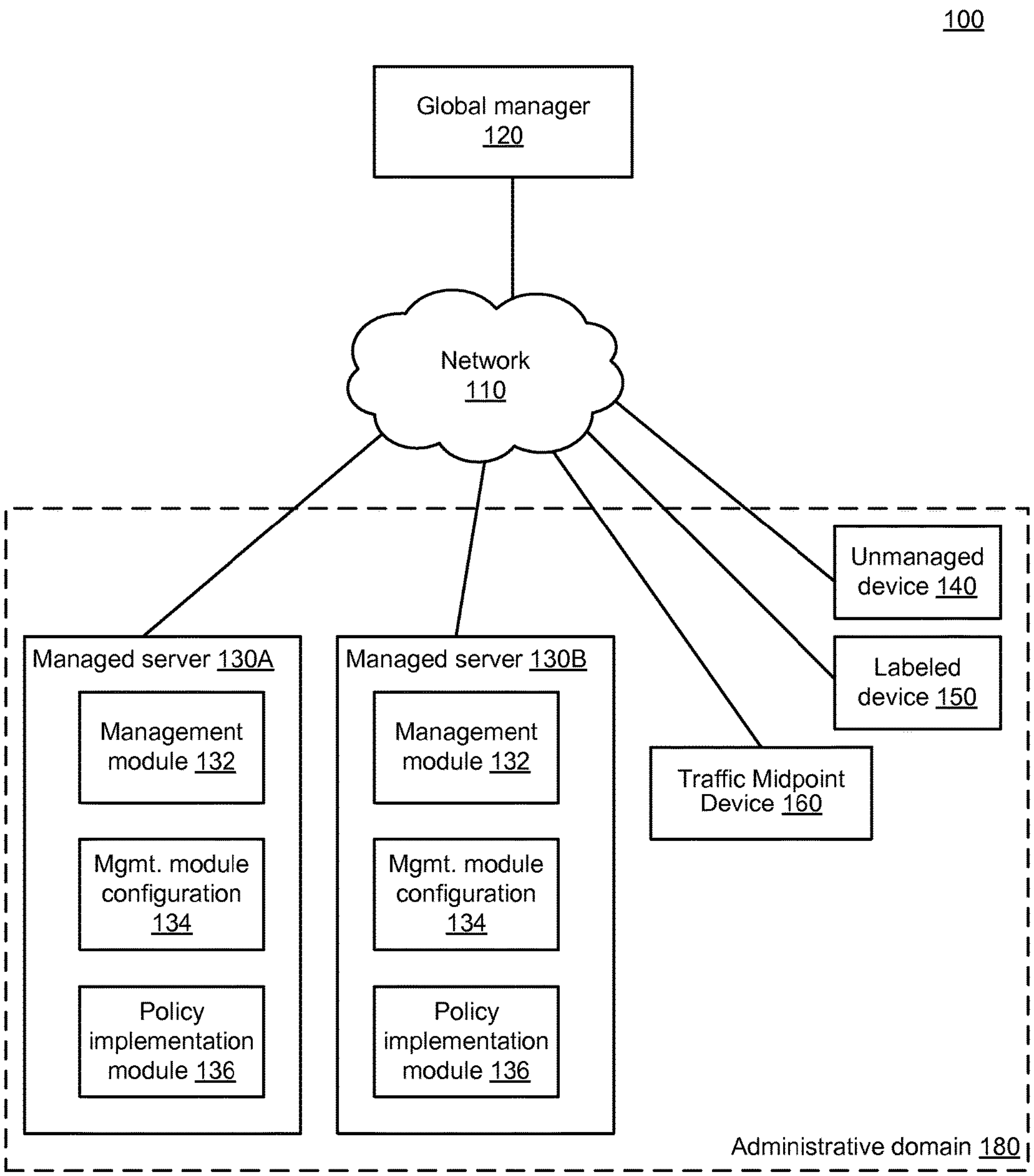
FIG. 1 is a high-level block diagram illustrating an environment for managing servers (physical or virtual) of an administrative domain, according to one embodiment.

FIG. 1 is a high-level block diagram illustrating an environment 100 for managing servers (physical or virtual) of an administrative domain 180, according to one embodiment. The administrative domain 180 can correspond to an enterprise such as, for example, a service provider, a corporation, a university, or a government agency. The environment 100 may be maintained by the enterprise itself or by a third party (e.g., a second enterprise) that helps the enterprise manage its servers 130. As shown, the actors in environment 100 include a network 110, a global manager 120, multiple managed servers 130, an unmanaged device 140, a labeled device 150, and a traffic midpoint device 160. The managed servers 130, the unmanaged device 140, the labeled device 150, and the traffic midpoint device 160 are associated with the administrative domain 180. For example, they are operated by the enterprise or by a third party (e.g., a public cloud service provider) on behalf of the enterprise. While one global manager 120, two managed servers 130, one unmanaged device 140, one labeled device 150, and one traffic midpoint device 160 are shown in the embodiment depicted in FIG. 1 for clarity, other embodiments can have different numbers of global managers 120, managed servers 130, unmanaged devices 140, labeled devices 150, or traffic midpoint devices 160.

The network 110 represents the communication pathway between the global manager 120, the managed servers 130, the unmanaged device 140, the labeled device 150, and the traffic midpoint device 160. In one embodiment, the network 110 uses standard communications technologies and/or protocols and can include the Internet. In another embodiment, the entities on the network 110 can use custom and/or dedicated data communications technologies.

Figure 3A:
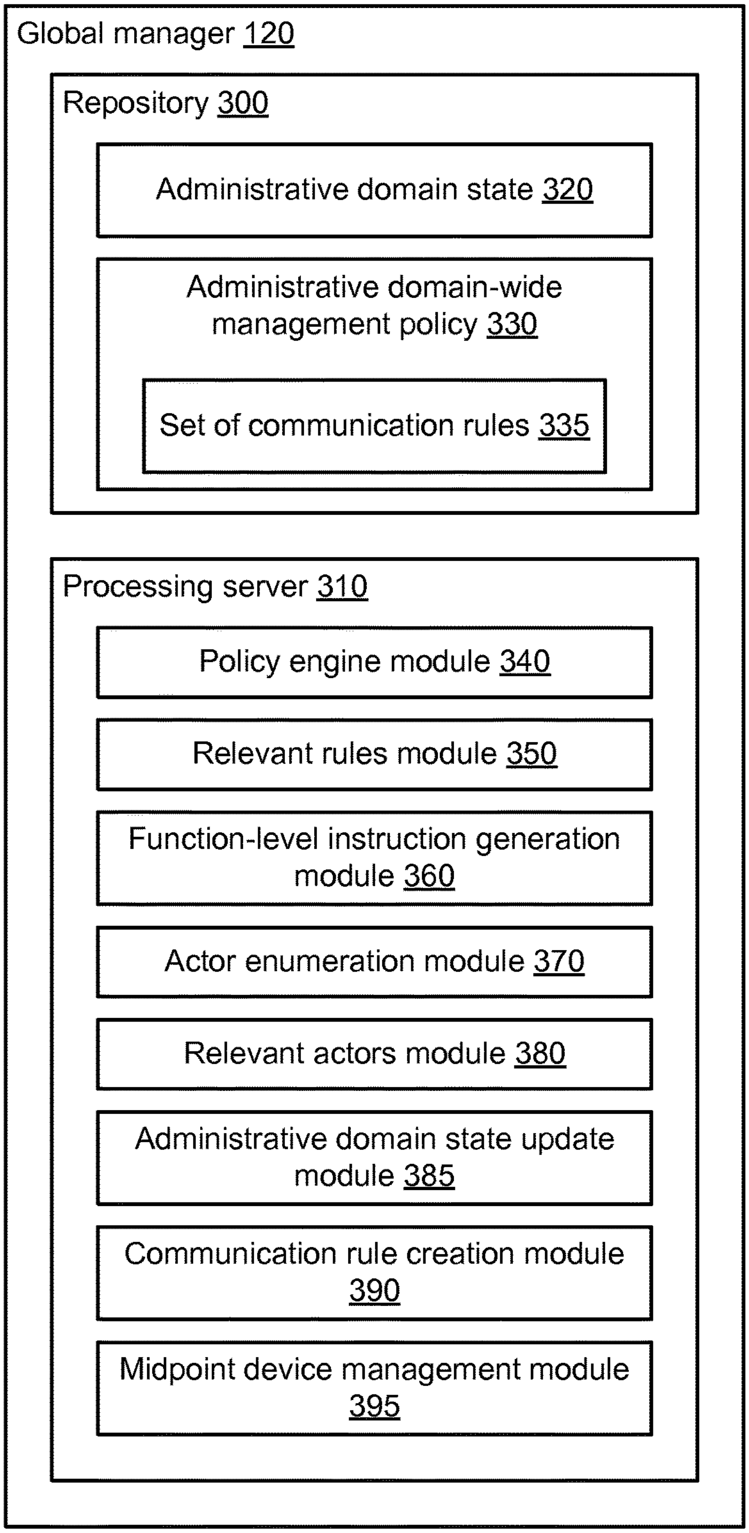
FIG. 3A is a high-level block diagram illustrating a detailed view of a global manager, according to one embodiment.

A managed server 130 is a machine (physical or virtual) that implements an administrative domain-wide management policy 330 (shown in FIG. 3A). In one embodiment, a server is a user-space instance of a virtual server (sometimes referred to as a container, virtualization engine, virtual private server, or jail) according to operating system-level virtualization, which is a server virtualization method where the kernel of an operating system enables multiple isolated user-space instances, instead of only one instance. If a managed server 130 is a physical machine, then the managed server 130 is a computer or set of computers. If a managed server 130 is a virtual machine, then the managed server 130 executes on a computer or set of computers. The administrative domain-wide management policy 330 specifies whether and/or how entities associated with the administrative domain 180 are allowed to access (or be accessed by) other entities or otherwise consume (or provide) services. For example, the administrative domain-wide management policy 330 specifies rules relating to security (through a security policy), resource usage (through a resource-usage policy), or both. A security policy might specify access control, secure connectivity, disk encryption, and/or control of executable processes, while a resource-usage policy might specify usage of the administrative domain's computing resources (e.g., disks, peripherals, and/or bandwidth).

A managed server 130 includes a management module 132, a management module configuration 134, and a policy implementation module 136. The management module 132 implements the administrative domain-wide management policy 330. For example, in the case of security, the management module 132 can be a low-level network or security engine such as an operating system-level firewall, an Internet Protocol security (IPsec) engine, or a network traffic filtering engine (e.g., based on the Windows Filtering Platform (WFP) development platform). In the case of resource usage, the management module 132 can be a disk-usage engine or a peripheral-usage engine.

The management module configuration 134 affects the operation of the management module 132. For example, in the case of security, the management module configuration 134 can be access control rules applied by a firewall, secure connectivity policies applied by an IPsec engine (e.g., embodied as iptables entries and ipset entries in the Linux operating system), or filtering rules applied by a filtering engine. In the case of resource usage, the management module configuration 134 can be disk-usage policies applied by a disk-usage engine or peripheral-usage policies applied by a peripheral-usage engine.

The policy implementation module 136 generates the management module configuration 134 based on a) management instructions received from the global manager 120 and b) the state of the managed server 130. The management instructions are generated based, in part, on the administrative domain-wide management policy 330. In general, the management instructions for a particular managed server 130 (or other device in the environment 100) specify characteristics of actions (e.g., communication, resource usage, data storage, process execution) that comply with the administrative domain-wide management policy 330, that do not comply with the policy 330, or both. The management module configuration 134 generated by the policy implementation module 136 implements that administrative domain-wide management policy 330 (to the extent that the policy concerns the managed server 130). This two-step process (generating management instructions and generating the management module configuration 134) is referred to as "instantiating" a management policy. The policy implementation module 136 also monitors the local state of the managed server 130 and sends local state information to the global manager 120.

In one embodiment, the policy implementation module 136 is part of a larger proprietary module (not shown). The proprietary module is loaded onto a device (or virtual device) that already has a management module 132 and a management module configuration 134, thereby transforming the device (or virtual device) from an unmanaged device 140 or labeled device 150 to a managed server 130. The policy implementation module 136 is further described below with reference to FIGS. 4, 6, and 7.

The global manager 120 is a computer (or set of computers) that generates management instructions for managed servers 130 and sends the generated management instructions to the servers. The management instructions are generated based on a) the state of the administrative domain's computer network infrastructure (the "administrative domain state 320") and b) an administrative domain-wide management policy 330. The administrative domain state 320 includes descriptions of managed servers 130 and (optionally) descriptions of unmanaged devices 140 or labeled devices 150. The global manager 120 also processes local state information received from managed servers 130.

The administrative domain-wide management policy 330 is based on a logical management model that can reference managed servers 130 based on their high-level characteristics, referred to herein as "labels." A label is a pair that includes a "dimension" (a high-level characteristic) and a "value" (the value of that high-level characteristic). A management policy constructed in this multi-dimensional space is more expressive than a management policy constructed according to a single-characteristic network/IP address-based policy model. In particular, expressing management policy using the higher-level abstractions of "labels" enables people to better understand, visualize, and modify management policy.

The logical management model (e.g., the number and types of dimensions available and those dimensions' possible values) is configurable. In one embodiment, the logical management model includes the following dimensions and values, as shown in Table 1:

TABLE 1

Example of logical management model

| Dimension | Meaning (M), Values (V) |
|---|---|
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |

TABLE 1-continued

Example of logical management model

| Dimension | Meaning (M), Values (V) |
|---|---|
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |

The logical management model enables multiple managed servers 130 to be grouped together by specifying one or more labels (referred to herein as a "label set") that describe all of the managed servers 130 in the group. A label set includes either zero values or one value for a dimension in the logical management model. A label set need not include labels for all dimensions in the logical management model. In this way, the logical management model enables the segmentation and separation of an administrative domain's managed servers 130 and the creation of arbitrary groupings of managed servers 130. The logical management model also allows for a single managed server 130 to exist in multiple overlapping sets (i.e., multiple overlapping groups of managed servers). The logical management model does not limit the single managed server 130 to existing in a hierarchy of nested sets.

For example, in the case of security, segmentation can be used with access control policies to define groups of managed servers 130 that are subject to particular policies. Similarly, segmentation can be used with secure connectivity policies to define groups of managed servers 130 and the policies that apply to intra-group communications and inter-group communications. So, communications among a first group of managed servers 130 (specified by a first label set) can be restricted to a first secure connection setting (e.g., secure connection not required), and communications between the first group of managed servers and a second group of managed servers (specified by a second label set) can be restricted to a second secure connection setting (e.g., IPsec Encapsulating Security Payload (ESP)/Authentication Header (AH) Advanced Encryption Standard (AES)/Secure Hash Algorithm-2 (SHA-2)).

Each managed server 130 in the environment 100 implements the administrative domain-wide management policy 330 (to the extent that the policy concerns the managed server 130). As a result, the administrative domain-wide management policy 330 is applied in a distributed fashion throughout the administrative domain 180, and there are no choke points. Also, the administrative domain-wide management policy 330 is applied at the logical level independent of the administrative domain's physical network topology and network addressing schemes.

An unmanaged device 140 is a computer (or set of computers) that does not include a policy implementation module 136. An unmanaged device 140 does not implement the administrative domain-wide management policy 330. However, interaction between a managed server 130 and an unmanaged device 140 can be subject to the administrative domain-wide management policy 330 (as implemented by the managed server 130). One example of an unmanaged device 140 is a network circuit that is used by an administrative domain 180. Another example of an unmanaged device 140 is a device used by a person to authenticate himself to the administrative domain 180 (e.g., a notebook or desktop computer, a tablet computer, or a mobile phone).

The administrative domain-wide management policy 330 includes rules regulating actors within the administrative domain 180. The administrative domain-wide management policy 330 may include rules specifying particular unmanaged devices 140 (identified by their respective network addresses, for instance). However, if an additional unmanaged device 140 joins the administrative domain 180, the rules specifying the particular unmanaged devices 140 do not apply to the additional unmanaged device 140 even if the additional unmanaged device 140 is similar to those unmanaged devices 140 specified by the rule. To cover the additional unmanaged device 140, the global manager 120 modifies the rule to further specify the additional unmanaged device 140. Other rules specify label sets for improved generality and to facilitate intuitive review by an administrator. Such a rule applies to an additional labeled device 150 introduced to the administrative domain 180 without modification of the rule. Accordingly, labeled devices 150 facilitate specification of rules using label sets. Such rules are less computationally complex to maintain, so associating an unmanaged device 140 with a label set (thereby transforming it into a labeled device 150) beneficially facilitates management of the administrative domain 180.

A labeled device 150 is an unmanaged device 140 that the administrative domain-wide management policy 330 refers to by one or more labels ("a label set"). Since label sets refer to high-level characteristics of the labeled device 150, label sets facilitate application of policies controlling communication between a labeled device 150 and a managed server 130. When the global manager 120 labels an unmanaged device 140, the device becomes a labeled device 150. Like unmanaged devices 140 that are unlabeled, labeled devices 150 may be servers, client devices, or other computers, and may be physical computers or virtual computers.

Some managed servers 130 provide bound services that perform different functionality than other services on a managed server 130. A bound service is described by a different label set than the label set of the managed server 130 that provides the bound service. Accordingly, the global manager 120 associates the bound services with label sets that are independent of their host managed server's label set. When applying rules to a managed server 130, the global manager 120 handles a bound service on the managed server 130 as an independent actor from the managed server 130. In some embodiments, the global manager 120 handles each service on a managed server 130 as a separate actor. However, such an embodiment may introduce duplicate actors representing services with matching label sets.

In some embodiments, the global manager 120 groups services to reduce the number of actors to manage in the administrative domain 180. The global manager 120 processes services on a managed server 130 that are not bound services (i.e. that are accurately described by the managed server's label set) as a single actor. The global manager 120 also groups those bound services on a managed server 130 that have matching label sets into a "bound service group," which functions as an independent actor associated with the managed server 130. Accordingly, the global manager 120 determines that a rule is relevant to a managed server 130 if the rule is relevant to one or more of the managed server's actors (e.g., the actor representing non-bound services on the managed server 130 or any actors representing bound service groups on the managed server 130).

Some bound services are executed by a plurality of managed servers 130. Such a bound service is referred to as a "distributed bound service." Instances of a distributed bound service executing on different managed servers 130 are associated with the same label set regardless of the respective label sets of the managed servers 130 executing the instances of the distributed bound service. Since a distributed bound service is provided by multiple managed servers 130, the distributed bound service is part of a bound service group on each managed server 130.

In some embodiments, the global manager 120 maintains a list of bound services. An entry for a bound service indicates the label set of the bound service and the one or more managed servers 130 providing the bound service. The list entry for a bound service may also indicate identifiers of one more bound service groups containing the bound service. For example, the list entry for a distributed bound service indicates the label set for the distributed bound service, identifiers of the multiple managed servers 130 executing the distributed bound service, and the identifiers of bound service groups containing the distributed bound service on each of the multiple managed servers 130.

In some embodiments, an administrator provides the global manager 120 with the list of bound services and updates the list of bound services. Alternatively or additionally, the global manager 120 provides mechanisms for identifying bound services. For example, the global manager 120 identifies bound services by analyzing properties of services on managed servers 130 such as whether the service is associated with a binding that overrides the port conventionally assigned to a process used by the service. The global manager 120 also obtains labels for bound services according to an analysis of the properties of the bound services (or properties of communications attributable to the bound services), according to input provided by an administrator, or according to a combination thereof.

A traffic midpoint device 160 regulates communication between a managed server 130 and another actor in the environment 100, such as a managed server 130, unmanaged device 140, or labeled device 150. Communication (or traffic) refers to data transferred between actors in the environment 100, typically according to standard protocols specifying transmission of data in discrete segments, packets, frames, or raw bits. A traffic midpoint device 160 may regulate traffic by modifying the data path of the traffic, modifying the traffic itself, modifying both the data path and the traffic, or by relaying the traffic without modification. For example, the traffic midpoint device 160 is a server load balancer that selects a backend managed server 130 and modifies a header in the communication to redirect it to the selected backend managed server 130. Communication between actors in the environment 100 may be regulated by multiple traffic midpoint devices 160 acting in serial, in parallel, or both. A traffic midpoint device 160 differs from a managed server 130 because the traffic midpoint device 160 does not include a management module 132 to enforce the administrative domain-wide management policy 330.

Example traffic midpoint devices 160 include a server load balancer, a proxy, a network switch, a router, and a network bridge. For example, the traffic midpoint device 160 is a forward proxy used by a managed server 130 to retrieve data from outside the administrative domain 160. As another example, the traffic midpoint device is a reverse proxy that manages communication between one or more backend managed servers 130 and other devices. Such a reverse proxy may perform load balancing, encryption, security, or content caching functions, for example. A load balancer may perform layer-4 load balancing based on data in the network layer or transport layer of traffic, or it may perform layer-7 load balancing based on data in the application layer of traffic. A traffic midpoint device 160 may be a physical device, a virtual device, or a combination thereof.

In some embodiments, a managed server 130 enforces rules of the administrative domain-wide management policy 330 that regulate communication between that managed server 130 and a traffic midpoint device 160. These rules may be derived from rules governing communication between a managed server 130 and another device without the presence of the traffic midpoint device 160. For example, the global manager 120 uses the rules specified in terms of the communication end points to derive segment rules that regulate each segment of the traffic's path between the endpoints through one or more traffic midpoint devices 160. Once the segment rules are derived, the segment rules may be enforced from both endpoints of the communication. A traffic midpoint device 160 may be labeled (i.e., assigned a label set) like a labeled device 150 to facilitate creation of applicable rules. A traffic midpoint device 160 may also be referred to by a unique identifier (UID) or a network address corresponding to a network interface of the traffic midpoint device 160.

In some embodiments, the traffic midpoint device 160 may include low-level security functions configurable by the global manager 120 (or a managed server 130) to implement the segment rules derived from the administrative domain-wide management policy 330. For example, the global manager 120 configures the traffic midpoint device 160 to enforce the administrative domain-wide management policy 330 on communications between the traffic midpoint device 160 and another actor in the environment 100. Management of traffic midpoint devices 160 according to the administrative domain-wide management policy 330 is described further with respect to FIGS. 10-14 in the section entitled "End-to-End Communication Policy."

The global manager 120, the administrative domain state 320, and the administrative domain-wide management policy 330 are further described below with respect to FIGS. 3A, 3B, 5, and 8.

Computer

Figure 2:
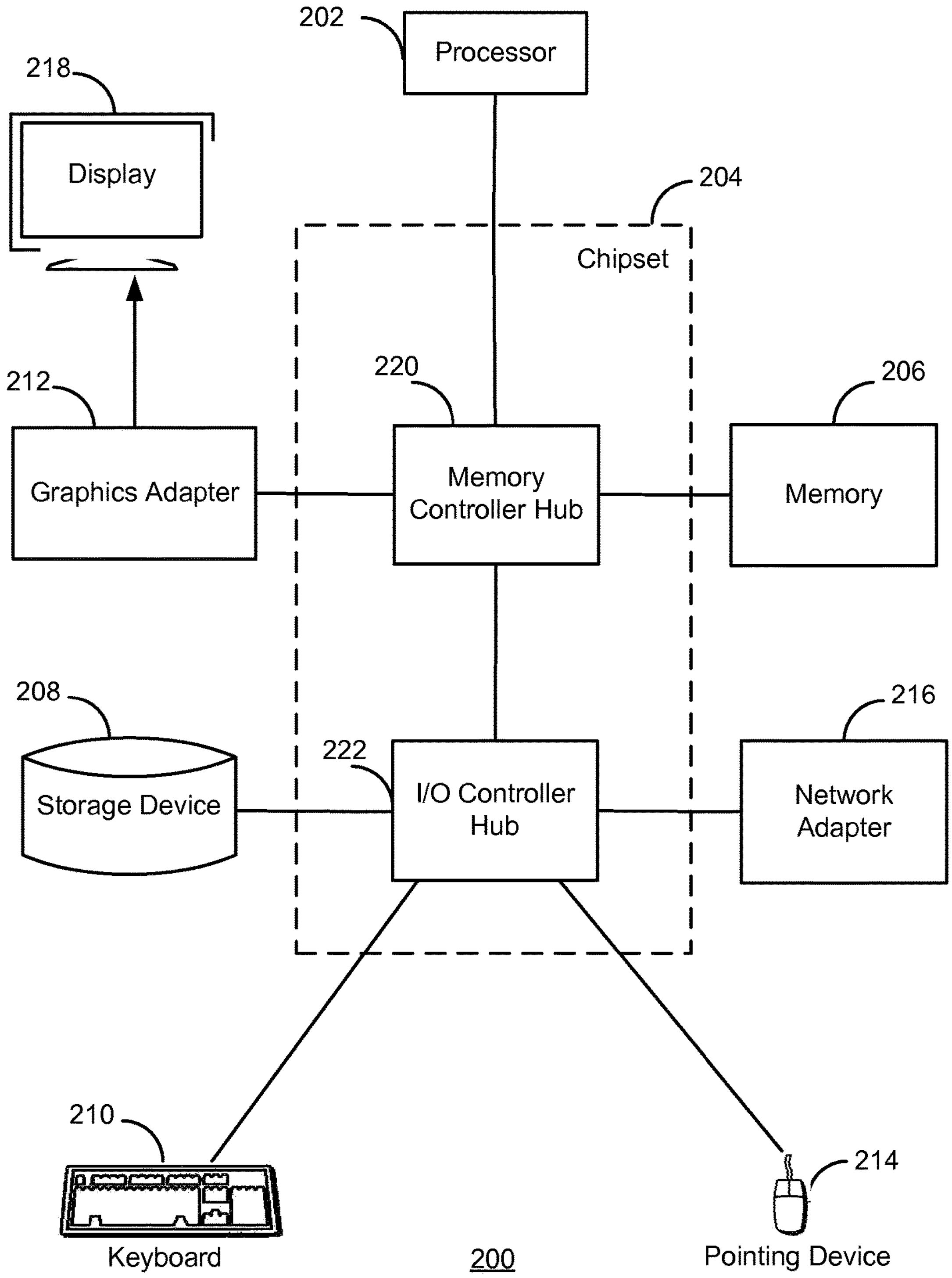
FIG. 2 is a high-level block diagram illustrating an example of a computer for use as one or more of the entities illustrated in FIG. 1, according to one embodiment.

FIG. 2 is a high-level block diagram illustrating an example of a computer 200 for use as one or more of the entities illustrated in FIG. 1, according to one embodiment. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 includes one or more non-transitory computer-readable storage media such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 212 displays images and other information on the display device 218. In some embodiments, the display device 218 includes a touch screen capability for receiving user input and selections. The network adapter 216 couples the computer system 200 to the network 110. Some embodiments of the computer 200 have different and/or other components than those shown in FIG. 2. For example, the global manager 120 and/or the managed server 130 can be formed of multiple blade servers and lack a display device, keyboard, and other components, while the unmanaged device 140 and labeled device 150 can be a notebook or desktop computer, a tablet computer, or a mobile phone. As another example, a traffic midpoint device 160 may be a network switch or network bridge. A traffic midpoint device 160 may perform server load balancing through dedicated hardware (e.g., a layer-3 switch), software (e.g., on a reverse proxy server configured to load balance traffic between backend servers), or a combination thereof.

The computer 200 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Global Manager

FIG. 3A is a high-level block diagram illustrating a detailed view of a global manager 120, according to one embodiment. The global manager 120 includes a repository 300 and a processing server 310. The repository 300 is a computer (or set of computers) that stores the administrative domain state 320 and the administrative domain-wide management policy 330. In one embodiment, the repository 300 includes a server that provides the processing server 310 access to the administrative domain state 320 and the management policy 330 in response to requests.

Administrative Domain State

The administrative domain state 320 includes descriptions of managed servers 130 and (optionally) descriptions of other network devices including unmanaged devices 140, labeled devices 150, and/or traffic midpoint devices 160. A description of a managed server 130 includes, for example, a unique identifier (UID), an online/offline indicator, one or more configured characteristics (optional), network exposure information, service information, and one or more labels that describe the managed server 130 (a label set).

The UID uniquely identifies the managed server 130. The online/offline indicator indicates whether the managed server 130 is online or offline. A "configured characteristic" stores a value associated with the managed server 130 and can be any type of information (e.g., an indication of which operating system is running on the managed server). A configured characteristic is used in conjunction with a rule's condition portion (described below).

The network exposure information concerns the managed server's network interfaces. A network interface refers to the hardware, software, of both that a device (e.g., managed server 130) uses to exchange information with the network 110 or other devices in the administrative domain 160. In one embodiment, the network exposure information includes, for each of the managed server's network interfaces, an identifier of a "bidirectionally-reachable network" (BRN) to which the network interface is attached and zero or more IP addresses (and their subnets) that are used for operating within the BRN. A BRN is a set of subnets, within an organization or across organizations, where any node within the BRN can establish communication with any other node in the BRN. For example, all of the nodes in a BRN have unique IP addresses. In other words, a BRN does not contain any NATs. Network exposure information (e.g., a network interface's BRN identifier) can be used in conjunction with a rule's condition portion.

In another embodiment, the network exposure information includes routing information and/or whether the managed server 130 is behind a network address translator (NAT) such as a traffic midpoint device 160. If the managed server 130 is behind a NAT, the global manager 130 determines the type of NAT—1:1 or 1:N. For example, the global manager 120 determines whether a NAT exists between the global manager 120 and the managed server 130 by comparing (a) the server's IP address according to the TCP connection between the global manager 120 and the server and (b) the server's IP address according to the local state information received from the server. If (a) and (b) differ, then a NAT exists between the global manager 120 and the managed server 130. If a NAT does exist, then the global manager 120 determines the type of NAT (1:1 or 1:N) by performing data center detection. For example, the global manager 120 identifies the server's data center by the data center's public IP address. (Alternatively, the managed server performs data center detection by querying information that is external to the server but inside the data center. The server then sends that information to the global manager 120 as part of the local status.) Configuration information indicates which types of NATs are used by which data centers. If no NAT information is associated with a particular data center, then the global manager 120 assumes that the NAT type is 1:N.

The description of a managed server 130 also includes service information describing services on a managed server 130 as well as bound services on a managed server 130. The service information includes, for example, process information and/or package information. Process information includes, for example, names of processes that the managed server 130 is running, which network ports and network interfaces those processes are listening on, which users initiated those processes, configurations of those processes, command-line launch arguments of those processes, and dependencies of those processes (e.g., shared objects to which those processes link). (Those processes correspond to the managed server 130 providing a service or using a service.) Package information includes, for example, which packages (executables, libraries, or other components) are installed on the managed server 130, the versions of those packages, the configurations of those packages, and the hash values of those packages. If a managed server 130 provides any bound services, the managed server's description may identify the bound services, bound service groups organizing one or more similar bound services, label sets corresponding to each bound service group, and a pointer to the bound service group, such as a unique identifier (UID).

A description of an unmanaged device 140 includes, for example, network exposure information (e.g., the IP address of the unmanaged device 140 and an identifier of the BRN to which the unmanaged device 140 is connected) or a unique identifier (UID). An unmanaged device 140 is part of an "unmanaged device group" (UDG). A UDG includes one or more unmanaged devices 140. For example, the "Headquarters UDG" could include the primary circuit and the backup circuit that are used by an administrative domain's headquarters, where each circuit is associated with an IP address. A UDG is associated with a unique identifier (UID). Information stored in the administrative domain state 320 regarding a UDG includes the UID of the UDG and information regarding the unmanaged devices 140 in the UDG (e.g., their network exposure information).

Like the description of other unmanaged devices 140, the description of a labeled device 150 may include network exposure information, a UID of the labeled device 150, and/or one or more UDGs including the labeled device 150. Similar to a managed server 130, the description of a labeled device 150 includes a label set describing the high-level characteristics of the labeled device 150. The description of a labeled device 150 may include a flag or other field indicating that the labeled device 150 lacks a policy implementation module 136 (or equivalently whether the labeled device 150 is a managed server 130). The description of a labeled device 150 may also include configured characteristics indicating additional labeled device information that is externally visible to the global manager 120 or a managed server 130. For example, even though a labeled device 150 lacks a policy implementation module 136, a managed server 130 might determine the operating system of the labeled device 150 based on the labeled device's response to valid and invalid requests (e.g., valid and invalid transmission control protocol (TCP) packets). As another example, a managed server 130 determines whether a labeled device 150 is online or offline by determining if the labeled device 150 responds to requests (e.g., ping requests).

The description of a traffic midpoint device 160 may include an online/offline indicator, network exposure information, a UID of the traffic midpoint device 160, one or more UDGs including the traffic midpoint device 160, a label set describing the high-level characteristics of the traffic midpoint device 160, or a combination thereof. The description of a traffic midpoint device 160 may also include an operational configuration that describes the settings and operation parameters of the traffic midpoint device 160. For example, the operational configuration describes NAT parameters (e.g., transparent, static, 1:1, 1:N), a switching mode (e.g., store and forward, cut through, fragment free), a load balancer scheduling algorithm, or other settings related to how the traffic midpoint device modifies a data path of traffic. As another example, the operational configuration indicates any traffic optimization settings related to content caching, traffic prioritization, or traffic compression. Although a traffic midpoint device 160 does not include a policy implementation module 136, it may include low-level security functions, and the description of the traffic midpoint device 160 may describe the security configuration of the low-level security functions. For example, the security configuration includes firewall settings, encryption settings, or client authentication settings.

Descriptions of managed servers 130, unmanaged devices 140, labeled devices 150, and traffic midpoint devices 160 can be loaded into the administrative domain state 320 in various ways, such as by interacting with the global manager 120 via a graphical user interface (GUI) or an application programming interface (API). Descriptions of managed servers 130 can also be loaded into the administrative domain state 320 based on local status information received from managed servers 130, as described below.

The global manager 120 may assign (or reassign) a value to a label dimension (or a configured characteristic) in many ways. For example, the assignment/setting can be performed using a deployment and configuration tool as part of provisioning a managed server 130. Any such tool can be used, including off-the-shelf third-party tools (e.g., Puppet Labs' Puppet software, Opscode's Chef software, or CFEngine AS' CFEngine software) and custom tools that an administrative domain 180 might have. Assignment of labels is described in further detail with respect to FIG. 9.

As another example, the assignment/setting can be performed by a "label/configured characteristic engine" (not shown) that determines labels and/or configured characteristic ("CC") values. In one embodiment, the label/CC engine calculates labels/CC values based on label/CC assignment rules. A label/CC assignment rule is a function that accesses data from the administrative domain state 320 and assigns (or suggests assignment of) a label or a CC value. A label/CC assignment rule can be preset or user-configurable. For example, the global manager 120 includes a set of predefined rules, but the end-user can modify and/or delete those rules and add new rules based on the user's own custom requirements. Label/CC assignment rules can be evaluated for a managed server 130 during the initialization process. Label/CC value suggestions can then be made for any dimension/CC, and the end-user can accept or reject those suggestions. For example, if a managed server 130 is executing the Postgres database or the MySQL database, then the suggested label could be <Role, Database>. If a managed server is executing the Linux operating system, then the suggested value for the operating system CC could be "Linux." In some embodiments, separate modules provide the assignment of labels and configured characteristics, respectively. For example, a module to assign labels is described below in further detail in conjunction with FIG. 9.

In another embodiment, the label/CC engine calculates labels/CC values based on cluster analysis. For example, the label/CC engine uses a combination of min-cut and K-means algorithms, with additional heuristics, of connected graphs to automatically identify a cluster of highly-connected managed servers 130, bound services, and/or labeled devices 150. The cluster of managed servers 130 and/or labeled devices 150 might correspond to an "application" (see Table 1) in the administrative domain 180. The end-user can choose to apply a value for the Application dimension (or any other dimension) to those managed servers 130, bound service groups, and/or labeled devices 150 en masse.

Administrative Domain-Wide Management Policy

The administrative domain-wide management policy 330 includes one or more rules. Broadly speaking, a "rule" specifies a relationship between one or more providers of a service and one or more consumers of that service. The administrative domain-wide management policy 330 includes a set of communication rules 335, which is described below in the section entitled "Communication Rules."

Rule Function—The relationship is subjected to a "rule function", which is the practical effect of the rule. For example, in the case of security, the rule function could be access control, secure connectivity, disk encryption, or control of executable processes. A rule with an access control function specifies whether a consumer may use a provider's service. In one embodiment, the access control function uses a pure "whitelist" model, which means that only the allowable relationships are expressed, and all other relationships are blocked by default. A rule with a secure connectivity function specifies over what secure channels (e.g., encrypted network sessions using point-to-point data encryption) a consumer may use a provider's service. For example, a rule with a secure connectivity function could specify that usage of a provider's services must be encrypted when the provider is located in the US and the consumer is located in the EU. A rule with a disk encryption function specifies whether a provider must store its data on an encrypted file system. A rule with an executable process-control function specifies whether a process is allowed to execute.

In the case of resource usage, the rule function could be disk-usage or peripheral-usage. A rule with a disk-usage function specifies an amount of data that a consumer can store on a provider. Note that a rule can specify other rule functions as well beyond just access control, secure connectivity, disk encryption, control of executable processes, disk usage, and peripheral usage. For example, a rule function could specify which Open Systems Interconnection (OSI) model Layer-7 services to apply to network traffic, the amount of metadata to collect for security analytics, or the triggers for capturing a complete network packet. The management policy model supports any number of rule functions that can be applied.

A rule function can be associated with one or more settings (referred to herein as a "function profile") that specify details regarding the practical effect of the rule. For example, settings associated with a secure connectivity rule function can be a list of cryptographic algorithms used to encrypt network traffic. In one embodiment, a rule function is associated with multiple function profiles, and a function profile includes a priority. This priority is used by the function-level instruction generation module 360, as described below.

Service—In general, a "service" is an arbitrary process executing on a specific network port using a specific network protocol. A service of a rule within the management policy 330 is specified by a port/protocol pair and (optionally) additional qualifications, such as process information and/or package information (described above with respect to a description of a managed server 130 within the administrative domain state 320). If a managed server 130 has multiple network interfaces, then a service can be exposed on all networks or on only a subset of those networks. The end-user specifies on which networks the service is exposed. Note that, depending on the rule function, a service might not use any network resources. For example, a service for an executable process-control rule function does not execute on a network port using a network protocol.

As with other services, a bound service is associated with one or more ports, protocols, or additional qualifications (e.g., process information, package information). For example, a distributed bound service is associated with one or more ports on each managed server 130 executing the distributed bound service. In one embodiment, the description of a bound service indicates a binding description of the bound service to the managed server 130. The binding identifies the managed server 130 as well as one or more ports used by the service. In particular, the binding description includes at least one port used by one of the bound service's constituent processes that differs from the port typically associated with that process in a given protocol. For example, a PostgreSQL process is typically associated with port 5432 in TCP, but a bound service including the PostgreSQL process includes a binding that overrides the port to a different number.

Providers/Consumers—The one or more providers of the service and the one or more consumers (i.e., users) of the service are managed servers 130, bound services, unmanaged devices 140, and/or labeled devices.

In one embodiment, a rule is represented within the administrative domain-wide management policy 330 using a set of information that includes a rule function portion, a service portion, a provided-by portion, a used-by portion, and an optional rule condition portion. The rule function portion describes the practical effect of the rule and can be associated with one or more settings (function profiles). The service portion describes the service to which the rule applies. If the service portion indicates "All", then the rule applies to all services.

The provided-by (PB) portion describes which managed servers 130, bound service groups, unmanaged devices 140, and/or labeled devices 150 can provide the service (i.e., who the "providers" are). If the PB portion indicates "Anybody", then any actor (e.g., any managed server 130, bound service groups, unmanaged devices 140, labeled devices 150) can provide the service. If the PB portion indicates "Any labeled device", then any managed server 130, bound service group, or labeled device 150 can provide the service. ("Any labeled device" is equivalent to specifying a label set that contains a wildcard, thereby matching all managed servers 130, bound service groups, and labeled devices 150.) Similarly, if the PB portion indicates "Any managed server", then the any managed server 130 can provide the service regardless of the managed server's label. The used-by (UB) portion describes which managed servers 130, bound service groups, unmanaged devices 140, and/or labeled devices 150 can use the service (i.e., who the "consumers" are). Similar to the PB portion, the UB portion can also indicate "Anybody", "Any labeled device", or "Any managed server."

Within the PB portion and the UB portion, a managed server 130 or labeled device 150 is specified by using a label set (i.e., one or more labels that describe the managed server) or a UID. The ability to specify managed servers 130, bound service group, and/or or labeled devices 150 using label sets stems from the logical management model, which references managed servers based on their dimensions and values (labels). An unmanaged device 140 that is unlabeled is specified by using a UID of an unmanaged device group (UDG). If a rule specifies a UDG, then the rule includes additional information regarding the unmanaged devices 140 in that group (e.g., the devices' network exposure information). The PB portion of a rule and/or the UB portion of a rule can include multiple items, including label sets (to specify managed servers 130, bound service groups, and/or labeled devices 150), managed server UIDs, and/or UDG UIDs.

The rule condition portion, which is optional, specifies whether the rule applies to a particular labeled actor (e.g., a managed server 130, a labeled device 150, a bound service group on a particular managed server 130, a traffic midpoint device 160) and/or a particular network interface or port of that labeled actor. The rule condition portion is a Boolean expression that includes one or more configured characteristics ("CCs"; part of a managed server's description in the administrative domain state 320) and/or network exposure information (e.g., a network interface's BRN identifier, a port's network address; also part of a managed server's description in the administrative domain state 320). A CC portion of the expression specifies whether the rule applies to the particular managed server 130 (or bound service group on a particular managed server 130, or labeled device 150), while a network exposure information portion of the expression specifies whether the rule applies to a particular network interface or port of that managed server 130 (or labeled device 150). For example, if the expression evaluates to "true" for a particular managed server's configured characteristics (specifically, for the values of that managed server's configured characteristics) and a particular network interface's information, then the rule applies to that managed server 130 and that managed server's relevant network interface. Continuing the example, if the expression evaluates to "false", then the rule does not apply to that managed server 130 and that managed server's relevant network interface. As another example, if a configured characteristic stores an indication of which operating system is running on the managed server 130, then a rule condition portion that includes that configured characteristic can control whether the rule applies to a particular managed server 130 based on that server's operating system.

Rules within the administrative domain-wide management policy 330 are organized into rule lists. Specifically, the management policy 330 includes one or more rule lists, and a rule list includes one or more rules and (optionally) one or more scopes. A "scope" constrains where (i.e., to which managed servers 130, bound service group, or labeled devices 150) a rule is applied. A scope includes a provided-by (PB) portion and a used-by (UB) portion that limit the application of the rules in the rule list. The PB portion of the scope limits the PB portion of the rules, and the UB portion of the scope limits the UB portion of the rules. The PB and UB portions of a scope can specify a group of managed servers 130 (or a bound service group, or a group of labeled devices 150) by using a label set. If the label set does not contain a label for a specific dimension, then there is no scoping of that dimension for the resulting group of managed servers 130. If a rule list does not include any scopes, then its rules are applied globally.

Different scopes can be applied to a single rule list. For example, an end-user can build a set of rules that express how the web service tier (managed servers 130 and bound service groups with a <Role, Web> label) consumes services from the database tier (managed servers with a <Role, Database> label), how the load-balancing tier consumes services from the web service tier, and so on. Then, if the end-user wants to apply this rule list to his production environment (managed servers 130 with an <Environment, Production> label) and to his staging environment (managed servers 130 with an <Environment, Staging> label), he does not need to copy or duplicate the rule list. Instead, he applies multiple scopes to a single rule list (a first scope where the PB portion and the UB portion include the <Environment, Production> label and a second scope where the PB portion and the UB portion include the <Environment, Staging> label). The scope abstraction makes the rule list scale from both a usability perspective and a computational perspective.

Now that the administrative domain-wide management policy 330 has been described, it is helpful to work through some examples. Consider an administrative domain 180 with a two-tier application where a user device accesses a web server (the first tier), and the web server accesses a database server (the second tier). In the first tier, the user device is the consumer, and the web server is the provider. In the second tier, the web server is the consumer, and the database server is the provider. The administrative domain 180 includes two instances of this application: one in a production environment and one in a staging environment.

The web servers and the database servers are managed servers 130, and their descriptions (e.g., label sets) are present in the administrative domain state 320. For example, their label sets are: web server in production: <Role, Web> and <Environment, Production> database server in production: <Role, Database> and <Environment, Production> web server in staging: <Role, Web> and <Environment, Staging> database server in staging: <Role, Database> and <Environment, Staging> (The Application dimension, the Line of Business dimension, and the Location dimension are not relevant to this example, so their labels are omitted.)

Now consider the following administrative domain-wide management policy 330, which is a security policy that specifies access control and secure connectivity:

Rule List #1
Scopes
<Environment, Production>
<Environment, Staging>
Rules
#1
Function: Access Control
Service: Apache
PB: <Role, Web>
UB: Anybody
#2
Function: Access Control
Service: PostgreSQL
PB: <Role, Database>
UB: <Role, Web>
Rule List #2
Scopes: None
Rules
#1
Function: Secure Connectivity
Service: All
PB: <Role, Database>
UB: Any managed server Note that the rules above refer to services simply as "Apache" and "PostgreSQL" for clarity. Remember that a service is a process and is specified by a port/protocol pair and (optionally) additional qualifications, such as process information and/or package information (described above with respect to a description of a managed server 130 within the administrative domain state 320).

Rule List #1/Rule #1 allows any device (e.g., a user device) to connect to a web server and use the Apache service. Specifically, the allowance of a connection is specified by "Access Control" in the Function portion. The "any device" is specified by "Anybody" in the UB portion. The "web server" is specified by "<Role, Web>" (a label set that includes only one label) in the PB portion. The Apache service is specified by "Apache" in the Service portion.

Rule List #1/Rule #2 allows a web server to connect to PostgreSQL on a database server. Specifically, the allowance of a connection is specified by "Access Control" in the Function portion. The "web server" is specified by "<Role, Web>" in the UB portion. The "PostgreSQL" is specified by "PostgreSQL" in the Service portion. The "database server" is specified by "<Role, Database>" (a label set that includes only one label) in the PB portion.

Rule List #1 also prevents inter-environment connections. For example, a web server is allowed to connect to PostgreSQL on a database server if the web server and database server are both in the same environment (e.g., both in the production environment or both in the staging environment). Both servers in the production environment is specified by "<Environment, Production>" (a label set that includes only one label) in the Scope portion, while both servers in the staging environment is specified by "<Environment, Staging>" (a label set that includes only one label) in the Scope portion. (Since the scopes in this example do not distinguish between the PB portion and the UB portion, each scope's label set is applied to both the PB portion and the UB portion.) As a result, a web server is not allowed to connect to PostgreSQL on a database server if the servers are in different environments (e.g., if the web server is in the staging environment and the database server is in the production environment).

Rule List #2 states that whenever any managed server connects to a database server, that connection must be performed through an encrypted channel. Specifically, the "database server" is specified by "<Role, Database>" in the PB portion. The "encrypted channel" is specified by "Secure Connectivity" in the Function portion. The "any managed server" is specified by "Any managed server" in the UB portion. The "whenever" is specified by "All" in the Service portion.

Turning aside from the above example, consider the following two managed servers 130: Server 1 is a web server that is part of production, part of app1, and owned by engineering in California. It would be labeled as:

| |
|---|
| <Role, Web> |
| <Environment, Production> |
| <Application, app1> |
| <LB, Engineering> |
| <Location, US> |

Server 2 is a database server that is part of production, also part of app1, and also owned by engineering but in Germany. It would be labeled as:

| |
|---|
| <Role, Database Server> |
| <Environment, Production> |
| <Application, app1> |
| <LB, Engineering> |
| <Location, EU> |

Assume that an access control rule allows all access to all managed servers 130 that are part of app1. This rule would allow Server 1 and Server 2 to communicate with each other and would disallow a managed server 130 in Germany that is part of app2 from communicating with Server 1 or Server 2. Now assume that a secure connectivity rule specifies that all network traffic between EU and US must be encrypted. Rule functions are independently applied. In other words, the secure connectivity rule is a separate policy that is applied independent of the access control rule. As a result, the network traffic from Server 1 to Server 2 would be allowed (given the access control rule) and encrypted (given the secure connectivity rule).

Bound Services

In some embodiments, a managed server 130 has services that are associated with different high-level characteristics (e.g., different roles, environments, applications, or lines of business). These services executing on the same managed server 130 can be described by different label sets. A service having a different label set than the managed server 130 providing the service is referred to as a "bound service." Rules that are applicable to the managed server 130 according its label set are inapplicable to the managed server's bound services because the bound services have a different label set. Accordingly, the administrative domain-wide management policy 330 includes rules applied according to the label set of a service rather than according to the label set of the managed server 130 hosting the service.

A bound service provided by multiple managed servers 130 is referred to as a "distributed bound service." Each of the multiple managed servers 130 providing the distributed bound service provides an "instance" of the distributed bound service. Bound services having the same label set (and accordingly similar high-level characteristics) and provided by the same managed server 130 may be referred to as a "bound service group." The global manager 120 may group bound services into bound service groups automatically (as described with respect to the labeling engine 930) and/or according to instructions from an administrator. Since multiple managed servers 130 provide instances of a distributed bound service, the distributed bound service belongs to a bound service group on each of the multiple managed servers 130. The instances of the distributed bound service have the same label set, so the various bound service groups containing the instances of the distributed bound service have matching label sets.

Figure 3B:
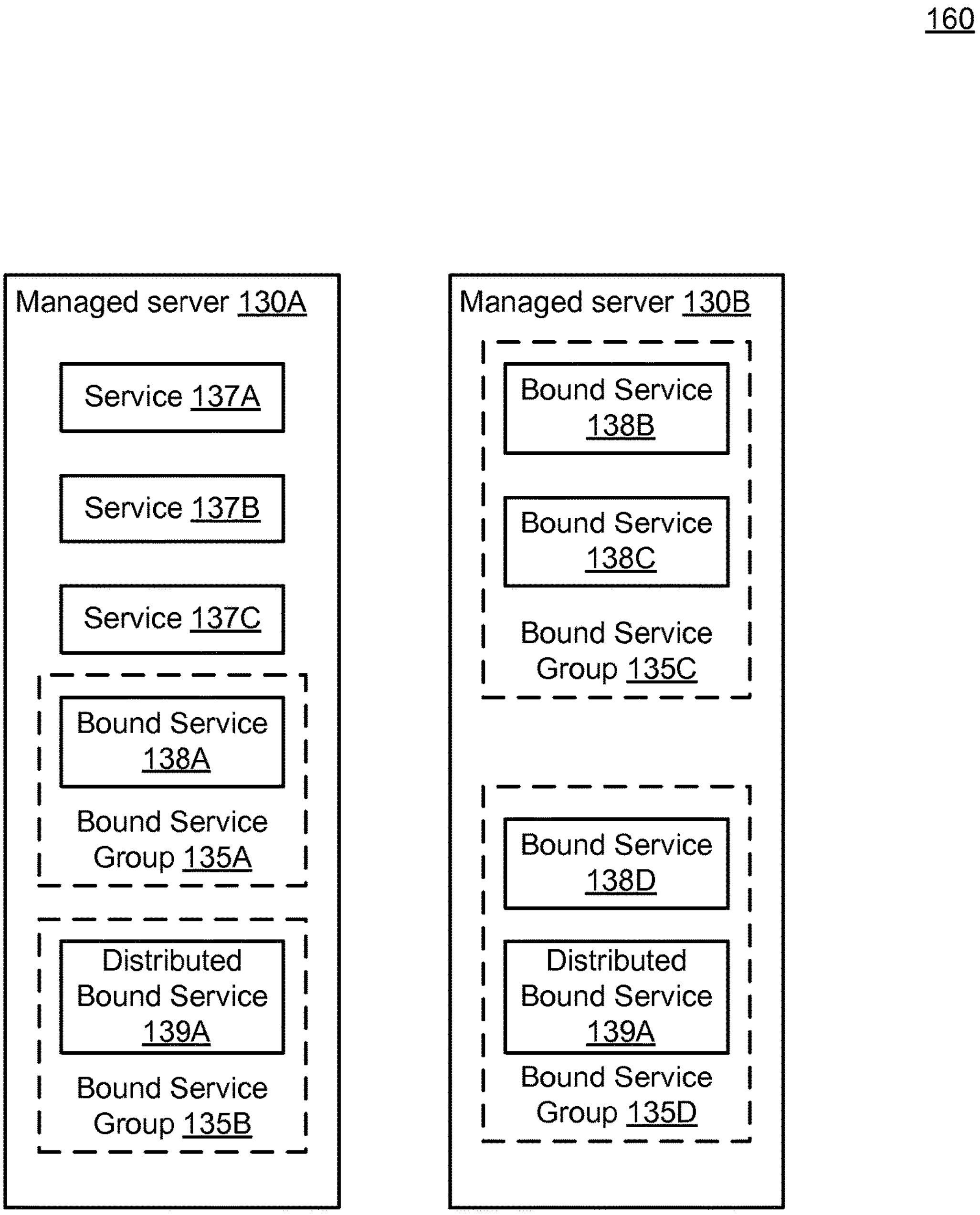
FIG. 3B is a high-level block diagram illustrating various services on managed servers illustrated in FIG. 1, according to one embodiment.

Turning to FIG. 3B, illustrated is a high-level block diagram illustrating example services on managed servers 130A and 130B, according to one embodiment. Managed server 130A includes services 137A, 137B, and 137C, which have similar high-level characteristics and accordingly are accurately described by the managed server 130A's label set. The managed server 130A also includes a bound service 138A, which has a different label set than the managed server 130A. For example, the managed server 130A has the label <Environment, Production> and the bound service 138A has the label <Environment, Staging>. Continuing the example, rules that are relevant to the managed server 130A include rules with a scope including at least one of <Environment, Production> and <Environment, Staging>. However in this example, rules with a scope of <Environment, Production> are not relevant to bound service 138A, and rules with a scope of <Environment, Staging> are not relevant to services 137A-137C. As another example, rules often specify a PB portion and a UB portion in terms of label sets, so different rules are relevant to services 137A-137C and bound service 138A. For brevity, a managed server 130 including one or more bound services with different label sets than the managed server 130 may be referred to as a "diverse managed server 130." In contrast, a managed server 130 executing only services adequately described by the managed server's label set (i.e., a managed server 130 without bound services) may be referred to as a "uniform managed server 130."

Managed server 130B includes bound services 138B, 138C, and 138D. Because managed server 130B includes bound services, it is a diverse managed server 130B. For example, managed server 130B is set of blade servers at a data center providing cloud computing services, and the bound services 138B-D are "micro services" that consume only a fraction of the managed server 130B's processing resources. The administrative domain-wide management policy 330 may consider each of bound services 138B-138D as separate actors when determining which rules apply to managed server 130B and bound services 138B-138D. In some embodiments, a managed server 130 provides bound services with such diverse label sets that it is inaccurate to assign a particular label set to the managed server 130. The global manager 120 may determine relevant rules for a managed server 130 without a label set according to the bound services executing on the managed server 130.

The managed servers 130A and 130B each include an instance of the distributed bound service 139A. The distributed bound service 139A has a label set that differs from the respective label sets of managed servers 130A and 130B. For example, the distributed bound service 139A has a label set including a <Environment, Development> label, the managed server 130A has a label set including a <Environment, Production > label, and the managed server 130B has a label set including a <Environment, Staging> label.

The global manager 120 organizes the bound services on managed servers 130A and 130B into bound service groups with matching label sets. Managed server 130A includes bound service group 135A, which contains bound service 138A, and bound service group 135B, which contains distributed bound service 139A. Accordingly, bound service 138A has a label set that is different from the label set of distributed bound service 139A. For example, bound service 138A and the distributed bound service 139A have labels with different values for the "Line of Business" dimension. Managed server 130B includes bound service group 135C, which contains bound services 138B and 138C, and bound service group 135D, which contains bound service 138D and distributed bound service 139A. Hence, bound services 138B and 138C have matching label sets, but their label sets differ from the label sets of bound service 138D and distributed bound service 139A in at least one dimension. Note that the two instances of distributed bound service 139A are in different bound service groups 135B and 135D that have matching label sets but correspond to different managed servers 130A and 130B.

Processing Server

Returning to FIG. 3A, the processing server 310 generates management instructions for managed servers 130 and bound services executing on those servers and sends the generated management instructions to the servers. The processing server 310 also processes local state information received from managed servers 130. The processing server 310 includes various modules such as a policy engine module 340, a relevant rules module 350, a function-level instruction generation module 360, an actor enumeration module 370, a relevant actors module 380, an administrative domain state update module 385, a communication rule creation module 390, and a midpoint device management module 395. In one embodiment, the processing server 310 includes a computer (or set of computers) that communicates with the repository 300 and processes data (e.g., by executing the policy engine module 340, the relevant rules module 350, the function-level instruction generation module 360, the actor enumeration module 370, the relevant actors module 380, the administrative domain state update module 385, the communication rule creation module 390, and the midpoint device management module 395).

The relevant rules module 350 takes as input the administrative domain-wide management policy 330 and an indication of a particular managed server 130 (e.g., that server's UID), generates a set of rules that are relevant to that server, and outputs the set of rules. This is a filtering process by which the relevant rules module 350 examines the management policy 330 and extracts only the relevant rules for the given managed server 130. Similarly, the relevant rules module 350 may determine whether a rule is relevant to another device (e.g., a labeled device 150, a traffic midpoint device 160).

The relevant rules module 350 identifies whether the managed server 130 is executing any bound services, and determines which rules are relevant to the managed server 130 according to the overall label set of the diverse managed server 130 as well as label sets of any identified bound services. The relevant rules module 350 iterates through all of the rule lists in the management policy 330 and analyzes the scope of each rule list to determine whether the scope applies to: (a) at least one of the managed server 130 according to the managed server's overall label set or (b) at least one of any identified bound services executing on the managed server 130. If the scope of a rule list applies to the managed server 130 or at least one of its bound services, the relevant rules module 350 analyzes the rules of the rule list to determine which rules apply to the managed server 130 or one of its bound services. For example, a rule applies to the managed servers 130 that provide a distributed bound service if the rule scope matches the label set of the distributed bound service.

A rule applies to a managed server 130 if (a) the PB portion of the rule and/or the UB portion of the rule specifies the managed server 130 or one of its bound services and (b) the condition portion of the rule (if present) evaluates to "true" for that managed server (specifically, for the values of that managed server's configured characteristics and network exposure information). The end result (referred to herein as a "management policy perspective") is a collection of two sets of rules: rules where this managed server 130 provides a service and rules where this managed server 130 consumes a service. For example, a rule applies to those managed servers 130 providing a distributed bound service if (a) the PB portion of the rule specifies the distributed bound service (e.g., using the distributed bound service's label set) and (b) the condition portion of the rule evaluates to "true" for those managed servers 130 providing the distributed bound service. For a diverse managed server 130, each set of relevant rules may be further divided into (a) rules that apply to non-bound services on the managed server 130, and (b) rules that apply to each bound service on the diverse managed server 130.

The function-level instruction generation module 360 takes as input a set of rules (e.g., a management policy perspective generated by the relevant rules module 350), generates function-level instructions, and outputs the function-level instructions. The function-level instructions are later sent to a managed server 130 as part of the management instructions. A function-level instruction is similar to a rule in that each one includes a rule function portion, a service portion, a PB portion, and a UB portion. However, whereas a rule can include multiple items within its PB portion and/or UB portion (including label sets, addresses of network interfaces, managed server UIDs, UDG UIDs, or other device UIDS), a function-level instruction includes only one item within its PB portion and only one item within its UB portion. Also, whereas a rule can specify a managed server 130, bound service group, or labeled device 150 (including the labeled actor's one or more network ports) within its PB portion and/or UB portion, a function-level instruction refers to only one network interface within its PB portion and one network interface within its UB portion. Alternatively or additionally, a function-level instruction refers to a network port within its PB portion or UB portion. Alternatively or additionally, a function-level instruction refers to an actor-set within its PB portion or UB portion.

The function-level instruction generation module 360 analyzes a rule and generates one or more function-level instructions based on that rule. If the rule's PB portion includes multiple items, the rule's UB portion includes multiple items, or a managed server 130 referenced by the rule (in the PB portion or UB portion) has multiple network ports, then the function-level instruction generation module 360 generates multiple function-level instructions (e.g., one function-level instruction for each possible combination of a PB item, a UB item, and a particular network port). For a diverse managed server 130, the function-level instruction generation module 360 determines the one or more network ports that correspond to the service to which the corresponding rule is relevant. For instance, for a rule that is relevant to a particular bound service group, the function-level instruction generation module 360 determines the one or more network interfaces used by the bound services in the bound service group.

Consider a rule that includes two items in its PB portion (A and B) and two items in its UB portion (C and D). The function-level instruction generation module 360 would generate four function-level instructions with the following PB and UB portions: 1) PB=A, UB=C; 2) PB=A, UB=D; 3) PB=B, UB=C; 4) PB=B, UB=D. Now consider a rule that covers multiple managed servers 130 in its PB portion and multiple traffic midpoint devices 160 in its UB portion (e.g., by specifying a UID, a label set, or referring to an actor-set). The function-level instruction generation module 360 may generate multiple function-level instructions (e.g., one function-level instruction for each combination of traffic midpoint device actor-set and managed server actor-set, or one function-level instruction for each combination of managed server network interface and traffic midpoint device network interface).

The function-level instruction generation module 360 analyzes the rules, the functions within those rules, and the function profiles referenced by those rules. If a rule list includes multiple scopes, then the function-level instruction generation module 360 applies those scopes multiple times to the rule list iteratively (thereby generating a complete set of function-level instructions for each scope). Recall that a rule function can be associated with multiple function profiles, and a function profile can include a priority. The function-level instruction generation module 360 orders the rules based on the priorities of the various function profiles such that the function profile with the highest priority is used. The function-level instruction generation module 360 translates the ordered rules into function-level instructions for the managed server 130 to execute. Function-level instructions reference the appropriate managed servers 130, unmanaged devices 140, labeled devices 150, and/or traffic midpoint devices 160, taking into account the network exposure details of the services associated with the rules. The function-level instructions also reference the appropriate services corresponding to the rule (and/or the network addresses of the ports corresponding to the appropriate services), so the function-level instructions can be used with managed servers 130 with or without bound services.

Note that the function-level instruction generation module 360 can generate a function-level instruction for a particular managed server 130 that turns out to be irrelevant for that server. For example, that managed server is covered by the provided-by (PB) portion of a rule, so the function-level instruction generation module 360 generates a corresponding function-level instruction. However, the rule also includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The managed server 130 checks its local state (e.g., whether it is providing that service) and processes the function-level instruction accordingly, as explained below with reference to the policy compilation module 410.

The actor enumeration module 370 takes as input a collection of descriptions of managed servers 130, bound service groups, labeled devices 150, traffic midpoint devices 160, and unmanaged device groups (UDGs) (e.g., the administrative domain state 320), generates representations of those descriptions of servers, devices, bound services, and UDGs in an enumerated form (referred to as "actor-sets"), and outputs the actor-sets. For example, the actor enumeration module 370 enumerates the managed servers 130, labeled devices 150, and the UDGs within the administrative domain state 320 and the possible label sets and assigns each a unique identifier (UID). These actor-sets can then be used in conjunction with UB portions and PB portions of rules and scopes, which specify actors using managed server UIDs, bound service group UIDs, UDG UIDs, and/or label sets.

The actor enumeration module 370 represents a diverse managed server 130 using multiple actors. The actor-set corresponding to a diverse managed server 130 includes an actor corresponding to the managed server's overall label set as well as an actor for each bound service group provided by the diverse managed server 130. A bound service group refers to one or more bound services having the same label set and provided by a particular managed server 130. The representation of an actor corresponding to a group of bound services includes the group's label set as well as a UID assigned to the group of bound services. If a diverse managed server 130 executes a distributed bound service, then the actor representing the diverse managed server's distributed bound service is the bound service group containing the distributed bound service.

Consider a logical management model that includes a set of N dimensions $D_i$ (i=1, . . . , N), and each dimension $D_i$ includes a set $S_i$ of possible values $V_j$ (j=1, . . . , $M_i$) (where the wildcard "*" is one of the possible values). In one embodiment, the actor enumeration module 370 enumerates all label sets that are possible based on the logical management model, which are equal to the Cartesian product given by $S_1 \times S_2 \times \ldots \times S_N$. The size of this set is $M_1 \times M_2 \times \ldots \times M_N$. The enumeration process collapses the multi-dimensional label space of the managed servers 130, bound service groups, and labeled devices 150 into a simple enumerated form.

In another embodiment, the actor enumeration module 370 enumerates only those label sets that are possible based on the administrative domain state 320 (e.g., based on descriptions of managed servers 130 and other actors within the administrative domain 180). For example, consider a logical management model that includes 2 dimensions (X and Y), and each dimension includes 3 possible values (A, B, and *). A managed server 130 with the label set "<X=A>,<Y=B>" can be a member of 4 possible label sets: 1) "<X=A>,<Y=B>", 2) "<X=A>,<Y=*>", 3) "<X=*>,<Y=B>", and 4) "<X=*>,<Y=*>". Note that the managed server's label set exists in 2-dimensional space (X and Y), while possible label sets 2, 3, and 4 are projections of the managed server's label set into sub-dimensional spaces (label set 2 is 1-dimensional space (X), label set 3 is 1-dimensional space (Y), and label set 4 is 0-dimensional space). So, the actor enumeration module 370 enumerates those 4 possible label sets. The managed server 130 with the label set "<X=A>,<Y=B>" cannot be a member of the label set "<X=A>,<Y=A>", so the actor enumeration module 370 does not enumerate that label set.

In yet another embodiment, the actor enumeration module 370 enumerates only those label sets that are used in the administrative domain-wide management policy 330 (e.g., in UB portions and PB portions of rules and scopes).

An actor-set includes a UID and zero or more actor-set records. An actor-set record includes a UID (either a managed server UID, a labeled device UID, a traffic midpoint device UID, a UDG UID, a bound service group UID), an identifier of the actor's operating system, and the actor's IP address given the specific BRN. For an actor that is a bound service group, the actor's operating system is the operating system executing the bound services, and the actor's IP address is the IP address of the managed server 130 providing the bound service group. For example, an actor-set might include actor-set records whose IP addresses correspond to all of the managed servers 130 covered by the label set of <Role, Database> and <Environment, Production>. As another example, an actor-set might include actor-set records whose IP addresses correspond to all of the unmanaged devices 140 in the Headquarters UDG. A single actor (e.g., managed server 130, unmanaged device 140, labeled device 150, bound service group, traffic midpoint device 160) can appear in multiple actor-sets.

Another factor in the actor-set calculation is actors with multiple ports (and/or network interfaces), plus the inclusion of network topology such as network address translation (NAT). So, there could be two actor-sets for the label set of <Role, Database> and <Environment, Production>: one actor-set with the internet-facing IP addresses of those managed servers 130 (i.e., associated with a first BRN), and a different actor-set for those same managed servers with the private network-facing IP addresses of those managed servers (i.e., associated with a second BRN).

In one embodiment, the actor enumeration module 370 can also update actor-sets based on changes to the administrative domain state 320. For example, the actor enumeration module 370 takes as input actor-sets (previously output by the actor enumeration module 370) and a change to a managed server's description (within the administrative domain state 320), generates updated actor-sets (which are consistent with the changed server description), and outputs the updated actor-sets. Similarly, a detected change of state in an unmanaged device 140, labeled device 150, or traffic midpoint device 160 triggers generation of updated actor-sets. A bound service group changes when the membership of a bound service group changes (e.g., removal of a constituent bound service, detection of an additional bound service having the same label set as the bound service group) or if the state of the managed server 130 providing the bound services of the bound service group changes. The actor enumeration module 370 generates the updated actor-sets in different ways depending on the type of change to the description of the actor (e.g., managed server 130, unmanaged device 140, labeled device 150, bound service group, traffic midpoint device 160).

Offline/online change—If the description change indicates that the actor went from online to offline, then the actor enumeration module 370 generates the updated actor-sets by removing the actor's actor-set record from all input actor-sets of which the actor was a member. If the description change indicates that the actor went from offline to online, then the actor enumeration module 370 generates the updated actor-sets by adding the actor's actor-set record to any relevant input actor-sets. (If necessary, the actor enumeration module 370 creates a new actor-set and adds the actor's actor-set record to that new actor-set.) A bound service group experiences an offline/online change when the managed server 130 providing the constituent bound services switches between online and offline states.

Label set change—If the description change indicates that the actor's label set changed, then the actor enumeration module 370 treats this like a first actor (with the old label set) going offline and a second actor (with the new label set) coming online. As an example, a change in the label set of any of a bound service group's constituent bound services triggers (1) a change in the membership of the bound service group and (2) an update to the corresponding actor record.

Network exposure information change—If the description change indicates that the actor removed a network interface or is associated with a different port, then the actor enumeration module 370 generates the updated actor-sets by removing the actor's actor-set record from all input actor-sets (associated with that network interface's BRN) of which the actor was a member. If the description change indicates that the actor added a network interface (or became associated with a new port), then the actor enumeration module 370 generates the updated actor-sets by adding the actor's actor-set record to any relevant input actor-sets (associated with that network interface's BRN or port's network address). (If necessary, the actor enumeration module 370 creates a new actor-set (associated with that network interface's BRN or port's address) and adds the actor's actor-set record to that new actor-set.) If the description change indicates that the actor changed a network interface's BRN, then the actor enumeration module 370 treats this like a first network interface (with the old BRN) being removed and a second network interface (with the new BRN) being added. If the description change indicates that the actor changed a network interface's IP address (but not the BRN), then the actor enumeration module 370 generates the updated actor-sets by modifying the actor's actor-set record in all input actor-sets (associated with that network interface's BRN) of which the actor was a member. In response to a change in the port assigned to a bound service (or to the port associated with a non-bound service), the actor enumeration module 370 updates the actor-set record of the bound service group corresponding to the bound service and the actor-set records of other actors communicating with the changed port.

The relevant actors module 380 takes as input one or more actor-sets (e.g., the managed servers 130, labeled devices 150, traffic midpoint devices 160, the UDGs, and bound service groups) within the administrative domain state 320 in enumerated form, and a set of rules (e.g., a management policy perspective), determines which actor-sets are relevant to those rules, and outputs only those actor-sets. This is a filtering process by which the relevant actors module 380 examines the actor-sets and extracts only the relevant actor-sets for the given set of rules. The relevant actors module 380 performs the filtering by iterating through all of the input actor-sets, analyzing the PB portions and UB portions of the input rules to determine whether a particular actor-set is referenced by any of the rules' PB portions or UB portions. The end result (referred to herein as an "actor perspective") is a collection of actor-sets. The actor perspective is later sent to a managed server 130 as part of the management instructions.

In one embodiment, the relevant actors module 380 uses the input set of rules to generate an "actor-set filter." The actor-set filter selects, from the input actor-sets, only the actor-sets that are relevant to the input rules. In other words, the relevant actors module 380 uses the actor-set filter to filter the input actor-sets into relevant actor-sets.

The policy engine module 340 generates management instructions for managed servers 130 and sends the generated management instructions to the servers. The policy engine module 340 generates the management instructions (using the relevant rules module 350, the function-level instruction generation module 360, the actor enumeration module 370, and the relevant actors module 380) based on a) the administrative domain state 320 and b) the administrative domain-wide management policy 330.

For example, the policy engine module 340 executes the relevant rules module 350, providing as input the administrative domain-wide management policy 330 and the UID of a particular managed server 130. The relevant rules module 350 outputs a set of rules that are relevant to that server (a "management policy perspective"). The policy engine module 340 executes the actor enumeration module 370, providing as input the administrative domain state 320. The actor enumeration module 370 outputs a representation of the descriptions of the managed servers 130, labeled devices 150, unmanaged device groups (UDGs), and bound service groups within the administrative domain state 320 in an enumerated form ("actor-sets"). The policy engine module 340 executes the function-level instruction generation module 360, providing as input the management policy perspective (output by the relevant rules module 350). The function-level instruction generation module 360 outputs function-level instructions. The policy engine module 340 executes the relevant actors module 380, providing as input the actor-sets (output by the enumeration module 370) and the management policy perspective (output by the relevant rules module 350). The relevant actors module 380 outputs only those actor-sets that are relevant to those rules ("relevant actor-sets"). The policy engine module 340 sends the function-level instructions (output by the function-level instruction generation module 360) and the relevant actor-sets (output by the relevant actors module 380) to the particular managed server 130.

In one embodiment, the policy engine module 340 caches information that was generated during the above process. For example, the policy engine module 340 caches, in association with the particular managed server 130, the management policy perspective, the function-level instructions, the actor-set filter, and/or the relevant actor-sets. As another example, the policy engine module 340 caches the administrative domain's actor-sets (which are not specific to a particular managed server 130). As another example, the policy engine module 340 caches the management policy perspective, the function-level instructions, the actor-set filter, and/or the relevant actor-sets in association with a particular bound service group.

Since an administrative domain's actor-sets are based on the administrative domain state 320, a change to the administrative domain state 320 can require a change to the administrative domain's actor-sets. Similarly, since a managed server's management instructions are based on the administrative domain state 320 and the administrative domain-wide management policy 330, a change to the administrative domain state 320 and/or a change to the administrative domain-wide management policy 330 can require a change to the managed server's management instructions. In one embodiment, the policy engine module 340 can update an administrative domain's actor-sets and/or update a managed server's management instructions and then distribute these changes (if necessary) to managed servers 130. The cached information mentioned above helps the policy engine module 340 more efficiently update the administrative domain's actor-sets and/or the managed server's management instructions and distribute the changes.

In one embodiment, the policy engine module 340 updates an administrative domain's actor-sets (based on a change to the administrative domain state 320) and distributes the changes to managed servers 130 as follows: The policy engine module 340 executes the actor enumeration module 370, providing as input the cached actor-sets (previously output by the actor enumeration module) and the changed portion of the administrative domain state 320 (e.g., a changed server description). The actor enumeration module 370 outputs the updated actor-sets. In one embodiment, the policy engine module 340 then sends all of the updated actor-sets to all of the managed servers 130 within the administrative domain 180. However, that embodiment is inefficient, since not all managed servers are affected by changes to all actor-sets.

In another embodiment, only selected actor-sets are sent to selected servers. For example, a particular managed server 130 is sent only those actor-sets that a) were previously sent to that server and b) have changed. The cached relevant actor-sets indicate which actor-sets were previously sent to that server (see (a) above). The policy engine module 340 compares the cached actor-sets to the updated actor-sets to determine which actor-sets have changed (see (b) above). The policy engine module 340 then computes the intersection of (a) and (b). Actor-sets in that intersection are sent to the particular managed server. In one embodiment, for even greater efficiency, actor-sets are sent in "diff" format, which describes differences between the cached actor-sets and the updated actor-sets. For example, the diff format specifies an actor-set identifier, an actor identifier (e.g., a managed server UID, labeled device UID, a UDG UID, traffic midpoint device UID, bound service group UID), and an indication of whether that actor should be added to, removed from, or modified within the actor-set.

In yet another embodiment, the two tables are organized by service groups, where an entry corresponding to a service group corresponds to either (a) a bound service group or (b) a managed server 130 (each entry corresponding to a managed server 130 signifies those services on the managed server 130 that are not bound services). A first table associates a service group with actor-sets of which that service group is a member. A second table associates a service group with actor-sets that are relevant to that service group (e.g., as determined by the relevant actors module 380). In these tables, a service group is represented by, e.g., an identifier (the managed server UID or the bound service group UID), and an actor-set is represented by, e.g., that actor-set's UID. The policy engine module 340 uses the changed portion of the administrative domain state 320 (e.g., the changed server description) to determine which managed server's description changed. The policy engine module 340 uses the first table to determine which actor-sets that service group was a member of. Those actor-sets might change as a result of the changed server description. So, the policy engine module 340 uses the second table to determine which service groups those actor-sets are relevant to. The policy engine module 340 performs the intersection computation described above for only those relevant service groups.

In one embodiment, the policy engine module 340 updates a managed server's management instructions (based on a change to the administrative domain state 320) and sends the updated management instructions to the managed server 130 as follows: The policy engine module 340 executes the relevant rules module 350, providing as input the administrative domain-wide management policy 330 and the UID of the managed server 130. If the managed server 130 provides bound services, the policy engine module 340 may also provide the UID of a bound service group provided by the managed server 130. The relevant rules module 350 outputs a set of rules that are relevant to that server (a "management policy perspective"). The policy engine module 340 compares the management policy perspective that was just output to the cached management policy perspective to determine whether they differ. If the just-output management policy perspective and the cached management policy perspective are identical, then the policy engine module 340 takes no further action. In this situation, the previously-generated managed server's management instructions (specifically, the function-level instructions and relevant actor-sets) are consistent with the change to the administrative domain state 320 and do not need to be re-generated and re-sent to the managed server 130.

If the just-output management policy perspective and the cached management policy perspective differ, then the policy engine module 340 determines which rules should be added to the cached perspective and which rules should be removed from the cached perspective. The policy engine module 340 executes the function-level instruction generation module 360, providing as input the rules to add and the rules to remove. The function-level instruction generation module 360 outputs function-level instructions to add and function-level instructions to remove (relative to the cached function-level instructions, which were previously sent to the managed server 130). The policy engine module 340 instructs the managed server 130 to add or remove the various function-level instructions, as appropriate. In one embodiment, for greater efficiency, function-level instructions are sent in "diff" format, which describes differences between the cached function-level instructions and the updated function-level instructions. For example, the diff format specifies a function-level instruction identifier and an indication of whether that function-level instruction should be added to or removed from the previously-sent function-level instructions.

The policy engine module 340 also executes the actor enumeration module 370, providing as input the cached actor-sets and the changed portion of the administrative domain state 320 (e.g., the changed server description). The actor enumeration module 370 outputs the updated actor-sets. The policy engine module 340 executes the relevant actors module 380, providing as input the updated actor-sets and the just-output management policy perspective. The relevant actors module 380 outputs only those updated actor-sets that are relevant to those rules ("updated relevant actor-sets").

The policy engine module 340 compares the updated relevant actor-sets to the cached relevant actor-sets to determine whether they differ. If the updated relevant actor-sets and the cached relevant actor-sets are identical, then the policy engine module 340 sends no actor-sets to the managed server 130. In this situation, the previously-generated relevant actor-sets are consistent with the change to the administrative domain state 320 and do not need to be re-sent to the managed server. If the updated relevant actor-sets and the cached relevant actor-sets differ, then the policy engine module 340 determines which actor-sets should be added, removed, or modified relative to the cached relevant actor-sets. The policy engine module 340 instructs the managed server to add, remove, or modify the various actor-sets, as appropriate. In one embodiment, for greater efficiency, actor-sets are sent in "diff" format, which describes differences between the cached relevant actor-sets and the updated relevant actor-sets. For example, the diff format specifies an actor-set identifier and an indication of whether that actor-set should be added to, removed from, or modified relative to the previously-sent actor-sets.

Recall that the policy engine module 340 can update a managed server's management instructions (based on a change to the administrative domain-wide management policy 330) and send the updated management instructions to the managed server 130. A change to the management policy 330 is, for example, the addition, removal, or modification of a rule or a rule set. In one embodiment, a change to the management policy 330 is generated by interaction with the global manager 120 via a GUI or API. In another embodiment, a change to the management policy 330 is generated by an automated process within the global manager 120 (e.g., in response to a security threat detected by the global manager). The policy engine module 340 updates the managed server's management instructions and sends the updated management instructions to the managed server 130 in a similar way, regardless of whether there was a change to the management policy 330 or a change to the administrative domain state 320. However, there are a few differences.

In the case of a change to the management policy 330, the policy engine module 340 does not necessarily update management instructions for all managed servers 130. Instead, the policy engine module 340 compares the previous management policy 330 to the new management policy 330 to determine which rules should be added, removed, or modified relative to the previous management policy 330. The policy engine module 340 determines which managed servers 130 are affected by the changed rules (e.g., which managed servers 130 or bound service groups are covered by (a) the rules' and/or scopes' PB and/or UB portions and (b) the rules' conditional portions (if any)). The policy engine module 340 executes the relevant rules module 350, providing as input the changed rules (instead of the entire new management policy 330) and the UID of the managed server 130 (for only those servers that are affected by the changed rules).

The administrative domain state update (ADSU) module 385 receives changes to the administrative domain state 320 and processes those changes. A change to the administrative domain state 320 is, for example, the addition, removal, or modification of a description of a managed server 130, bound service group, or labeled device 150 (including the modification of label set or configured characteristics) or a description of an unmanaged device 140 or unmanaged device group. In one embodiment, a change to the administrative domain state 320 originates in local state information received from a particular managed server 130. In another embodiment, a change to the administrative domain state 320 is generated by interaction with the global manager 120 via a GUI or API. In yet another embodiment, a change to the administrative domain state 320 is generated by an automated process within the global manager 120 (e.g., in response to a security threat detected by the global manager).

For example, the ADSU module 385 receives a change regarding a particular unmanaged device 140. The ADSU module 385 stores the new information in the administrative domain state 320 (e.g., as part of an unmanaged device group of which that particular unmanaged device is a member). The ADSU module 385 then updates the administrative domain's actor-sets based on the unmanaged device group change. Specifically, the ADSU module 385 instructs the policy engine module 340 to update the administrative domain's actor-sets. In one embodiment, the ADSU module 385 waits for an event to occur before instructing the policy engine module 340 to update the administrative domain's actor-sets. This event can be, for example, receipt of a user command or occurrence of a specified maintenance window.

As another example, the ADSU module 385 receives a change regarding a particular bound service group on a managed server 130. The ADSU module 385 stores the new information in the administrative domain state 320 as part of the description of that particular managed server 130. The ADSU module 385 then (optionally) analyzes that bound service group's description to determine additional information regarding the bound service group and stores that information in the description. Additionally, if the description of the managed server 130 providing the bound service group changes or if the description of the bound service group changes, then the ADSU module 385 analyzes the change and determines if the change affects the administrative domain's actor-sets and/or the corresponding managed server's management instructions. If the ADSU module 385 determines to update the administrative domain's actor-sets, then the ADSU module 385 instructs the policy engine module 340 to update the administrative domain's actor-sets. In one embodiment, the ADSU module 385 waits for an event to occur before instructing the policy engine module 340 to update the administrative domain's actor-sets. If the ADSU module 385 determines to update the corresponding managed server's management instructions, then the ADSU module 385 instructs the policy engine module 340 to update the managed server's management instructions. In one embodiment, the ADSU module 385 waits for an event to occur before instructing the policy engine module 340 to update the managed server's management instructions. The aforementioned events can be, for example, receipt of a user command or occurrence of a specified maintenance window.

Whether or not the ADSU module 385 determines to update the administrative domain's actor-sets and/or the managed server's management instructions depends on the type of change to the managed server's description (or the description of bound services provided by the managed server 130). In one embodiment, the ADSU module 385 makes this determination as shown in Table 2:

TABLE 2

Whether to update administrative domain's actor-sets and/or managed server's management instructions based on type of server description change

| Type of Change | Whether to Update |
|---|---|
| Online to offline | Administrative domain's actor-sets: Yes<br>Managed server's management instructions: No |
| Offline to online | Administrative domain's actor-sets: Yes<br>Managed server's management instructions: Yes |
| Label set | Administrative domain's actor-sets: Yes<br>Managed server's management instructions: Yes |
| Configured characteristic | Administrative domain's actor-sets: Yes<br>Managed server's management instructions: Yes |
| Network exposure info | Administrative domain's actor-sets: Yes<br>Managed server's management instructions: Yes (unless IP address is the only change) |
| Service info (on managed server 130 without bound services) | Administrative domain's actor-sets: No<br>Managed server's management instructions: Yes (only in specified situations) |
| Service info (on managed server 130 with bound services) | Administrative domain's actor-sets: Yes<br>Managed server's management instructions: Yes |

In one embodiment, the ADSU module 385 determines additional information regarding the server by executing the label/configured characteristic engine and providing the server's description as input. The label/CC engine calculates labels/CC values for the server (and for bound services it provides) based on the server's description, the description of any bound services, and label/CC assignment rules. One embodiment of a labeling engine is described with respect to FIG. 9. In another embodiment, the ADSU module 385 determines whether the server is behind a network address translator (NAT) (and, if it is behind a NAT, what type of NAT—1:1 or 1:N).

Figure 9:
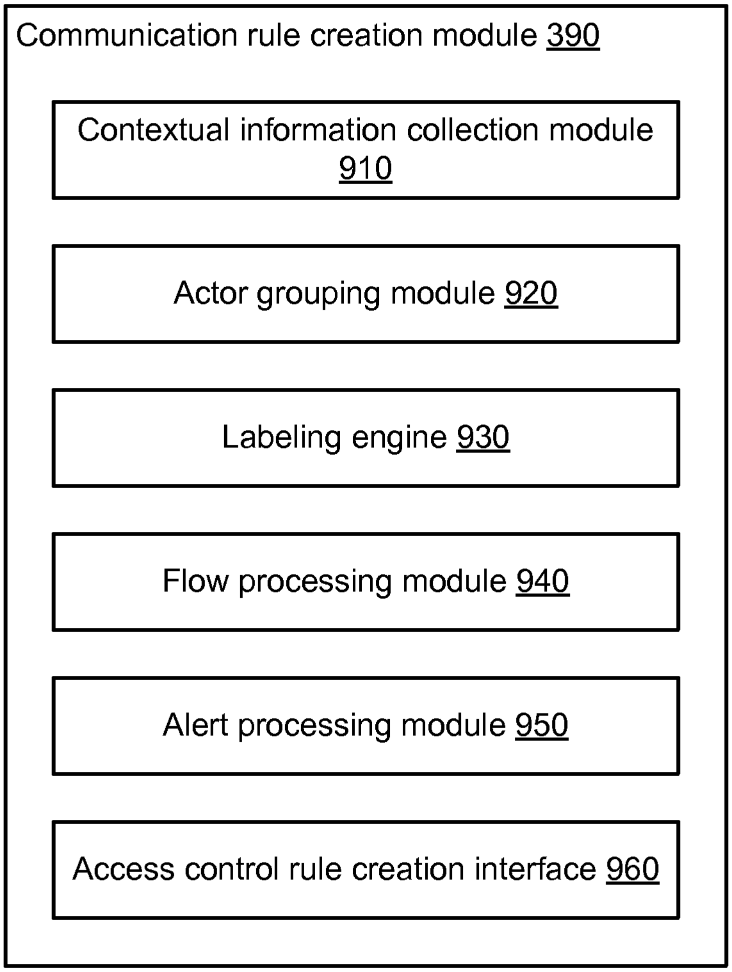
FIG. 9 is a high-level block diagram illustrating a detailed view of a communication rule creation module of a global manager, according to one embodiment.

The communication rule creation module 390 is described below in the section entitled "Access Control Rules" and with respect to FIG. 9.

The midpoint device management module 395 is described below in the section entitled "End-to-end communication policy" and with respect to FIGS. 10-14.

Policy Implementation Module

Figure 4:
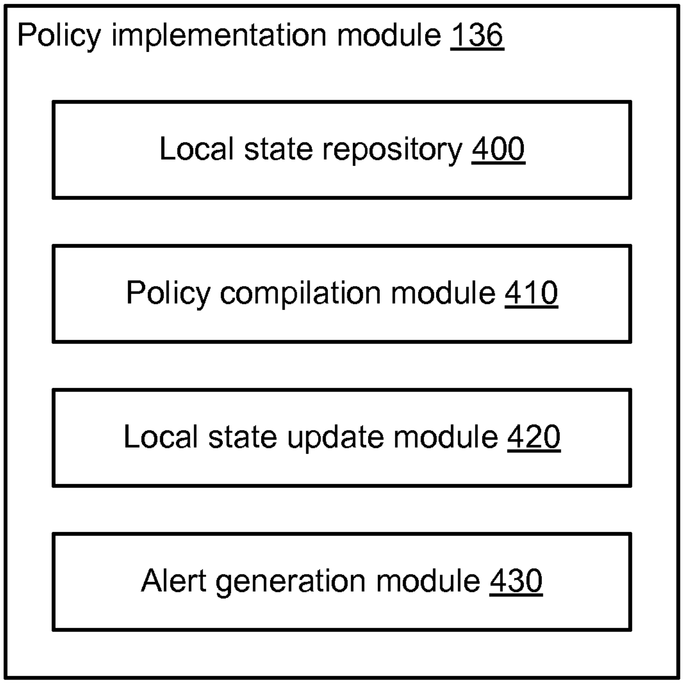
FIG. 4 is a high-level block diagram illustrating a detailed view of a policy implementation module of a managed server, according to one embodiment.

FIG. 4 is a high-level block diagram illustrating a detailed view of a policy implementation module 136 of a managed server 130, according to one embodiment. The policy implementation module 136 includes a local state repository 400, a policy compilation module 410, a local state update module 420, and an alert generation module 430. The local state repository 400 stores information regarding the local state of the managed server 130. In one embodiment, the local state repository 400 stores information regarding the managed server's operating system (OS), network exposure, and services. OS information includes, for example, an indication of which OS is running. Network exposure information and service information were described above with respect to a description of a managed server 130 within the administrative domain state 320.

The policy compilation module 410 takes as input management instructions and state of a managed server 130 and generates a management module configuration 134. For example, the management instructions are received from the global manager 120 and include function-level instructions (generated by the function-level instruction generation module 360) and relevant actor-sets (output by the relevant actors module 380). The state of the managed server 130 is retrieved from the local state repository 400. In one embodiment, execution of the policy compilation module 410 is triggered by a) the managed server powering up or coming online, b) the managed server receiving management instructions, and/or c) the contents of the local state repository 400 changing.

The policy compilation module 410 maps the function-level instructions and relevant actor-sets into a management module configuration 134. For example, the policy compilation module 410 maps an access control function-level instruction (which contains a port and an actor-set reference) into an iptables entry and an ipset entry in the Linux operating system or a Windows Filtering Platform (WFP) rule in the Windows operating system.

The application of management policy at a managed server 130 can be affected by the local state of that server. In one embodiment, the policy compilation module 410 evaluates a condition associated with a received function-level instruction and generates the management module configuration 134 based on the result of that evaluation. For example, the policy compilation module 410 evaluates a condition that references the operating system of the managed server's peer (i.e., the other actor in the relationship) and selects function profile attributes based on the result of that evaluation, where the selected function profile attributes are expressed in the management module configuration 134.

As another example, recall that a managed server 130 can receive a function-level instruction that turns out to be irrelevant for that server. For example, the rule includes a portion that specifies the managed server's local state (e.g., a service portion that describes the provided service). Since the global manager 120 does not know the managed server's local state (e.g., whether the managed server is actually providing that service), the generated function-level instruction is sent to the managed server. The policy compilation module 410 checks the managed server's local state (e.g., determines whether the managed server 130 is providing that service). This determination amounts to evaluating a condition that references the managed server's local state. The policy compilation module 410 processes the function-level instruction accordingly. If the policy compilation module 410 determines that the condition evaluates to "true" (e.g., the managed server 130 is providing that service), then the policy compilation module 410 incorporates that function-level instruction into the management module configuration 134. Specifically, the policy compilation module 410 incorporates function-level instructions into the management module configuration 134 only after evaluating the associated condition (which concerns the local state of that server). If the evaluation of the condition is false, then the policy compilation module 410 does not express the function-level instructions in the management module configuration 134. The specific conditions (e.g., their nature and particular values) are extensible. In one embodiment, the conditions are related to the definition of a "service" and include process information and/or package information (described above with respect to a description of a managed server 130 within the administrative domain state 320).

For example, consider a function-level instruction that allows access to only the Apache service inbound on port 80 (i.e., where the managed server 130 is the "provider" or endpoint). The managed server 130 expresses this function-level instruction in the management module configuration 134 to allow access on port 80 only after evaluating the associated condition, which concerns whether the application (executing on that server) that is listening on port 80 is actually Apache and not some other application (rogue or otherwise). The managed server 130 expresses this function-level instruction in the management module configuration 134 only after determining that the associated condition evaluates to "true." If the associated condition evaluates to "false", then the managed server 130 does not express this function-level instruction in the management module configuration 134. As a result, the network traffic is blocked.

In one embodiment, a managed server 130 monitors its outbound connections. The managed server 130 compares outbound network traffic to its internal process table to determine which processes in that table are establishing those outbound connections. The managed server 130 can enforce a rule that allows only certain processes (given a set of requirements, mentioned above as "process information") to establish an outbound connection.

In one embodiment (not shown), the policy compilation module 410 is located at the global manager 120 instead of at the managed server 130. In that embodiment, the global manager 120 does not send management instructions to the managed server 130. Instead, the managed server 130 sends its local state to the global manager 120. After the policy compilation module 410 generates the management module configuration 134 (at the global manager 120), the management module configuration 134 is sent from the global manager 120 to the managed server 130.

The local state update (LSU) module 420 monitors the local state of the managed server 130 and sends local state information to the global manager 120. In one embodiment, the LSU module 420 determines an initial local state of the managed server 130, stores appropriate local state information in the local state repository 400, and sends that local state information to the global manager 120. The LSU module 420 determines the local state of the managed server 130 by inspecting various parts of the server's operating system (OS) and/or file system. For example, the LSU module 420 obtains service information from the OS' kernel tables (networking information), the OS' system tables (package information), and the file system (files and hash values). The LSU module 420 obtains network exposure information from the OS' kernel and and/or OS-level data structures.

After the LSU module 420 sends the initial local state information to the global manager 120, the LSU module monitors changes to the local state. The LSU module monitors changes by, for example, polling (e.g., performing inspections periodically) or listening (e.g., subscribing to an event stream). The LSU module 420 compares recently-obtained local state information to information already stored in the local state repository 400. If the information matches, then the LSU module 420 takes no further action (until local state information is obtained again). If they differ, then the LSU module 420 stores the recently-obtained information in the local state repository 400, executes the policy compilation module 410 to re-generate the management module configuration 134 (and re-configures the management module 132 accordingly), and notifies the global manager 120 of the change. In one embodiment, the LSU module 420 sends changes to local state information to the global manager 120 in "diff" format, which describes differences between the local state information that was previously stored in the local state repository 400 (and, therefore, previously sent to the global manager 120) and the recently-obtained local state information. For example, the diff format specifies a type of local state information (e.g., operating system) and a new value for that information type. In another embodiment, the LSU module 420 sends the entire contents of the local state repository 400 to the global manager 120.

The alert generation module 430 is described below in the section entitled "Access Control Rules."

Generating Management Instructions

Figure 5:
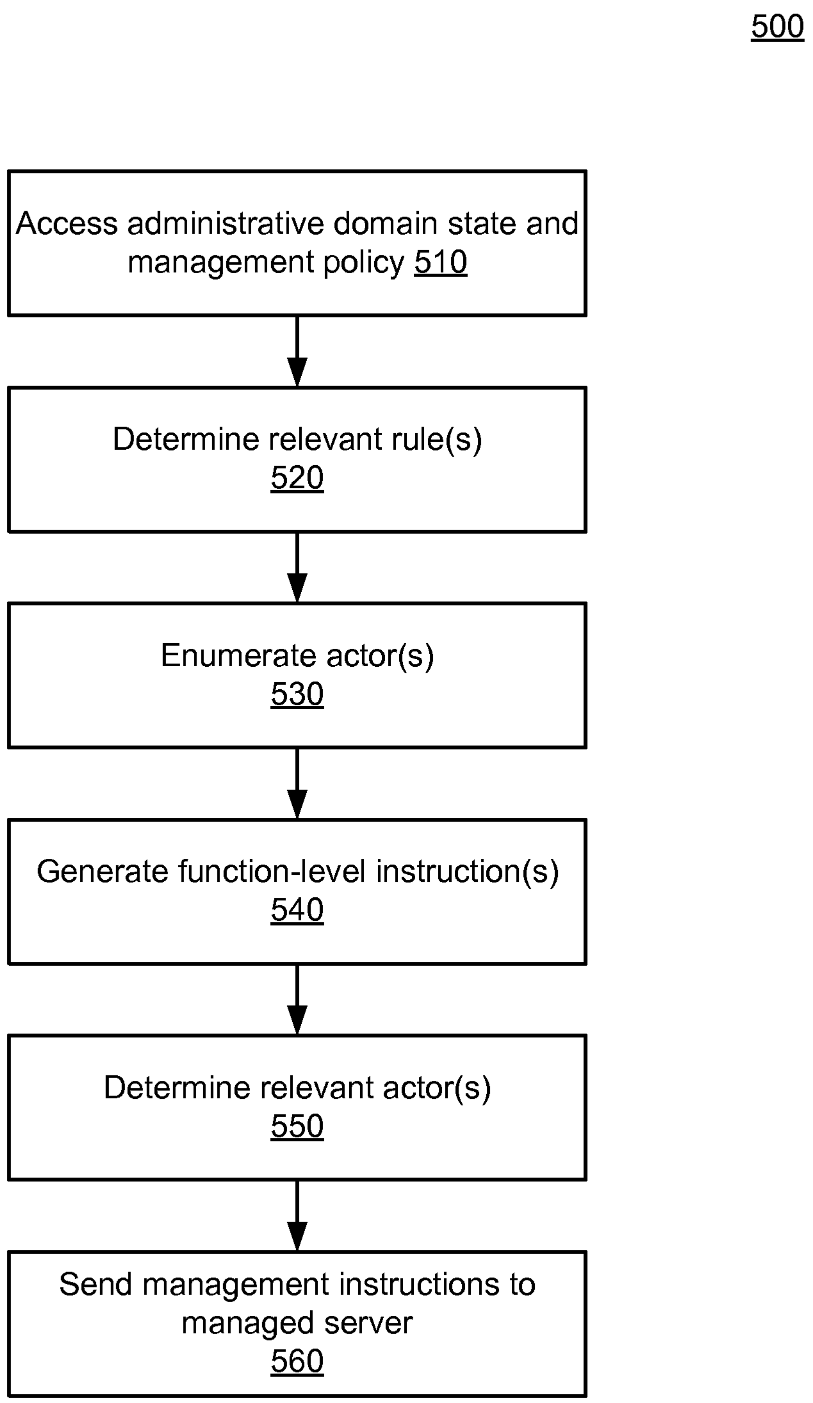
FIG. 5 is a flowchart illustrating a method of generating management instructions for a particular managed server, according to one embodiment.

FIG. 5 is a flowchart illustrating a method 500 of generating management instructions for a particular service group on a particular managed server 130, according to one embodiment. Recall that a service group refers to (a) a bound service group or (b) those services on the managed server 130 that are not bound services. Other embodiments can perform the steps in different orders and can include different and/or additional steps. In addition, some or all of the steps can be performed by entities other than those shown in FIG. 1. In one embodiment, the method 500 is executed multiple times (e.g., once for each managed server 130 in an administrative domain 180).

When the method 500 starts, the administrative domain state 320 and an administrative domain-wide management policy 330 have already been stored in the repository 300 of the global manager 120. At this point, the method 500 begins.

In step 510, the administrative domain state 320 and the administrative domain-wide management policy 330 are accessed. For example, the policy engine module 340 sends a request to the repository 300 and receives the administrative domain state 320 and the administrative domain-wide management policy 330 in response.

In step 520, one or more relevant rules are determined. For example, the policy engine module 340 executes the relevant rules module 350, providing as input the administrative domain-wide management policy 330, the UID of the particular managed server 130, and a UID of a traffic midpoint device 160. The relevant rules module 350 outputs a set of rules that are relevant to both the managed server 130 and traffic midpoint device 160 (management policy perspective).

In step 530, actors are enumerated. For example, the policy engine module 340 executes the actor enumeration module 370, providing as input the administrative domain state 320. The actor enumeration module 370 generates a representation of the managed servers 130, labeled devices 150, traffic midpoint devices 160, unmanaged device groups (UDGs), and bound service groups within the administrative domain state 320 in an enumerated form (actor-sets).

In step 540, one or more function-level instructions are generated. For example, the policy engine module 340 executes the function-level instruction generation module 360, providing as input the management policy perspective (generated in step 520). The function-level instruction generation module 360 generates function-level instructions relevant to the input managed server 130 and traffic midpoint device 160.

In step 550, one or more relevant actors are determined. For example, the policy engine module 340 executes the relevant actors module 380, providing as input the actor-sets (generated in step 530) and the management policy perspective (generated in step 520). The relevant actors module 380 outputs only those actor-sets that are relevant to those rules (relevant actor-sets).

In step 560, management instructions are sent to the particular managed server 130. For example, the policy engine module 340 sends the function-level instructions (generated in step 540) and the relevant actor-sets (generated in step 550) to the particular managed server 130.

Note that steps 520 and 540 concern generating the management policy perspective (and resulting function-level instructions) for a particular managed server 130 in communication with a particular traffic midpoint device 160, while steps 530 and 550 concern generating the actor perspective for these devices. The generation of the management policy perspective and the generation of the actor perspective are minimally dependent on each other, since step 520 generates a set of rules that is used by step 550. Even so, keeping the management policy calculations (i.e., steps 520 and 540) and the actor-set calculations (i.e., steps 530 and 550) separate enhances the scalability of the policy engine module 340. Since the management policy calculations and the actor-set calculations are kept mostly separate, they can be performed in parallel (e.g., for different combinations of a particular managed server 130 with different traffic midpoint devices 160). In addition, perspective calculations for different managed servers 130 can also be performed in parallel. Also, if an actor changes, then only the actor-sets need to be recalculated. (The function-level instructions do not need to be recalculated.) If a rule changes, then only the function-level instructions and the relevant actor-sets need to be recalculated. (The actors do not need to be re-enumerated.)

Configuring the Management Module

Figure 6:
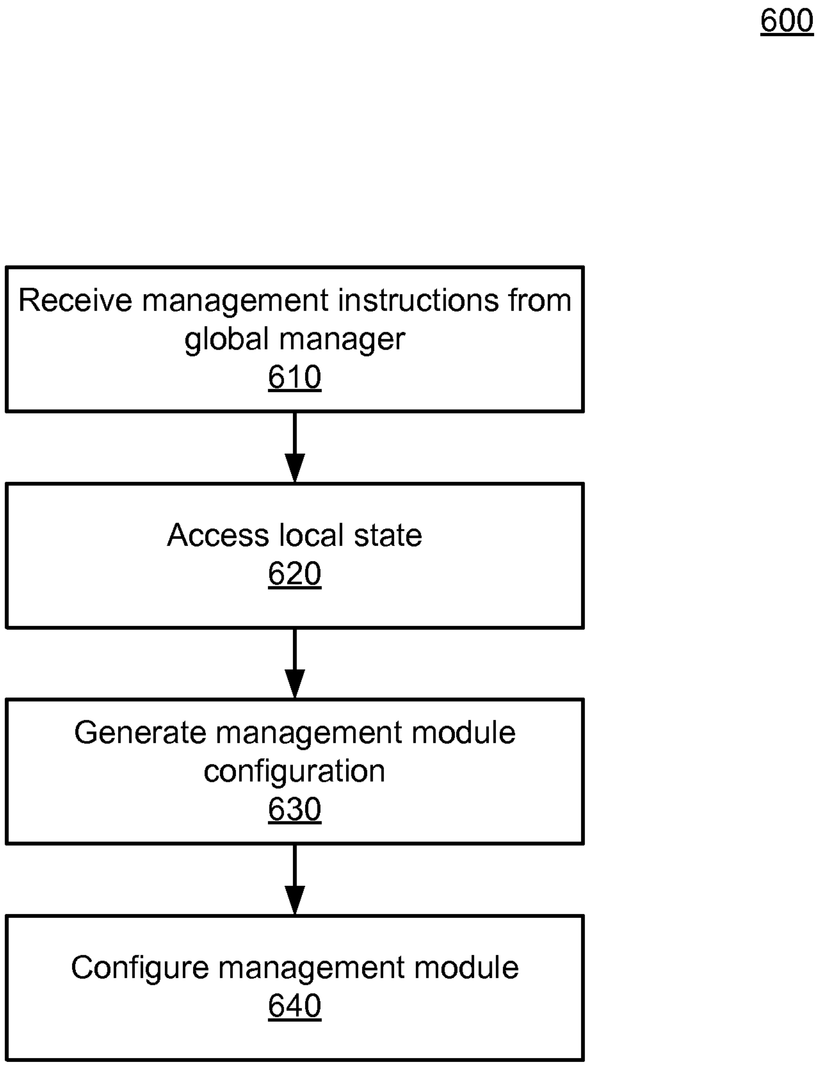
FIG. 6 is a flowchart illustrating a method of generating a configuration for a management module of a managed server, according to one embodiment.

FIG. 6 is a flowchart illustrating a method 600 of generating a configuration 134 for a management module 132 of a managed server 130, according to one embodiment. Other embodiments can perform the steps in different orders and can include different and/or additional steps. In addition, some or all of the steps can be performed by entities other than those shown in FIG. 1.

When the method 600 starts, information regarding the local state of the managed server 130 has already been stored in the local state repository 400 of the policy implementation module 136 in the managed server 130. At this point, the method 600 begins.

In step 610, management instructions are received from the global manager 120. For example, the policy compilation module 410 receives function-level instructions and relevant actor-sets from the global manager 120.

In step 620, the local state is accessed. For example, the policy compilation module 410 accesses information regarding the local state of the managed server 130 that is stored in the local state repository 400.

In step 630, a management module configuration 134 is generated. For example, the policy compilation module 410 takes as input the management instructions (received in step 610) and the local state (accessed in step 620) and generates a management module configuration 134.

In step 640, a management module 132 is configured. For example, the policy compilation module 410 configures the management module 132 to operate in accordance with the management module configuration 134 (generated in step 630).

Monitoring a Managed Server

Figure 7:
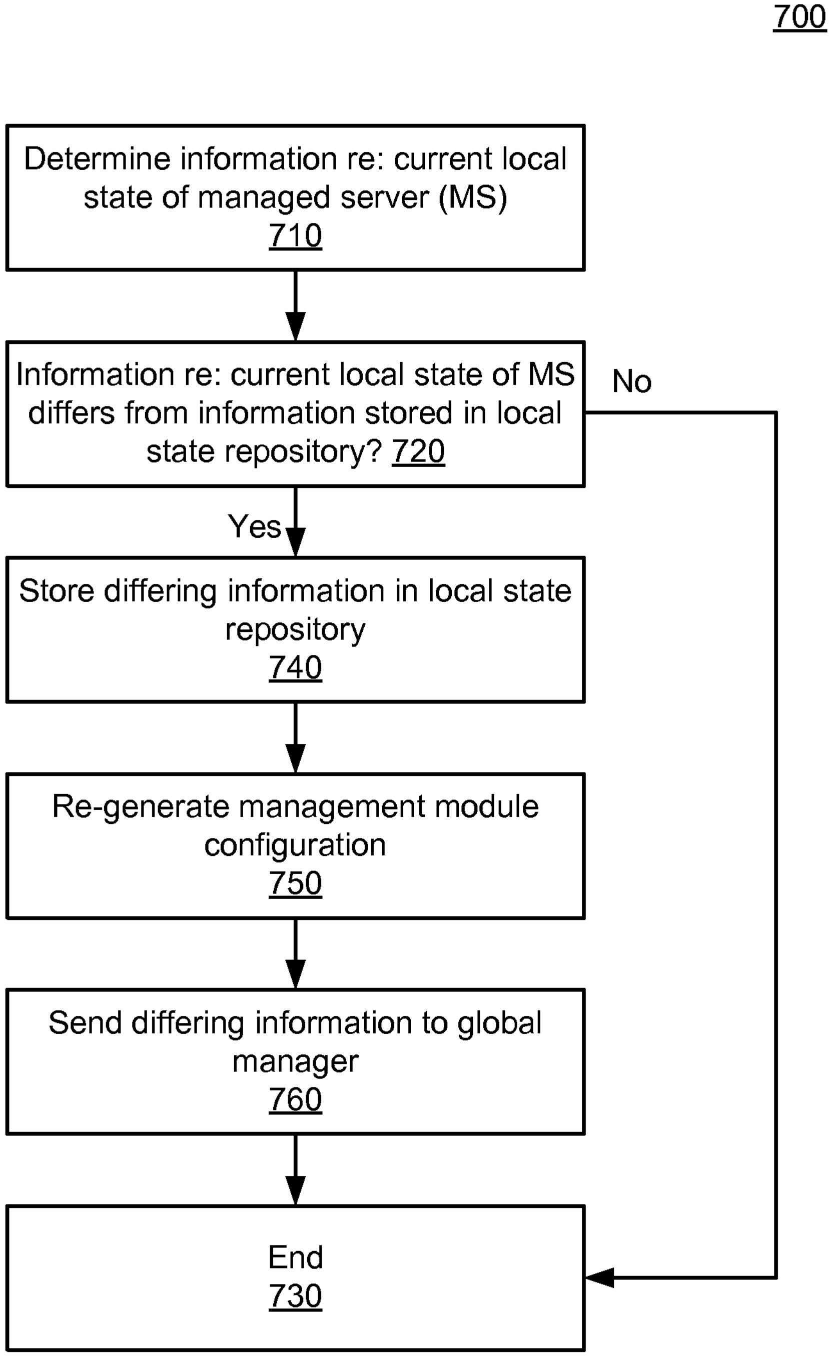
FIG. 7 is a flowchart illustrating a method of monitoring local state of a managed server and sending local state information to a global manager, according to one embodiment.

FIG. 7 is a flowchart illustrating a method 700 of monitoring local state of a managed server 130 and sending local state information to a global manager 120, according to one embodiment. Other embodiments can perform the steps in different orders and can include different and/or additional steps. In addition, some or all of the steps can be performed by entities other than those shown in FIG. 1.

When the method 700 starts, information regarding local state of the managed server 130 has already been stored in the local state repository 400 of the managed server 130. At this point, the method 700 begins.

In step 710, information regarding the current local state of the managed server 130 is determined. For example, the LSU module 420 determines the local state of the managed server 130 by inspecting various parts of the server's operating system (OS) and/or file system to determine services or bound services executed by the managed server 130.

In step 720, a determination is performed regarding whether information regarding the current local state differs from information stored in the local state repository 400. For example, the LSU module 420 performs this determination. If the information does not differ, then the method proceeds to step 730 and ends. If the information does differ, then the method proceeds to step 740.

In step 740, the differing information is stored in the local state repository 400. For example, the LSU module 420 performs this step.

In step 750, the management module configuration 134 is re-generated (because the contents of the local state repository 400 have changed), and the management module 132 is re-configured accordingly. For example, the LSU module 420 executes the policy compilation module 410, which re-generates the management module configuration 134.

In step 760, the differing information is sent to the global manager 120. For example, the LSU module 420 performs this step.

Updating the Administrative Domain State

Figure 8:
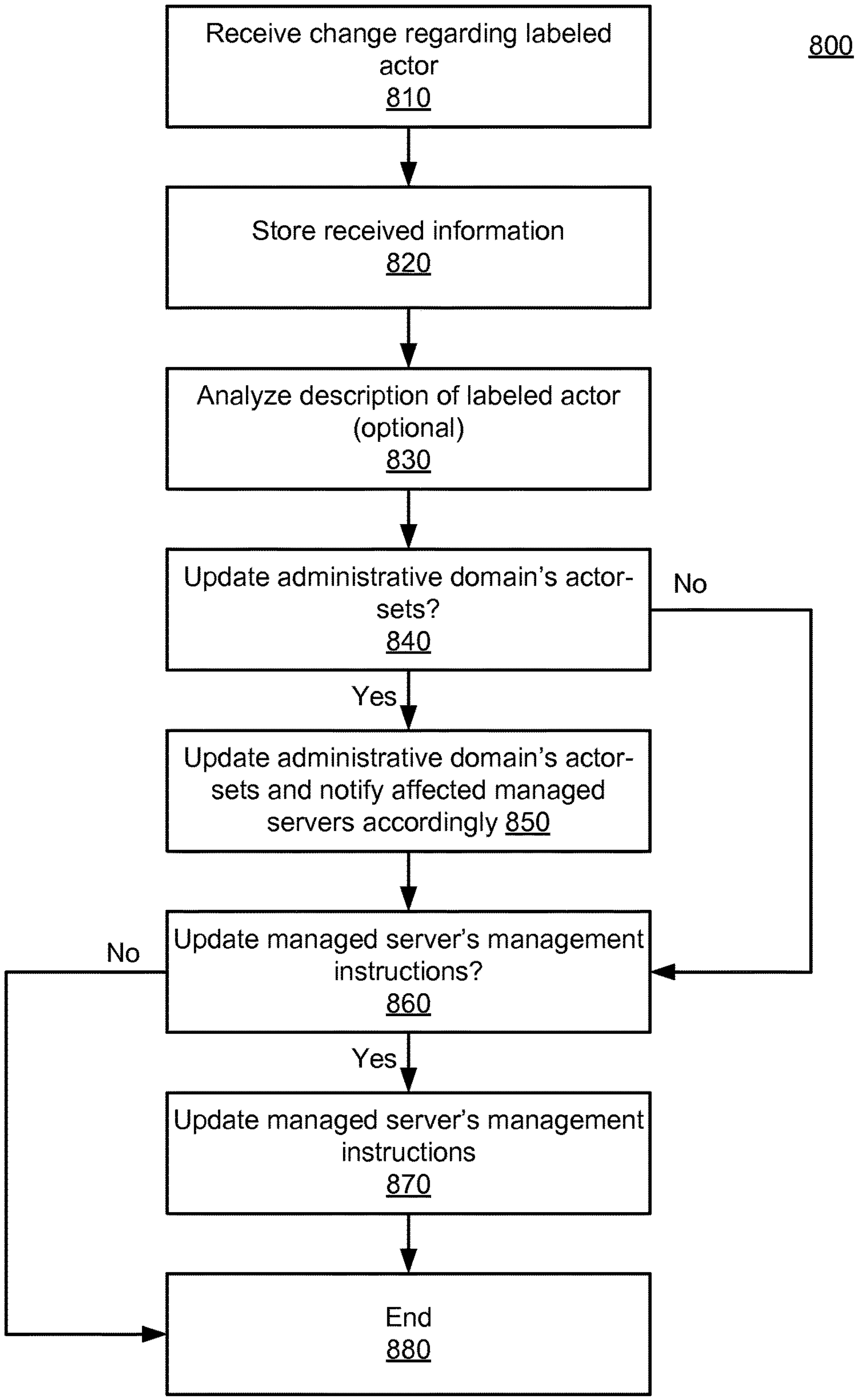
FIG. 8 is a flowchart illustrating a method of processing a change to the state of an administrative domain's computer network infrastructure, according to one embodiment.

FIG. 8 is a flowchart illustrating a method 800 of processing a change to the state 320 of an administrative domain's computer network infrastructure, according to one embodiment. Other embodiments can perform the steps in different orders and can include different and/or additional steps. In addition, some or all of the steps can be performed by entities other than those shown in FIG. 1.

In step 810, a change regarding a particular managed server 130 is received. For example, the administrative domain state update (ADSU) module 385 receives an online/offline indicator, an operating system indicator, network exposure information, and/or service information from the managed server 130 as part of local state information. As another example, the ADSU module 385 receives information from a traffic midpoint device 160 indicating that the traffic midpoint device's security configuration, online/offline status, or utilization settings have been changed. The change may also regard another actor such as an unmanaged device 140 or a labeled device 150.

In step 820, the received information is stored. For example, the ADSU module 385 stores the received online/offline indicator, network exposure information, and/or service information in the administrative domain state 320 (specifically, in the description of the managed server 130 or traffic midpoint device 160 to which the information pertains).

In step 830, the server description is analyzed to determine additional information regarding the server. For example, the ADSU module 385 uses a label/configured characteristic engine to calculate labels/CC values for the managed server 130, and/or determines whether the server is behind a network address translator (NAT) (and, if it is behind a NAT, what type of NAT—1:1 or 1:N), and stores that information in the server description. Alternatively or additionally, the NAT information may be received directly from the relevant traffic midpoint device 160. The ADSU module 385 may also use a label/configured characteristic engine to calculate labels/CC values for a labeled device 150 when the state of the labeled device changes. Step 830 is optional.

In step 840, a determination is made regarding whether to update the administrative domain's actor-sets. For example, the ADSU module 385 determines whether to update the administrative domain's actor-sets based on a change to the managed server's description. As another example, the ADSU module 385 determines whether to update the administrative domain's actor-sets based on a change to a labeled device's description or traffic midpoint device's description. If a determination is made to update the administrative domain's actor-sets, then the method proceeds to step 850. If a determination is made not to update the administrative domain's actor-sets, then the method proceeds to step 860.

In step 850, the administrative domain's actor-sets are updated. For example, the ADSU module 385 instructs the policy engine module 340 to update the administrative domain's actor-sets and notify affected managed servers 130 accordingly. In one embodiment (not shown), the ADSU module 385 waits for an event to occur before instructing the policy engine module 340 to update the administrative domain's actor-sets.

In step 860, a determination is made regarding whether to update the managed server's management instructions. For example, the ADSU module 385 determines whether to update the managed server's management instructions based on a change to the managed server's description or a change to the traffic midpoint device's description. If a determination is made to update the managed server's management instructions, then the method proceeds to step 870. If a determination is made not to update the managed server's management instructions, then the method proceeds to step 880.

In step 870, the managed server's management instructions are updated. For example, the ADSU module 385 instructs the policy engine module 340 to update the managed server's management instructions. In one embodiment (not shown), the ADSU module 385 waits for an event to occur before instructing the policy engine module 340 to update the managed server's management instructions. Updating the managed server's management instructions may also include modifying a configuration of a traffic midpoint device 160 to ensure enforcement of a rule by both a managed server 130 and the traffic midpoint device 160 on either side of a segment.

In step 880, the method 800 ends.

Communication Rules

Recall that the administrative domain-wide management policy 330 of the global manager 120 includes a set of communication rules 335. The set of communication rules 335 contains one or more communication rules, which are rules that control communication between two actors of the administrative domain. Example rules in the set of communication rules 335 include rules having a rule function specifying permissible communications (referred to herein as "access control rules"), rules having a rule function mandating encryption of communication (referred to herein as "encryption rules"), and rules having a rule function regulating bandwidth-usage (referred to herein as "bandwidth rules"). Other example communication rules are possible, such as a rule specifying a Layer-7 service to apply to a communication.

Broadly, a communication rule authorizes communication between a first actor (e.g., a managed server 130, a traffic midpoint device 160, a bound service) and a second actor (e.g., another managed server 130, another bound service, an unmanaged device 140, a labeled device 150, another traffic midpoint device 160, or a device external to the administrative domain 180). A communication rule specifies a provided-by (PB) portion, a used-by (UB) portion, a service. For example, an access control rule specifies whether a consumer specified by the UB portion may use a service from a provider specified by the PB portion. In one embodiment, the access control rules are used in a pure "whitelist" model in which a consumer may access a service on a provider only if the set of access control rules 335 includes an access control rule with matching PB, UB, and service portions. As another example, an encryption rule mandates a particular type of encryption for communication between a consumer and provider of a service specified by the rule.

A communication rule may only partially specify the PB, UB, and service portions by using a wildcard in place of one or more portions. For example, if an access control rule has a UB portion that specifies a wildcard, then any managed server 130, unmanaged device 140, labeled device 150, traffic midpoint device 160, or other device external to the administrative domain 180 may access the service. The PB and UB portions may specify one or more particular actors (e.g., using managed server UIDs, bound service group UIDs, or UDG UIDs), one or more label sets, or a combination thereof. If the PB or UB portion specifies the UID of a distributed bound service, then the PB or UB portion is equivalent to a PB or UB portion that specifies the UIDs of the managed servers 130 executing the instances of the distributed bound service. An example access control rule has a PB portion indicating a particular managed server 130 and a UB portion indicating the label set <Role, Database Server> and <Environment, Production>. The example access control rule allows managed servers 130 having a "Database Server" role and belonging to the "Production" environment to access the service at the particular managed server 130. The example access control rule also allows a bound service having the "Database Server" role and belonging to the "Production" environment to access the service even in the bound service is provided by a managed server 130 having a label set with values for the role and environment dimensions.

Recall that the policy implementation module 136 of a managed server 130 includes an alert generation module 430. The alert generation module 430 monitors communication (also referred to as "network traffic") between the managed server 130 and other actors (managed servers 130, unmanaged devices 140, labeled devices 150, bound service groups, or devices external to the administrative domain 180) for compliance with access control rules contained in the management module configuration 134. The alert generation module 430 generates an alert in response to detecting a communication that does not comply with the access control rules (referred to as an "unauthorized communication") and sends the alert to the global manager 120, where the alert is processed by the communication rule creation module 390 (specifically, by the alert processing module 950). An unauthorized communication includes an attempt by a consumer to use a service provided by the managed server 130 as well as an attempt by the managed server 130 to use a service provided by another actor. For example, an attempt to send network traffic to or receive network traffic from a port associated with a service can be an unauthorized communication. In an embodiment where the access control rules serve as a whitelist of permissible activities, the management module 132 allows attempted communication that matches an access control rule and denies attempted communication that does not match an access control rule.

When the management module 132 denies or blocks communication to or from the managed server 130, the alert generation module 430 generates an alert. The alert describes the service, the provider of the service (e.g., using the UID or label set of the relevant actor), and the consumer of the service (e.g., using the UID or label set of the relevant actor) corresponding to the communication. The alert may contain relevant service information about the service as well as network exposure information about the provider and consumer. The alert may contain communication information that describes characteristics of the communication. Communication information may include timing, duration, frequency, protocol type, data size (e.g., total size, packet size), or data rate of the attempted communication. For example, the communication information differentiates between a single attempt to access a service and repeated attempts to access the service. Communication information may also describe routing information of communication such as source address, destination address, and path information (e.g., load balancers or other traffic midpoint devices 160 routing the unauthorized communication).

Communication Rule Creation Module

Recall that the processing server 310 of the global manager 120 includes a communication rule creation module 390. FIG. 9 is a high-level block diagram illustrating a detailed view of the communication rule creation module 390 of the global manager 120, according to one embodiment. The communication rule creation module 390 includes a contextual information collection module 910, a bound service identification module 915, an actor grouping module 920, a labeling engine 930, a flow processing module 940, an alert processing module 950, and an access control rule (ACR) creation interface 960.

The contextual information collection module 910 obtains contextual information describing actors in the administrative domain 180 (managed servers 130, unmanaged devices 140, labeled devices 150, traffic midpoint devices 160, bound services) and describing communication sent or received by actors in the administrative domain 180. The contextual information collection module 910 may also obtain service information describing individual services on individual devices. Contextual information includes managed server information, service information, unmanaged device information, external device information, communication information, and administrative domain information.

Managed server information describes characteristics of a managed server 130. Managed server information includes service information such as process information and package information, as described above with respect to the administrative domain state 320. Managed server information may describe identifiers (e.g., UID, internet protocol (IP) address, media access control (MAC) address, host name), hardware resources (e.g., processor type, processor throughput, processor load, total memory, available memory, network interface devices, storage device type), or managed server type (e.g., physical device, cloud-provided virtual device, virtual machine, Linux container). Managed server information may describe software resources, such as the operating system and other software described by process information and package information.

The contextual information module 910 obtains service information from managed servers 130 about services executing on the managed servers 130. In some embodiments, the contextual information module 910 obtains service information about services without information indicating whether the services are bound services. In other embodiments, the contextual information module 910 obtains a list of bound services and aggregates information from bound services and/or bound service groups. Since the contextual information collection module 910 may obtain bound service information before or after bound services are labeled and sorted into bound service groups, bound service information may be on a per-bound service basis or a per-bound service group basis. Such bound service information includes process and package information of constituent bound services, the bound service UID, as well as managed server information of the managed server 130 providing the bound services of the bound service group as well as any environment information associated with the managed server 130. Bound service information may also specify ports used by the bound service on the managed server 130, where the specified ports override the ports typically assigned to the bound service. For a distributed bound service, the bound service information includes pointers (such as UIDs) to the managed servers 130 providing the distributed bound service.

A virtualized or cloud-based managed server 130 is also associated with environment information, which describes the provider of the managed server 130 (e.g., a proprietary data center, a third-party private data center, a cloud provider) as well as the communication protocol (e.g., encapsulation information, network address, network address translation) to communicate with the provider. Managed server information about a managed server 130 is stored in the managed server's local state repository 400 and sent to the global manager 120 for processing by the contextual information collection module 910. To retrieve managed server information from a virtualized or cloud-based managed server 130, the contextual information collection module 910 may query the cloud service provider or the software providing the virtual server to send managed server information or other contextual information.

Unmanaged device information describes characteristics of unmanaged devices 140, labeled devices 150, and traffic midpoint devices 160. Unmanaged device information includes network exposure information (as described above with respect to the administrative domain state 320), identifiers (e.g., UDG UID, IP address, MAC address, device name), hardware resources, software resources, or network connectivity (e.g., available ports, mapping between ports and services) of an unmanaged device 140 or labeled device 150. A managed server 130 may collect unmanaged device information about traffic midpoint devices 160 (or labeled devices 150) that communicate with the managed server 130 and send the unmanaged device information to the global manager 120 for processing by the contextual information collection module 910. Alternatively or additionally, the global manager 120 queries or probes unmanaged devices 140 (or labeled device 150) in the administrative domain 180 to collect unmanaged device information. Since unmanaged devices 140, labeled devices 150, and traffic midpoint devices 160 do not include a policy implementation module 136 that reports the unmanaged device's local state, unmanaged device information may be incomplete or less detailed than managed server information.

External device information describes characteristics of devices external to the administrative domain 180 communicating with managed servers 130. External device information may include identifiers (e.g., IP address, uniform resource locator (URL), other web address), hardware resources, software resources, or network connectivity of an external device. Managed servers 130 may collect external device information and send the information to the global manager 120 for processing by the contextual information collection module 910, but much external device information may not be visible to managed servers 130. In addition, external device information describes reputation information of the external device, which indicates trustworthiness of the external device. In one embodiment, the contextual information collection module 910 obtains reputation information matching the external device's identifier. Using the reputation information, the contextual information collection module 910 classifies the external device as safe, malicious, or neutral. Reputation information may be a binary indicator (e.g., whether the external device's identifier is on a blacklist) or a score (e.g., a relative assessment of danger associated with an identifier).

Communication information is described above with respect to the alert generation module 430. A managed server 130 sends communication information to the global manager 120 that describes communication sent or received by the managed server 130. In one embodiment, a managed server 130 sends communication information about communication independently of evaluating whether the communication is authorized or unauthorized. When the contextual information collection module 910 receives duplicate communication information describing the same communication, the contextual information collection module 910 may merge or de-duplicate the duplicate communication information. For example, the contextual information collection module 910 de-duplicates communication information received from two managed servers 130, one providing a service and one consuming the service.

The contextual information collection module 910 generates administrative domain information based on contextual information received from managed servers 130. Administrative domain information aggregates contextual information over the administrative domain 180 or over a subset of actors in the administrative domain 180. The subset of actors in the administrative domain may be managed servers 130, bound services, bound service groups, labeled devices 150, traffic midpoint devices 160, or a combination of devices described by a label set. In one embodiment, administrative domain information describes communications having at least one common characteristic. The common characteristic may be a particular port, process, protocol, or actor (e.g., a managed server 130, an unmanaged device 140, a labeled device 150, a bound service group, a bound service, an external device, a traffic midpoint device 160). For example, the contextual information collection module 910 generates administrative domain information indicating the number of managed servers 130 having corrupted binaries associated with a particular service. As another example, the contextual information collection module 910 generates administrative domain information indicating a number of managed servers 130 scanned by a particular actor. "Scanning" refers to sending a request (e.g., probe) to a managed server 130 and using the managed server's response (or lack thereof) to obtain or automatically determine the configuration of the managed server 130 and processes executing on the managed server 130.

In one embodiment, the contextual information collection module 910 generates administrative domain information indicating unusual activity within the administrative domain 180. The contextual information collection module 910 identifies contextual information associated with a particular actor or an actor group having a common label set, a common service, or some other characteristic. The contextual information collection module 910 summarizes the contextual information using a quantity (e.g., amount of communication, number of corrupted files) and compares the quantity to a threshold quantity. The threshold quantity may be based on a preconfigured setting or may be determined dynamically based on previous historical norms for the quantity. For example, the threshold quantity is two standard deviations above the weekly moving average for the quantity. In response to the comparison to the threshold quantity, the contextual information collection module 910 determines whether the summarized contextual information is unusual. For example, the contextual information collection module 910 determines that a managed server 130 is attempting to access an unusual number of ports unassociated with any services if the number of such ports that the managed server 130 has accessed exceeds a threshold number.

The actor grouping module 920 obtains communication information describing communication between actors in the administrative domain 180. Based on the communication information, the actor grouping module 920 groups the managed servers 130, bound service groups, unmanaged devices 140, labeled devices 150, and/or traffic midpoint devices 160 into application groups. An application group is a set of actors (e.g., managed servers 130, unmanaged devices 140, labeled devices 150, traffic midpoint devices 160, bound services, bound service groups) having significant volume of communication within the group compared to volume of communication with actors external to the group. For purposes of determining application groups, the actor grouping module 920 separates communications resulting from bound services executing on a managed server 130 from communications attributable to non-bound services on the managed server 130.

In one embodiment, the actor grouping module 920 constructs a graph where the nodes represent actors in the administrative domain 180 and where the edges represent communication between the actors. The edges have binary values indicating presence/absence of communication between the nodes or have non-binary values quantifying the volume of communication (e.g., frequency, data size, duration). For example, the value of an edge connecting two nodes is the daily quantity of data exchanged between a managed server 130 corresponding to the first node and a traffic midpoint device 160 corresponding to the second node. The graph may be undirected with edges that disregard direction of communication, or the graph may be directed with directed edges according to direction of communication. For example, a directional edge pointing away from a node indicates that the corresponding managed server 130 is a consumer of a service, and a directional edge pointing towards a node indicates that a corresponding bound service is the provider of a service. Since managed servers 130 report presence and/or quantity of communication between actors to the global manager 120, the graph may include values of edges between nodes where one node corresponds to a managed server 130 and the other node corresponds to a traffic midpoint device 160. Values of edges between nodes corresponding to two traffic midpoint devices 160 may be partially inferred based on communications reported by managed servers 130 if those communications can be presumed to have passed between the two traffic midpoint devices 160. However, such inference may not be possible depending on the topology of the network.

Using the graph representation of the administrative domain 180, the actor grouping module 920 groups the actors into application groups. In one embodiment, the actor grouping module 920 partitions the graph into sub-graphs each corresponding to an application group. For example, the actor grouping module 920 applies a depth-first search, a k-means cluster, or a minimum cut algorithm to partition the graph. In other words, the actor grouping module 920 groups the managed servers 130 into application groups by applying a graphical analysis to communication information gathered by the contextual information collection module 910. In one embodiment, the actor grouping module 920 constructs a graph where different devices are distinct nodes and edges represent communication between different devices. Using such a graph, the actor grouping module 920 may identify actor groups having a common label set.

The labeling engine 930 obtains managed server information and bound service information, which the labeling engine 930 uses to determine labels for managed servers 130, bound services, and unlabeled traffic midpoint devices 160. Since managed server information is typically more extensive than unmanaged device information, many of the following examples concern using managed server information to determine label sets for managed servers 130. However, if the labeling engine 930 obtains sufficiently detailed unmanaged device information about a traffic midpoint device 160, the labeling engine may use the unmanaged device information to determine a label set for the traffic midpoint device 160.

In one embodiment, the labeling engine 930 determines a group-level label set (i.e., one or more group-level labels) to associate with the labeled actors in an application group. In one embodiment, the group-level label set includes labels with dimensions corresponding to the environment, application, and location of the labeled actors. Labels are described further with respect to Table 1 and the administrative domain-wide management policy 330. The labeling engine 930 may determine the value of a labeled actor's location dimension based on locations of web addresses (e.g., an IP address and/or a URL) associated with the labeled actor. The labeling engine 930 may determine the value of a labeled actor's label based on conditional heuristics that use contextual information (and/or information derived from contextual information). A conditional heuristic can be created by an administrator or can be preconfigured. For example, a conditional heuristic specifies that if a managed server 130 is provided by a particular cloud service provider or located in a particular data center, then the labeling engine 930 determines a particular value for the managed server's line of business dimension. As another example, a conditional heuristic specifies that if a managed server 130 contains a particular file or process (or a particular set of files or processes), then the labeling engine 930 determines a particular value for the managed server's application dimension. The labeling engine 930 may request an administrator to indicate a group-level label set or to verify an automatically generated group-level label set. The labeling engine 930 modifies the group-level label set in response to an indication or correction by the administrator.

Besides group-level label sets applicable to an application group, the labeling engine 930 determines role labels (i.e., labels with a role dimension) for individual labeled actors within an application group. In one embodiment, the labeling engine 930 determines a role label for a managed server 130 based on hardware resources, service information, or other managed server information. For example, the labeling engine 930 determines that a managed server 130 has a "Database" role if the total available memory exceeds a threshold. As another example, the labeling engine 930 determines that a managed server 130 has a "Load Balancer" role based on the number of network interfaces. Similarly, the labeling engine 930 determines a role label for a managed server 130 based on its associated services or processes. For example, a SQLServer process indicates that a managed server 130 has a "Database" role. In one embodiment, the labeling engine 930 obtains information regarding processes executing on a managed server 130 from managed server information and determines the value of the role dimension based on the processes. Table 3 illustrates an example mapping between processes and role dimension values.

TABLE 3

Mapping between processes and role dimension values

| Process | Role dimension value |
|---|---|
| Postgres | Database |
| Oracle | Database |
| SQLServer | Database |
| Apache | HTTP server |
| NGINX | HTTP server |
| HAProxy | Load balancer |

The flow processing module 940 obtains communication information between actors in the administrative domain 180 and generates access control rules corresponding to the communication information. In one embodiment, the flow processing module 940 identifies communication not authorized by an access control rule and generates an access control rule authorizing the communication. To generate the access control rule, the flow processing module 940 identifies the service generating the communication, the provider of the service, and the consumer of the service. The flow processing module 940 generates the access control rule with a service portion indicating the identified service, a PB portion indicating the identified provider, and a UB portion indicating the identified consumer. In one embodiment, the flow processing module 940 assumes that there are no abnormal or malicious communications in the administrative domain 180 and, accordingly, generates access control rules authorizing any communication present in the administrative domain 180.

In one embodiment, the flow processing module 940 generates access control rules based on group-level label sets and role labels of labeled actors (e.g., managed servers 130, traffic midpoint devices 160, labeled devices 150, bound service groups). The flow processing module 940 determines a target access control rule. For example, the target access control rule is specified by an administrator through a GUI (e.g., by indicating a particular edge of a displayed graph corresponding to the graph generated by the actor grouping module 920). The generated access control rule specifies a service, a first labeled actor as a provider of the service, and a second labeled actor as a consumer of the service. The flow processing module 940 identifies role labels and group-level label sets of the first and second labeled actors generated by the labeling engine 930. The flow processing module 940 then generates additional access control rules applying to other consumer-provider pairs of labeled actor using the specified service (corresponding to particular edges of the displayed graph). The identified managed servers 130 that are providers of the service have group-level label sets and role labels matching those of the first labeled actor. The identified managed servers 130 that are consumers of the service have group-level label sets and role labels matching those of the second labeled actor. Alternatively or additionally to generating additional access control rules covering the identified consumer-provider pairs of labeled actors, the flow processing module 940 broadens the target access control rule to include the identified consumer-provider pairs of labeled actors. For example, the broadened access control rule's PB portion and UB portion are specified in terms of label sets including the role label and group-level label sets rather than in terms of UIDs of particular labeled actors.

In one embodiment, the flow processing module 940 generates an access control rule controlling communication between a first labeled actor and an unlabeled actor (e.g., an unmanaged device 140 (or UDG), an unlabeled traffic midpoint device 160, an external device outside of the administrative domain 180). The flow processing module 940 identifies an existing access control rule specifying a service, a first labeled actor, and the unlabeled actor. The flow processing module 940 identifies a second labeled actor having similar labels (including role label and group-level label set) as the first labeled actor. The first and second labeled actors are either both consumers of the specified service or both providers of the specified service. The flow processing module 940 generates another access control rule authorizing service-related communication between the second labeled actor and the unlabeled actor. Alternatively or additionally to generating an additional access control rule, the flow processing module 940 broadens the existing access control rule by specifying the access control rule's PB portion or UB portion in terms of the first labeled actor's label set (including the role label and group-level label set) rather than in terms of a UID of the first labeled actor.

In one embodiment, the flow processing module 940 generates rules to modify the server state of the managed servers 130 within the administrative domain 180. The server state determines to what extent the management modules 132 implement the access control rules. In an enforcement state, the management modules 132 block or terminate communication that is unauthorized according to the access control rules. For example, in a pure whitelist policy, the management modules 132 block or terminate communications that do not match at least one access control rule. The server states also include a build state and a test state, where the management modules 132 permit communications even if the communications are not authorized by an access control rule. To initiate a build state or test state, the flow processing module 940 generates an unrestricted access control rule with PB, UB, and service portions that specify wildcards. In other words, the unrestricted access control rule authorizes all communication because there are no restrictions on the access control rule's applicability to various services or actors. To transition to enforcement state from build state or test state, the flow processing module 940 removes the unrestricted access control rule.

The alert processing module 950 obtains alerts from managed servers 130, processes the alerts, and (if appropriate) generates access control rules based on the obtained alerts. In one embodiment, the alert processing module 950 obtains alerts from managed servers 130 when the managed servers 130 are in an enforcement state or a test state. When a managed server 130 is in a build state, the alert processing module 950 instructs the managed server 130 not to generate alerts in response to detecting communication that is not authorized by an access control rule. When a managed server 130 is in a test state, the alert generation module 430 generates alerts indicating unauthorized traffic even though the management module 132 is not enforcing the access control rules to block the unauthorized traffic.

Before generating an access control rule in response to an alert, the alert processing module 950 classifies the communication that triggered the alert using obtained contextual information relevant to the alert. The contextual information includes communication information describing the communication, managed server information about any managed servers 130 sending or receiving the communication, or administrative domain information. If the alert is generated in response to communication with an external device, the contextual information includes external device information. If the alert is generated in response to communication with an unmanaged device 140 or labeled device 150, the contextual information includes unmanaged device information. The alert processing module 950 classifies the communication triggering the alert as being legitimate or malicious based on the obtained contextual information. For example, if the external device information indicates that the external device is malicious, then the communication is classified as malicious.

In one embodiment, the alert processing module 950 classifies communication as malicious if the administrative domain information indicates that the actor initiating the communication is associated with unusual activity. The contextual information collection module 910 may generate administrative domain information summarizing the number of alerts associated with a common characteristic such as a common actor, process, port, or protocol. If the number of alerts associated with the common characteristics exceeds a threshold number, then the contextual information collection module 910 classifies the communication as malicious. For example, if the number of alerts generated in response to traffic initiated by a managed server 130 exceeds a threshold number, then communication initiated by the managed server 130 is classified as malicious.

The alert processing module 950 may determine that obtained administrative domain information indicates the presence of a progressive infection. In a progressive infection, malicious software spreads across the administrative domain 180 over time. If administrative domain information indicates that the number of alerts from a first actor (e.g., a managed server 130) exceeds a threshold, and if a second actor (e.g., another managed server 130) in communication with the first actor begins generating alerts, then the alert processing module 950 determines that the alerts are associated with a progressive infection. Accordingly, the alert processing module 950 classifies the communication triggering alerts as malicious.

Alternatively or additionally to classifying the alert according to contextual information, the alert processing module 950 notifies an administrator in response to receiving the alert. Notifying the administrator may include reporting contextual information related to the communication triggering the alert. The alert processing module 950 may receive a classification from the administrator indicating whether the corresponding communication is legitimate or malicious.

The alert processing module 950 processes an alert according to the classification of the corresponding communication. If the corresponding communication is classified as malicious, the alert processing module 950 does not generate an access control rule authorizing the corresponding communication. In some embodiments, the alert processing module 950 instructs the managed servers 130 to cease communication with the originating actor that initiated the communication triggering the alert. In other words, the originating actor is quarantined. The alert processing module 950 notifies an administrator about the alert in response to classifying the corresponding communication as malicious. Alternatively or additionally, the alert processing module 950 notifies an administrator about the alert regardless of the alert's classification. If the corresponding communication is classified as legitimate, then the alert processing module 950 may instruct the flow processing module 940 to generate an access control rule authorizing the communication. In some embodiments, the alert processing module 950 may request approval for the access control rule from an administrator before adding the access control rule to the set of access control rules 335.

The access control rule (ACR) creation interface 960 provides an administrator an interface for reviewing contextual information, application groups, label sets (e.g., including role labels and/or group-level label sets) assigned to labeled actors (e.g., managed servers 130, labeled devices 150), and access control rules. The ACR creation interface 960 may receive a corrected application group of a labeled actor from an administrator. In response, the actor grouping module 920 updates the labeled actor's application group to match the corrected application group. Additionally, the labeling engine 930 updates the group-level label set of the labeled actor to match the group-level label set of the newly selected application group. The ACR creation interface 960 may receive a corrected label set for a labeled actor, and the labeling engine 930 updates the labeled actor's label set according to the correction. In response to the administrator modifying a labeled actor's group-level label set, the labeling engine 930 modifies group-level label sets of other labeled actors in the application group to match the corrected group-level label set.

The ACR creation interface 960 may receive a target access control rule from an administrator (e.g., by the administrator indicating a particular edge of a displayed graph). For example, the administrator's target access control rule indicates a service, the service's provider, and the service's consumer. The flow processing module 940 generates an access control rule according to the administrator's instructions and possibly generates additional access control rules (or broadens the generated access control rule) based on the service and the label sets of the provider and consumer.

The ACR creation interface 960 may notify the administrator about alerts obtained by the alert processing module 950. The ACR creation interface 960 may receive a classification of the communication triggering the alert, and the flow processing module 940 may generate an access control rule according to the classification. In one embodiment, the ACR creation interface 960 presents an administrator with an access control rule automatically generated by the flow processing module 940. The ACR creation interface 960 may receive the administrator's approval, modification, or denial of the auto-generated access control rule. The flow processing module 940 adds the (possibly modified) auto-generated access control rule to the set of access control rules 335 in response to receiving approval or modification from an administrator.

Alternatively or additionally to generating access control rules, the methods described herein may be used to facilitate creation of other rules with different rule functions as part of the administrative domain-wide management policy 330. These other rules include communication rules that specify both a provider of a service and a consumer of a service. One example communication rule has a secure connectivity function specifying protocols, encryption, or channels to be used with communications for a service. For communication rules, the global manager 120 obtains a target rule and identifies a label set (e.g., including a role label and/or group-level labels) describing the provider and a label set describing the consumer. The global manager 120 then generates additional rules (or broadens existing rules) that apply to provider-consumer pairs with respective label set pairs that match the pair of identified label sets. The additional (or broadened) rules apply to the same service and have the same function profile (e.g., encryption protocol, communication protocol type) as the target rule.

Some rules specify only the provider of the service or only the consumer of the service. Example rules that specify one of a consumer or a provider may have rule functions regulating stored-data encryption, disk usage, peripheral usage, or processor usage. For these rules, the global manager 120 obtains a target rule and identifies a label set corresponding to the provider or the consumer. For rules that specify a provider, the global manager 120 generates additional rules (or broadens existing rules) that apply to providers of the service having label sets that match the identified label set. For rules that specify a consumer, the global manager 120 generates additional rules (or broadens existing rules) that apply to consumers of the service having label sets that match the identified label set. The additional (or broadened) rules apply to the same service and have the same function profile (e.g., encryption protocol, resource usage limits) as the target rule.

Some rules affect a managed server 130 regardless of the services provided by or consumed by the managed server 130. Example rules regulate which processes may execute on a managed server 130, general disk-encryption settings, or when to capture a network packet for security analysis. The global manager 120 obtains a target rule, identifies a label set from the target rule, and generates (or broadens) rules applying to additional managed servers 130 with label sets matching the identified label set. The additional (or broadened) rules have the same function profile as the target rule. This process is similar to that described previously except the generated rule does not specify a service.

In some embodiments, the flow processing module 940 generates rules based on a different class of labels than are used for other rules (e.g., access control rules). Such rules affect a service provided by or used by a managed server 130 and may be generated based on one or more alternative or additional labels for the managed server 130. The labeling engine 930 may determine multiple process-specific role labels to apply to processes of a managed server 130. In one embodiment, the flow processing module 940 generates rules based on alternative role labels for the provider or the consumer of the service. The alternative role labels are the process-specific role labels associated with the one or more processes used by the managed server 130 to provide or consume the service specified by the rule.

End-to-End Communication Policy

The administrative domain-wide management policy 330 includes an end-to-end communication policy controlling communication between actors in the administrative domain 180 through a traffic midpoint device 160. The end-to-end communication policy may include elements of a security policy (e.g., access control, traffic encryption), elements of a resource-usage policy (e.g., bandwidth allowance), or both. The end-to-end communication policy is embodied by rules included in the set of communication rules 335. More specifically, the end-to-end communication policy contains communication rules regulating traffic between two endpoints (e.g., a managed server 130, an unmanaged device 140, a labeled device 150, a traffic midpoint device 160, a bound service) through a traffic midpoint device 160. The end-to-end communication policy may be enforced by a management module 132 of a managed server 130 or through native security functionality of the traffic midpoint device 160.

For example, a provider managed server 130 communicates with a consumer managed server 130 through a traffic midpoint device 160. The end-to-end communication policy includes backend communication rules enforced by the provider managed server 130 and frontend communication rules enforced by the consumer managed server 130. The traffic midpoint device 160 may be configured to independently enforce some or all of the backend communication rules, the frontend communication rules, or both. In this way, the backend and frontend communication rules enable consistent enforcement of the end-to-end communication policy by multiple actors at the communication's endpoints and midpoints.

Because the traffic midpoint device 160 may modify the traffic passing through it, a security implementation unaware of the traffic midpoint device 160 may potentially not recognize or control traffic at endpoints connected by the traffic midpoint device 160. By using knowledge of the traffic midpoint device 160 and its configuration (as indicated in the administrative domain state 320), the global manager 120 may enforce policy on managed servers 130 attached to a traffic midpoint device 160.

Figure 10:
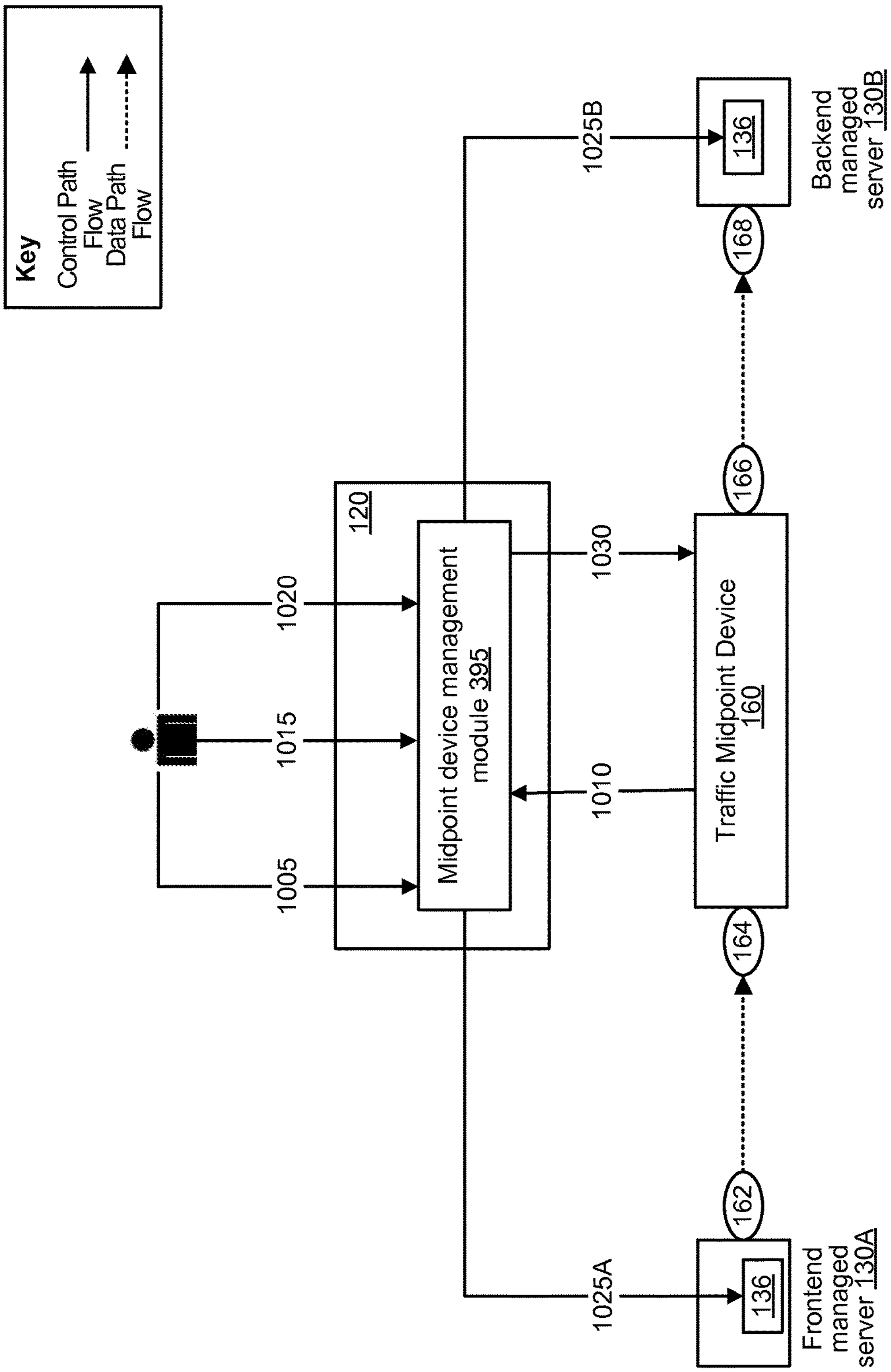
FIG. 10 is a process flow diagram illustrating configuration and enforcement of policies through a traffic midpoint device, according to one embodiment.

FIG. 10 is a process flow diagram illustrating configuration and enforcement of policies on communication through a traffic midpoint device, according to one embodiment. In FIG. 10, a frontend managed server 130A consumes a service provided by backend managed server 130B. The managed servers 130A and 130B communicate through the traffic midpoint device 160. The global manager 120 includes a midpoint device management module 395, which calculates an end-to-end communication policy based on the state of the traffic midpoint device 160 and managed servers 130A and 130B. Based on the calculated policy, the global manager 120 sends management instructions to each managed server's policy implementation module 136 to enforce the end-to-end communication policy through management module 132. The midpoint device management module 395 may also configure the traffic midpoint device 160 to independently enforce the end-to-end communication policy based on the capabilities, configuration, and operating mode of the traffic midpoint device 160.

In one embodiment, an administrator configures the end-to-end communication policy. The administrator instructs 1005 the global manager 120 to add a traffic midpoint device 160 to the end-to-end communication policy. For example, the administrator provide the global manager 120 with a device name, identifier, or network address of the traffic midpoint device 160 as well as credentials to configure the traffic midpoint device 160. As another example, the administrator instructs the global manager 120 to scan the administrative domain 180 for traffic midpoint devices 160 regulating traffic between managed servers 130 and other devices in the administrative domain 180.

The midpoint device management module 395 obtains 1010 a configuration of the traffic midpoint device 160, which may include an operational configuration describing how the traffic midpoint device 160 regulates communication or a security configuration indicating native enforcement capabilities of the traffic midpoint device 160. The midpoint device management module 395 updates a description of the traffic midpoint device 160 in the administrative domain state 320.

The administrator selects 1015 a managed server 130 in communication with the traffic midpoint device 160 and configures 1020 communication rules applicable to the traffic midpoint device 160 and to that managed server 130. For example, the administrator configures 1020 frontend rules regulating communication between the traffic midpoint device 160 and the frontend managed server 130A and configures 1020 backend rules regulating communication between the traffic midpoint device 160 and the backend managed server 130B. The midpoint device management module 395 may infer frontend rules and backend rules from rules regulating communication between the frontend managed server 130A and the backend managed server 130B. The administrator may review, verify, and customize such inferred rules.

The global manager 120 generates management instructions based on the rules and sends 1025 the management instructions to managed servers 130A and 130B to enforce rules applicable to communication with the traffic midpoint device 160. For example, the global manager 120 generates frontend management instructions based on the frontend rules and sends 1025A the frontend management instructions to the frontend managed server 130A. The global manager 120 generates the backend management instructions based on the backend rules and sends 1025B the backend management instructions to the backend managed server 130B.

In one embodiment, the managed servers 130A and 130B use their respective network interfaces as points of enforcement. Frontend managed server 130A communicates with the traffic midpoint device 160 through network interface 162. Backend managed server 130B communicates with the traffic midpoint device 160 through network interface 168. The traffic midpoint device 160 communicates with the managed servers 130A and 130B through network interfaces 164 and 166, respectively. Frontend managed server 130A verifies whether communication through network interface 162 complies with the frontend management instructions, and backend managed server 130B verifies whether communication through network interface 168 complies with backend management instructions.

Verifying compliance with communication rules and corresponding management instructions may include verifying a communication's destination (e.g., interfaces 162 and 166) or source (e.g., interfaces 164 and 168). Verifying the destination of a communication may include verifying the communication's immediate destination (e.g., network interface 164), ultimate destination (e.g., network interface 168), or both. Similarly, verifying the source of a communication may include verifying the communication's immediate source (e.g., network interface 166) or initial source (e.g., network interface 162). The identity of the actor associated with the destination or source may be determined from a network address included in the traffic and associated with the actor (e.g., IP address, MAC address, port and protocol pair) or from credentials included in the traffic, for example. The source or destination of traffic may be any actor in the administrative domain 180 (e.g., a managed server 130, an unmanaged device 140, a labeled device 150, a traffic midpoint device 160, a bound service) or any device external to the administrative domain.

Although only a single network interface is illustrated at the endpoint of each communication segment, the managed servers 130A and 130B and the traffic midpoint device 160 may have additional network interfaces and enforce the communication rules on traffic through any of these additional network interfaces. Verifying compliance may further include verifying any conditions associated with a rule function. For example, any of the devices in the data path may verify whether an inbound or outbound communication complies with a communication encryption rule or a bandwidth-usage rule.

Since the traffic midpoint device 160 does not have a policy implementation module 136, the midpoint device management module 395 configures 1030 the native enforcement capabilities of the traffic midpoint device 160 so that it enforces both the frontend rules and backend rules. In particular, the traffic midpoint device 160 may be configured to enforce the frontend communication rules on communication through network interface 164 and enforce the backend communication rules on communication through network interface 166. Examples of the traffic midpoint device's native enforcement capabilities include extensible access control lists, application firewall policies, programmable traffic control rules, and pool management. For example, the traffic midpoint device 160 is a server load balancer (SLB) that performs access control list checks at network interfaces 164 and 166. As another example, the SLB uses pool management enforced at network interface 166 to control which actors (e.g., which backend managed servers 130B) the SLB may send communications. Pool management refers to maintaining a "pool" of one or more grouped actors (e.g., physical devices, virtual devices, bound services) that provide similar services.

Configuring 1030 the traffic midpoint device 160 includes the midpoint device management module 395 configuring the traffic midpoint device 160 directly, indirectly, or both. Direct configuration refers to the midpoint device management module 395 sending the traffic midpoint device 160 commands to modify the configuration of its native enforcement capabilities. Indirect configuration refers to the midpoint device management module 395 instructing a controller included in one of the managed servers 130A or 130B to modify the configuration of the traffic midpoint device's native enforcement capabilities.

Midpoint Device Management Module

Figure 11:
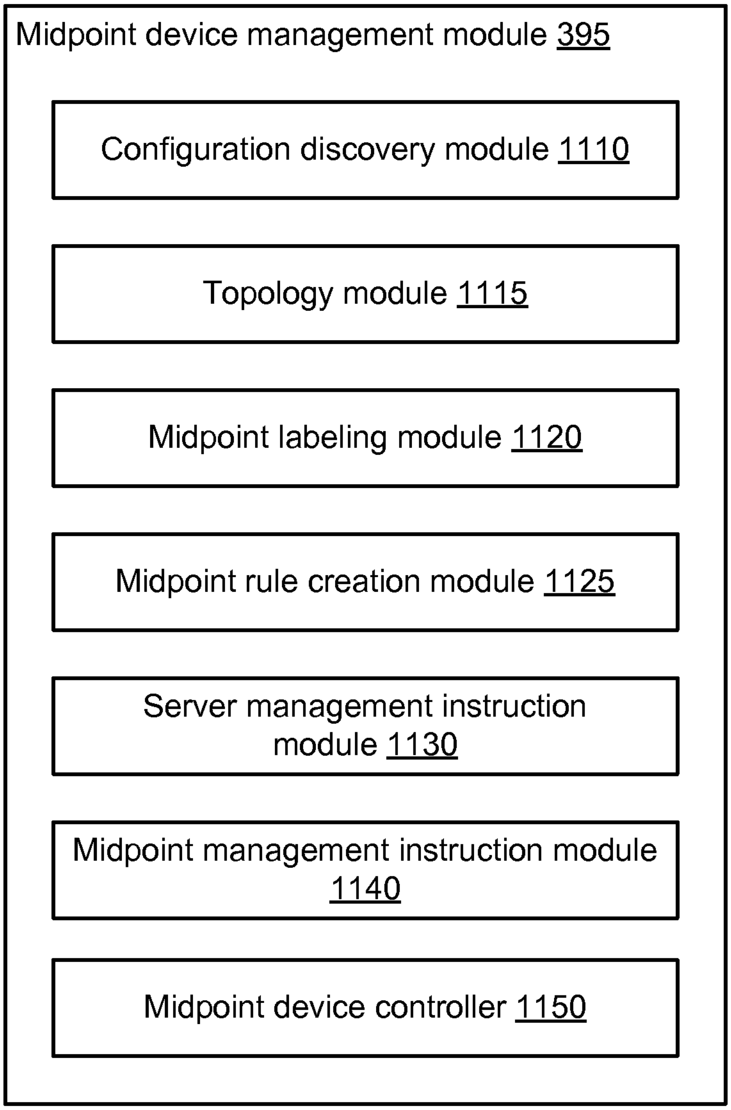
FIG. 11 is a high-level block diagram illustrating a detailed view of a midpoint device management module, according to one embodiment.

FIG. 11 is a high-level block diagram illustrating a detailed view of a midpoint device management module 395, according to one embodiment. The midpoint device management module 395 includes a configuration discovery module 1110, a topology module 1115, a midpoint labeling module 1120, a midpoint rule creation module 1125, a server management instruction module 1130, a midpoint management instruction module 1140, and a midpoint device controller 1150.

The configuration discovery module 1110 obtains a configuration of the traffic midpoint device 160. For example, the configuration discovery module 1110 queries the status of the traffic midpoint device 160 using credentials provided by an administrator. The configuration of the traffic midpoint device 160 includes an operational configuration describing an effect of the traffic midpoint device 160 on communication between other devices. For example, the operational configuration includes the traffic midpoint device's NAT configuration, traffic prioritization settings, or load balancer scheduling algorithms. As another example, the operational configuration identifies virtual traffic endpoints on the traffic midpoint device 160 such as a virtual server on the traffic midpoint device 160.

As part of obtaining the configuration of the traffic midpoint device 160, the configuration discovery module 1110 may obtain a group configuration indicating that the traffic midpoint device 160 is part of a functional grouping of traffic midpoint devices 160. The group configuration may also include settings indicating the nature of the functional grouping and relevant settings. For example, the group configuration indicates that the traffic midpoint device 160 is part of a group of server load balancers. In this example, the group configuration indicates whether the server load balancers are operating in active-active mode, where the server load balancers distribute the load of communications among themselves, or in active-passive mode, where at least one of the server load balancers remains monitors the other server load balancers and is available to move to active mode if the other server load balancers cannot handle the volume of communication (e.g., due to a hardware failure).

As part of obtaining the configuration of the traffic midpoint device 160, the configuration discovery module 1110 may obtain a security configuration indicating enforcement capabilities of the traffic midpoint device 160 and current settings of the traffic midpoint device. For example, the security configuration includes access control lists configured on the traffic midpoint device 160. As another example, the security configuration includes settings of the firewall (e.g., authorized and unauthorized devices). As a third example, the security configuration indicates devices having membership in a device management pool.

As part of obtaining the configuration of the traffic midpoint device 160, the configuration discovery module 1110 may obtain device status information indicating the availability of the traffic midpoint device 160. The device status information may indicate the status of resources (e.g., memory, power, connectivity, and service availability) on the traffic midpoint device 160. The device status information includes qualitative indicators (e.g., error indicators) as well as quantitative indicators (e.g., temperature, resource usage, resource capacity). A traffic midpoint device 160 may be considered offline if particular qualitative conditions are fulfilled (e.g., particular error messages, power failures) or if particular quantitative conditions are fulfilled (e.g., temperature greater than a threshold, resource availability less than a threshold).

In response to changes in the configuration of a traffic midpoint device 160, the global manager 120 may recalculate management instructions (e.g., through the administrative domain state update (ADSU) module 385). For example, when a traffic midpoint device's NAT configuration changes, management instructions of managed servers 130 communicating with that traffic midpoint device 160 may change. As another example, if a traffic midpoint device 160 comes online or goes offline, the ADSU module 385 updates the membership of the actor-set of devices having a same label set as the traffic midpoint device 160.

Based on the configuration of a traffic midpoint device 160, the topology module 1115 identifies actors in communication with the traffic midpoint device 160. The topology module 1115 may identify the actors in communication with the traffic midpoint device 160 from devices mentioned by the security configuration of the traffic midpoint device 160. For example, the access control list includes the devices authorized to communicate with the traffic midpoint device 160. Similarly, the topology module 115 may identify the actors from actors mentioned by the operational configuration of the traffic midpoint device 160. For example, traffic prioritization settings may include a list of devices in communication with the traffic midpoint device 160. The topology module 1115 may also determine that a traffic midpoint device 160 is in communication with another device from information reported by a managed server 130 in communication with that traffic midpoint device 160. Using the configuration information of a traffic midpoint device 160 beneficially enables detection of communication with actors (such as unmanaged devices 140) that do not report to the global manager 120.

The topology module 1115 may that infer devices in communication with a traffic midpoint device 160 from a group configuration. The topology module 1115 identifies devices determined to be in communication with other traffic midpoint devices 160 in a same functional grouping as a traffic midpoint device 160 and determines that the traffic midpoint device 160 may also be in communication with those identified devices. Using the identified devices in communication with a traffic midpoint device 160, the global manager 120 may more efficiently identify rules relevant to that traffic midpoint device 160 and more efficiently identify other actors affected by a change in state of the traffic midpoint device 160.

The midpoint labeling module 1120 determines a label set for a traffic midpoint device 160 based on devices with which the traffic midpoint device communicates, based on its group configuration, based on input by an administrator, or a combination thereof. The midpoint labeling module 1120 may use the communication information determined by the topology module 1115 to determine that a traffic midpoint device 160 relays communication between a set of provider devices providing a service and a set of user devices using the service. The midpoint labeling module 1120 may identify a label value in common between the set of provider devices and the set of user devices and assign that label value to the traffic midpoint device 160. For example, if the provider and user devices have the same values for the <Environment>, <Application>, <Line of Business>, or <Location> dimension, then the midpoint labeling module 1120 assigns that common value to the traffic midpoint device 1150. In some cases, the user devices may be unmanaged devices 140. In this case, the midpoint labeling module 1120 may assign the traffic midpoint device 160 label values that the provider devices have in common without reference to the user devices.

For the <Role> label dimension, the midpoint labeling module 1120 may determine an intermediate value between the provider devices' value of the <Role> dimension and the user devices' value of the <Role> dimension. For example, if the provider devices have a <Backend Web> value and the user devices have a <Worker> value, the midpoint labeling module 1120 assigns the traffic midpoint device 160 a <Web> value. The <Web> value denotes a role corresponding to a reverse-proxy server or another intermediary between provider devices having a <Backend Web> value and the Internet. In some embodiments, the midpoint labeling module 1120 may modify the values of a managed server's<Role> label to better reflect the managed server's position in a network topology. For example, if a traffic midpoint device 160 is added to the administrative domain 180, the midpoint labeling module 1120 assigns the traffic midpoint device 160 a label specifying a value for the <Role> dimension equal to the provider managed server's value for the <Role> dimension. The midpoint labeling module 1120 may further modify the provider managed server's value for the <Role> dimension to indicate that the provider managed server 130 is one additional layer removed from the user device relative to the traffic midpoint device's value for the role dimension. For example, a provider managed server 130 having a <Web> value for the <Role> dimension is re-labeled to have a <Backend Web> value, and the traffic midpoint device 160 is assigned the <Web> value for the <Role> dimension.

The midpoint labeling module 1120 may assign a traffic midpoint device 160 a label based on input from an administrator. An administrator may assign values for unassigned label dimensions of a traffic midpoint device 160 or may correct automatically assigned label values. The midpoint labeling module 1120 may assign a label to a traffic midpoint device 160 based on membership in a functional group. If a traffic midpoint device 160 in a functional group has a value for a particular label dimension, the midpoint labeling module 1120 may assign that value to other traffic midpoint devices 160 in the functional group. In this way, if an administrator assigns a label value to one traffic midpoint device 160 in a functional group, the remaining traffic midpoint devices 160 are labeled, which reduces time required for the administrator to configure the administrative domain-wide management policy 330.

Traffic midpoint devices 160 may also be labeled by any of the methods described with respect to the labeling engine 930. For example, the labeling engine 930 identifies a physical location of the traffic midpoint device 160 and identifies a value for the <Location> label that matches the physical location.

The midpoint rule creation module 1125 identifies rules that are relevant to a traffic midpoint device 160 and derives midpoint rules that are directly applicable the traffic midpoint device 160 from the relevant rules. Midpoint rules include frontend rules, backend rules, and any other rules that have a PB portion or UB portion applicable to a traffic midpoint device 160. The rules relevant to the traffic midpoint device 160 are rules governing communication between two actors that communicate through the traffic midpoint device 160. In one embodiment, the midpoint rule creation module 1125 determines the relevant rules by obtaining a provider label set of a provider managed server 130 providing a service and obtaining a user label set of a user device consuming the service. The midpoint rule creation module 1125 selects relevant rules from the set of communication rules 335 in response to the relevant rules having a provided-by portion applicable to the provider label set and a used-by portion applicable to the user label set.

Having identified a relevant rule, the midpoint rule creation module 1125 generates midpoint rules (i.e., backend and frontend rules) that explicitly pertain to the traffic midpoint device 160. A backend rule has a PB portion that refers to the same actors as the selected relevant rule using the same label set, UID, or other identifier included in the initial rule. The backend rule's UB portion refers to the traffic midpoint device 160 by a label set or UID of the midpoint device 160. Similarly, a frontend rule has a UB portion that refers to the same actors as the initial rule using the same label set, UID, or other identifier included in the selected relevant rule. The backend rule's PB portion refers to the traffic midpoint device 160 by a label set or UID of the traffic midpoint device 160. The midpoint rules specify the same service as the selected relevant rule and may include the same rule condition. For example, if the selected relevant rule has rule conditions dependent on that state of the provider managed server 130, the backend rule includes those rule conditions, and the frontend rule excludes those conditions. Generally, if a rule condition from the relevant rules refers to an actor named by a midpoint rule's UB or PB portion, then the midpoint rule includes that rule condition.

The midpoint rule creation module 1125 may present generated midpoint rules for an administrator to verify or modify. For example, the ACR creation interface 960 presents the generated midpoint rules and receives modifications to these rules from an administrator.

The server management instruction module 1130 takes as input a midpoint rule and outputs management instructions for a managed server 130. A management instruction includes a function-level instruction that references an actor-set as well as actor-set information identifying which actors belong to the referenced actor-set. Using the relevant rules module 350, the server management instruction module 1130 determines which midpoint rules are relevant to a particular managed server 130. Using the function-level instruction generation module 360, the server management instruction module 1130 generates function-level instructions that correspond to the relevant midpoint rules. For example, a function-level instruction includes a reference to a set of traffic midpoint devices 160 having a common label set that are allowed to use a particular service, and the management instruction includes a list of network addresses of traffic midpoint devices 160 having the label set. Using the actor enumeration module 370 and the relevant actors module 380, the server management instruction module 1130 generates a list of devices in each actor-set referenced by the function-level instructions. The function-level instructions and lists of devices in each actor-set are sent to the managed servers 130 as management instructions.

Prior to sending a function-level instruction as part of management instructions and prior to determining the actor-set relevant to that function-level instruction, the server management instruction module 1130 may modify the function-level instruction according to the configuration of the traffic midpoint device 160. In particular, the server management instruction module 1130 may modify the PB portions or UB portions of the function-level instructions according to the NAT configuration of the traffic midpoint device 160. The server management instruction module 1130 determines an expected network address of communication according to the NAT configuration. If the traffic midpoint device 160 modifies the network address of communications, the server management instruction module 1130 replaces a reference to the traffic midpoint device 160 (e.g., in the PB or UB portion) with a reference to the actor corresponding to the expected network address. For example, if the traffic midpoint device 160 operates in source NAT mode, then the apparent network address is not modified, and the server management instruction module 1130 does not modify the function-level instructions output by the function-level instruction generation module 360. As another example, if the traffic midpoint device 160 operates in transparent NAT mode, then the apparent source of traffic will match the initial source. Accordingly, the server management instruction module 1130 modifies the function-level instructions' PB or UB portions that referenced the traffic midpoint device 160 to instead reference the device sending the traffic to the traffic midpoint device 160.

The midpoint management instruction module 1140 takes as input a midpoint rule and outputs midpoint management instructions for a traffic midpoint device 160. Using the relevant rules module 350, the midpoint management instruction module 1140 determines which midpoint rules are relevant to a particular traffic midpoint device 160. Using the function-level instruction generation module 360, the midpoint management instruction module 1140 generates function-level instructions that correspond to the relevant midpoint rules. Using the actor enumeration module 370 and the relevant actors module 380, the midpoint management instruction module 1140 generates a list of devices in the actor-set referenced by the function-level instructions. For example, a function-level instruction includes a reference to a set of actors having a common label set that are allowed to use a particular service, and the management instruction includes a list of network addresses of those actors having the label set. Since the traffic midpoint device 160 does not have a policy implementation module 136, the global manager 120 configures the traffic midpoint device 160 to enforce the management instructions using the midpoint device controller 1150.

A recalculation of the management instructions for the managed servers 130 and traffic midpoint device 160 may be triggered by a change in the administrative domain state 320. This may be triggered by events as described with respect to the administrative domain state update module 385, and also by events affecting traffic midpoint devices 160. For example, a configuration change, a change in online-offline status (e.g., due to a hardware failure, a software failure), a change in the label set of a traffic midpoint device 160, or a change in the label set of any other device in the administrative domain 180 may trigger an update of the administrative domain state 320.

The midpoint device controller 1150 takes as input midpoint management instructions generated with respect to a traffic midpoint device 160 and configures the traffic midpoint device 160 to enforce these management instructions using its native capabilities based on the configuration of the traffic midpoint device 160. The traffic midpoint device 160 may be configured through any means, including a representational state transfer (REST) protocol application programming interface (API), simple object access protocol (SOAP) API, extensible markup language (XML) API, or secure shell (SSH) session. The traffic midpoint device 160 configures access control lists, application firewall policies, programmable traffic control rules, pool management, or a combination thereof for compliance with the midpoint management instructions.

The midpoint device controller 1150 may determine an updated security configuration for a traffic midpoint device 160 based on the management instructions, compare the updated security configuration with a current security configuration of the traffic midpoint device 160, and then determine changes to bring the traffic midpoint device 160 into compliance with the updated security configuration. When changes to the administrative domain-state 320 occur, the midpoint device controller 1150 may receive and process only management instructions that have changed as a result of the state change.

In some embodiments, a managed server 130 executes the midpoint device controller 1150 for a traffic midpoint device 160. In this configuration, the global manager 120 sends the management instructions for the traffic midpoint device 160 to the global manager 120, which then configures the traffic midpoint device 160 through its midpoint device controller 1150.

Example End-to-End Security Policies

Figure 12A:
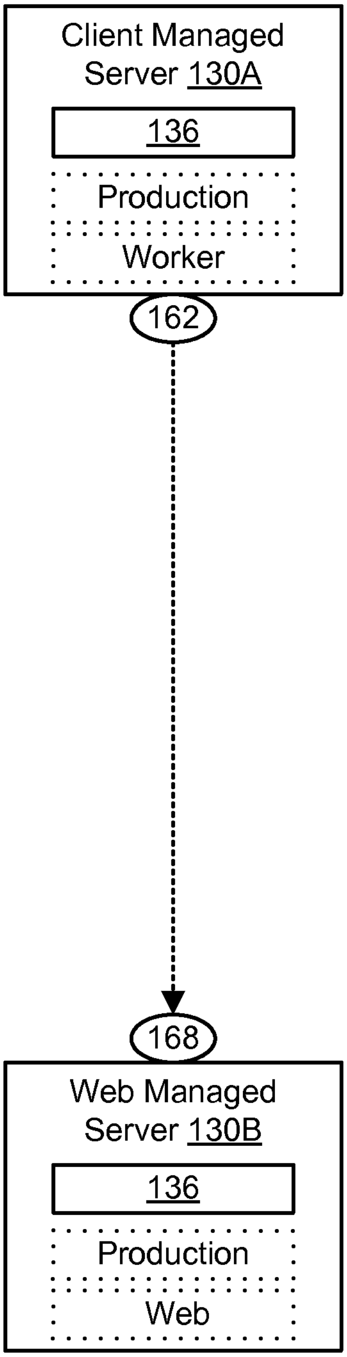
FIG. 12A is a conceptual diagram illustrating enforcement of example policies on traffic between two managed servers, according to one embodiment.

FIG. 12A is a conceptual diagram illustrating enforcement of example policies on traffic between two managed servers 130, according to one embodiment. FIG. 12A shows an initial environment including client managed server 130A acting as a client and web managed server 130B acting as a web server. The managed servers 130A and 130B both have labels with a value of <Production> for the <Environment> dimension, client managed server 130A has a label with a <Web> value for the <Role> dimension, and web managed server 130B has a label with a <Worker> value for the <Role> dimension.

Figure 12B:
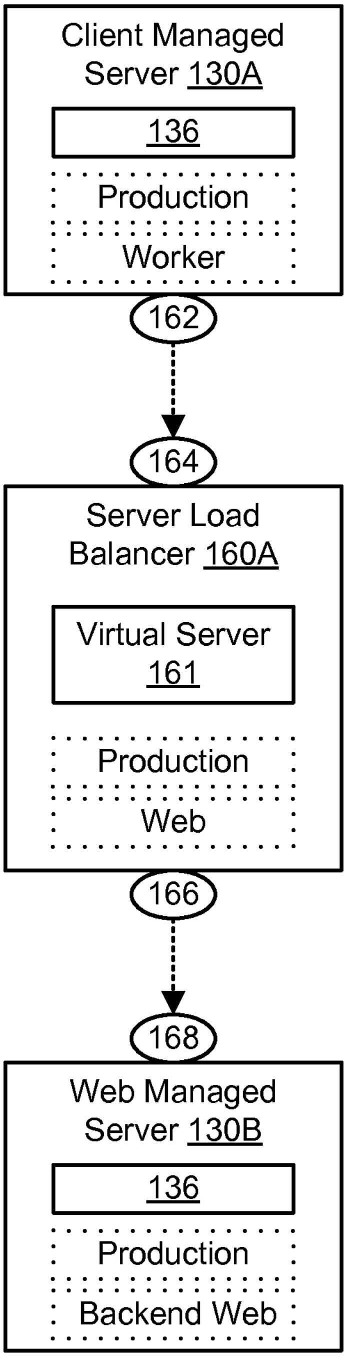
FIG. 12B is a conceptual diagram illustrating enforcement of example policies on traffic through on a traffic midpoint device such as a load balancer having a virtual server, according to one embodiment.

FIG. 12B is a conceptual diagram illustrating enforcement of example policies on traffic through on a traffic midpoint device 160 such as a server load balancer (SLB) 160A having a virtual server 161, according to one embodiment. FIG. 12B shows the same environment as in FIG. 12A after adding the SLB 160A. In this example, the traffic midpoint device 160A is a virtual server 161 running in source NAT (SNAT) mode. The virtual server 161 is not a managed server 130 (i.e., it does not include a policy implementation module 136); instead, the virtual server 161 is a labeled device 150 having labels with a value of <Production> for the <Environment> dimension and a value of <Web> for the <Role> dimension. Through the midpoint device controller 1150, the global manager 120 may configure a security or traffic engine of the virtual server 161 or SLB 160A to implement the end-to-end communication policy, thereby indirectly managing the virtual server 161 and SLB 160A.

After adding the SLB 160A, the midpoint labeling module 1120 has modified the value of the web managed server's<Role> dimension to be <Backend Web> instead of <Web>. The change in the web managed server's label reflects that the SLB 160A directly interacts with the one or more client managed servers 130A and reflects that the web managed server 130B receives requests from the one or more client managed servers 130A through the SLB 160A.

In the initial case of FIG. 12A, before the addition of the SLB 160A, the processing server 310 of the global manager 120 may build one policy perspective enforced at network interface 162 and another enforced at network interface 168. The policy perspective at the client managed server 130A may allow outgoing communication to network interfaces of entities having label values of <Production> and <Web>. Similarly, the policy perspective at the web managed server 130B may allow incoming communication from network interfaces of entities assigned label values of <Production> and <Worker>.

In FIG. 12B, with the addition of the SLB 160A, the processing server 310 computes policy perspectives at the client managed server 130A, at the SLB 160A (for both communication through network interface 164 and communication through network interface 166), and at the web managed server 130B. The function-level instructions at the client managed server 130A may be the same as in FIG. 12A (because the labels of the virtual server 161 at the SLB 160A match the initial labels of web managed server 130B), but the actor-set referenced by the function-level instructions now includes the SLB 160A and excludes the web managed server 130B. For example, outgoing connections through network interface 162 may now be limited to the one or more IP addresses associated with network interface 164 instead of the one or more IP addresses of network interface 168.

The policy perspective of the web managed server 130B depends on the configuration of the virtual server 161 and SLB 160A. In a typical SNAT configuration, the source IP address of incoming connections may be re-written to a local address belonging to the SLB 160A and the destination address may be re-written to be one of the backend servers at network interface 168. In other words, for a traffic midpoint device 160 in SNAT mode, the management instructions reflect the network address of the immediate destination or immediate source of traffic covered by the rule used to derive the management instructions. Thus, the function-level instructions corresponding to web managed server 130B change because the web managed server 130B receives communications from the network address of the SLB 160A, which has labels differing from the labels assigned the client managed server 130A.

The function-level instructions corresponding to network interface 166 allow outgoing connections to entities in the actor-set corresponding to the labels <Environment, Production> and <Role, Backend Web>. The midpoint device controller 1150 configures the SLB 160A to enforce these function-level instructions. Similarly, the function-level instructions corresponding to network interface 168 allow incoming communication from entities in the actor-set corresponding to the labels <Environment, Production> and <Role, Web>. There may be multiple actors having the labels <Environment, Production> and <Role, Backend Web>, so the processing server 310 may deploy management instructions to these other actors. For example, the SLB 160A directs traffic to one of a plurality of backend managed servers 130 that form the pool of devices represented by web managed server 130B in order to balance requests among the backend managed servers 130. In this example, the global manager 120 updates the management instructions for each of the backend managed servers 130. As another example, the web managed server 130B includes multiple bound services managed by respective sets of management instructions. In this example, the global manager 120 updates the management instructions for the respective bound services at the web managed server 130B and also updates the management instructions corresponding to network interface 166 (e.g., to reflect the ports corresponding to the different bound services at the web managed server 130B).

As an alternative example, assume that the traffic midpoint device 160 is configured in transparent source IP mode where the source IP address of client managed server 130A is not modified. The server management instruction module 1130 modifies the management instructions relative to the SNAT mode case to reflect the configuration of the virtual server 161 in transparent mode.

In this particular example, the management instructions corresponding to network interfaces 162, 164, and 166 may be the same as in the SNAT case. The management instructions corresponding to network interface 168 may now reflect the fact that source IP address of requests corresponds to the network interface 162 of the client managed server 130A (rather than network interface 166, as in the SNAT case). Accordingly, the function-level instructions specify the actor-set corresponding to the label set of the client managed server 130A instead of the label set of the SLB 160A. In other words, for a traffic midpoint device 160 in transparent mode, the management instructions reflect the initial source network address rather than the immediate source network address. The server management instruction module 1130 thus uses the SLB's operational configuration to modify management instructions to account for the SLB's effect on traffic.

The SLB 160A may be configured in other modes of operation such as direct server return (DSR). In such a case, the web managed server 130B receives requests from the client managed server 130A through the SLB 160A but responds directly to the client managed server 130A. Accordingly, the web managed server's function-level instructions specify the actor-set of the server load balancer 160A for inbound requests and the actor-set of the client managed server 130A for outbound responses. In some embodiments, more than one traffic midpoint device 160 is present in the communication path. Accordingly, the topology module 1115 identifies the configuration, and the management instructions corresponding to a traffic midpoint device 160 may refer to another traffic midpoint device 160 instead of referring to a managed server 130, bound service, unmanaged device 140, or labeled device 150.

Figure 13:
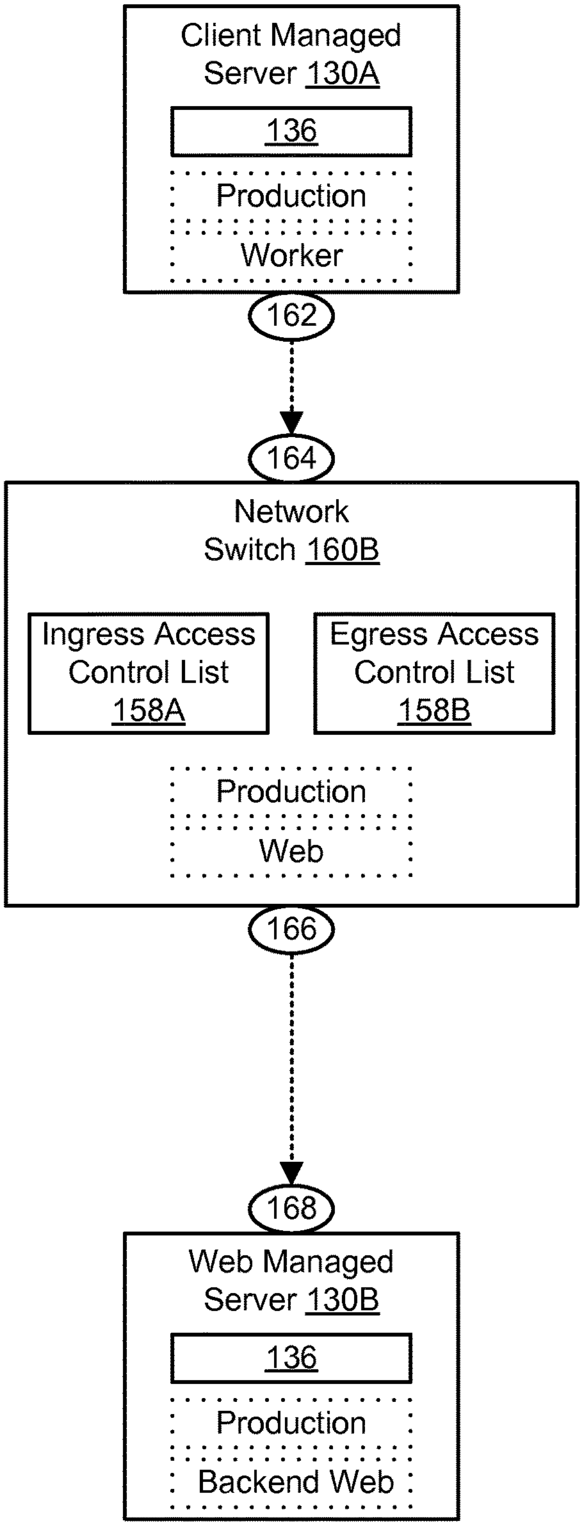
FIG. 13 is a conceptual diagram illustrating enforcement of example policies on traffic through a traffic midpoint device such as a programmable switch, according to one embodiment.

FIG. 13 is a conceptual diagram illustrating enforcement of example policies on traffic through a traffic midpoint device 160 such as a programmable network switch 160B, according to one embodiment. Client managed server 130A is assigned the labels <Environment, Production> and <Role, Worker> and has network interface 162. Network switch 160B is assigned the labels <Environment, Production> and <Role, Web> and has network interfaces 164 and 166. The client managed server 130A and network switch 160B communicate through network interfaces 162 and 164. Web managed server 130B is assigned the labels <Environment, Production> and <Role, Backend Web> and has network interface 168, which it uses to communicate with the network switch 160B through network interface 166.

Traffic midpoint devices 160 may have multiple access points (e.g., port, VLAN (virtual local area network), tunnel). Management instructions generated by the global manager 120 may indicate a particular access point (within network interface 164 or network interface 166) at which the traffic midpoint device 160 enforces policies. The management instructions may also indicate which actors may use the particular access point, which modes of access may be used the particular access point, or which services are accessible through the particular access point. Using an access point includes sending traffic to an access point and receiving traffic from an access point. For example, the midpoint device controller 1150 generates an access control list that specifies an access point and tuples indicating allowed actors, services, and/or modes of access for communications through the access point. In the illustrated example, the midpoint device controller 1150 modifies ingress access control list 158A corresponding to network interface 164 for compliance with frontend rules. The midpoint device controller 1150 modifies egress access control list 158B corresponding to network interface 166 for compliance with backend rules.

A traffic midpoint device 160 verifies that access mode identifiers from the traffic through an access point match access mode identifiers specified by the access control list's tuple. For example, the traffic midpoint device 160 verifies that traffic through the network interface 164 matches a tuple in the ingress access control list 158A. For an access control list enforced at a network interface, the traffic midpoint device 160 (1) identifies the access mode identifier (e.g., of a VLAN or tunnel accessed through the port) from traffic metadata (e.g., a packet header, a traffic signature); (2)

determines whether the identified access mode identifier matches an access mode identifier from a tuple in an access control list 158; and (3) allows the traffic if there is a match and blocks the traffic otherwise. A traffic midpoint device 160 may also verify that an identifier of the accessing actor or the accessed service matches an identifier specified by an access control list's tuple. For example, an access control list enforced on a VLAN specifies identifiers of actors allowed to access the VLAN.

Although some management instructions apply to a subset of network interfaces and other access points on a traffic midpoint device 160, management instructions may apply to all access points of a traffic midpoint device 160. For example, management instructions configure an access control list 158 of the programmable switch 160B to specify allowable ports, VLANs, tunnels, MAC addresses, or other access points on the programmable switch 160B.

When the network switch 160B (or another traffic midpoint device 160) enforces management instructions at distinct access points, the network switch 160B beneficially decreases bandwidth consumption by preventing access to the network switch 160B by unauthorized actors (or web managed server 130B through the network switch 160B) through improper access points, as may occur in a distributed denial of service attack. Enforcing management instructions at the network switch 160B (or another traffic midpoint device 160) improves security by providing an additional security check on traffic within the administrative domain 180. Even if a managed server 130 is compromised and stops enforcing access control rules, a network switch 160B (or another traffic midpoint device 160) may block unauthorized communications with the compromised managed server 130. For example, even if web managed server 130B is compromised, enforcement at network interface 166 may nonetheless prevent unauthorized access to services by the web managed server 130B.

Implementing an End-to-End Security Policy

Figure 14:
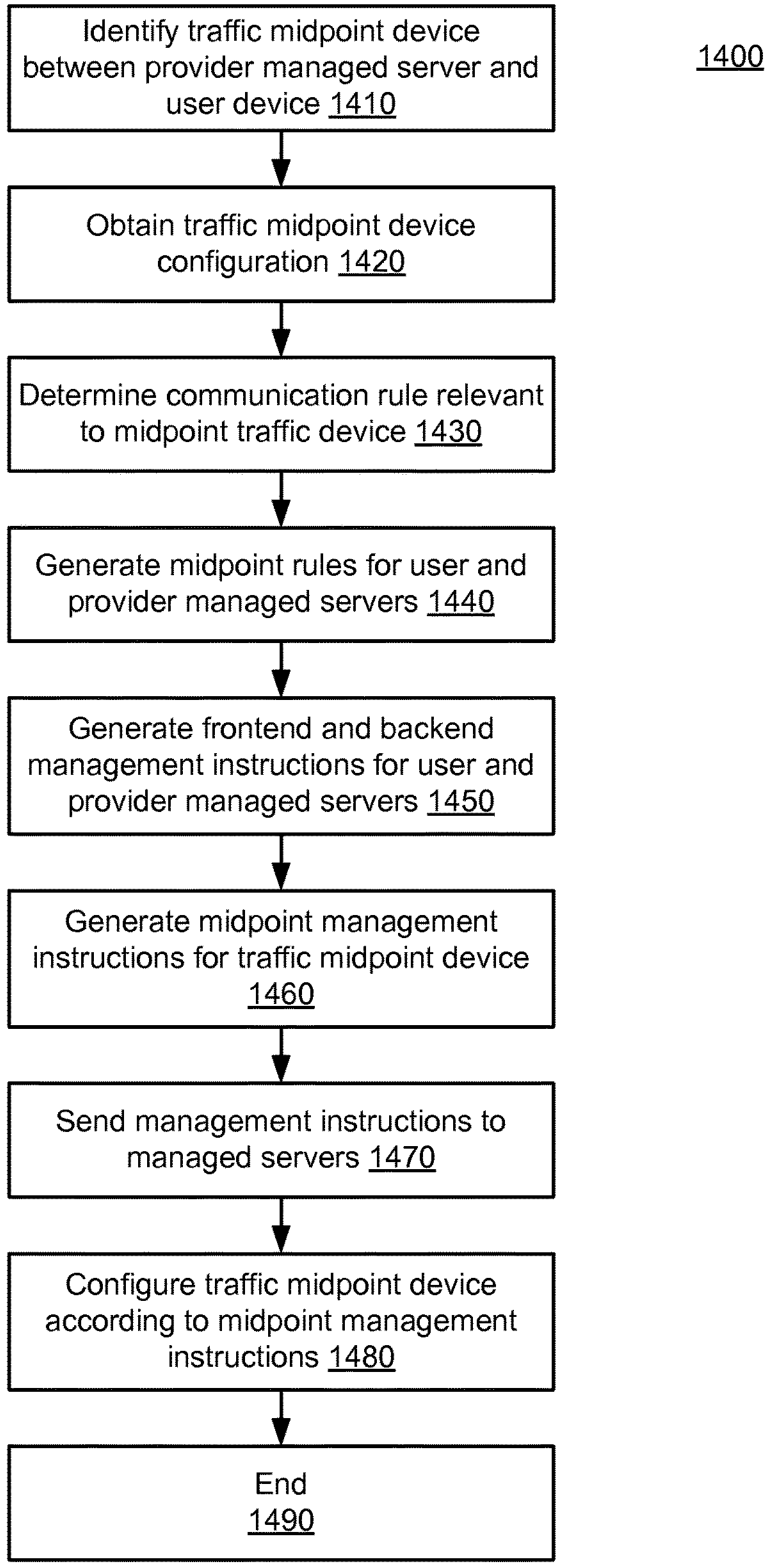
FIG. 14 is a flowchart illustrating a method of generating management instructions for managed servers in communication with a traffic midpoint device, according to one embodiment.

FIG. 14 is a flowchart illustrating a method 1400 of generating management instructions for managed servers 130 in communication with a traffic midpoint device 160, according to one embodiment.

At step 1410, the global manager 120 identifies a traffic midpoint device 160 through which a provider managed server 130 provides a service to a user device. For example, the user device is a user managed server 130, an unmanaged device 140, a labeled device 150, a traffic midpoint device, or a bound service.

At step 1420, the configuration discovery module 1110 obtains a configuration of the traffic midpoint device 160. For example, the configuration is an operational configuration indicating an effect of the traffic midpoint device 160 on an apparent source network address of communication between the user device and the provider managed server 130. As another example, the configuration is a security configuration identifying actors currently allowed to communicate with the traffic midpoint device 160.

At step 1430, the midpoint rule creation module 1125 determines a relevant rule from the set of communication rules 335 that specifies a service and that is applicable to communication between the provider managed server 130 and the user device.

At step 1440, the midpoint rule creation module 1125 generates, based on the relevant rule, a backend rule that specifies the service and that is relevant to communication between the provider managed server 130 and the traffic midpoint device 160. As another example, the user device is a user managed server 130, and the midpoint rule creation module 1125 generates, based on the relevant rule, a frontend rule that specifies the service and that is applicable to communication between the user managed server 130 and the traffic midpoint device 160.

At step 1450, the server management instruction module 1130 generates, based on the backend rule, a backend management instruction. The backend management instruction includes a backend function-level instruction including a reference to an actor-set authorized to communicate with the provider managed server 130 to use the service. The referenced actor-set includes the traffic midpoint device 160 and excludes the user device. The backend management instruction also includes a list of devices in the referenced actor-set. For example, the processing server 310 obtains a midpoint label set describing high-level characteristics of the traffic midpoint device 160 by specifying dimensions and the traffic midpoint device's value for each dimension. The actor enumeration module 370 generates the actor-set referenced by the backend function-level instruction by enumerating devices having label sets with values matching the traffic midpoint device's values for each dimension of the midpoint label set.

At step 1450, the server management instruction module 1130 may also generate, based on a frontend rule, a frontend management instruction, which includes a frontend function-level instruction including a reference to an actor-set authorized to communicate with the user managed server to provide the service. The actor-set includes the traffic midpoint device and excludes the provider managed server. The frontend management instruction may also include a list of devices in the referenced actor-set.

At step 1460, the midpoint management instruction module 1140 generates midpoint management instructions. One midpoint management instruction includes a function-level instruction specifying an actor-set including the provider managed server 130, and another midpoint management instruction includes a function-level instruction specifying an actor-set including the user device.

At step 1470, the global manager 120 sends the backend management instruction to configure the provider managed server 130 to enforce the backend rule on communication with the actor-set including the traffic midpoint device 160. The global manager 120 may also send the frontend management instruction to the user managed server 130 to the provider managed server 130 to configure the user managed server 130 to enforce the frontend rule on communication with the traffic midpoint device 160.

At step 1480, the midpoint device controller 1150 instructs the traffic midpoint device 160 to modify its security configuration based on the midpoint management instructions to allow the traffic midpoint device 160 to communicate with the provider managed server and user device.

At step 1490, the method 1400 ends.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of generating function-level instructions for a provider managed server of a plurality of managed servers according to a communication policy that comprises a set of one or more rules, the method comprising:

identifying a traffic midpoint device through which the provider managed server of the plurality of managed servers provides a service to a user device;

determining a relevant rule from the set of rules that specifies the service and that is applicable to communication between the provider managed server and the user device;

generating, based on the relevant rule, a backend rule that specifies the service and that is applicable to communication between the provider managed server and the traffic midpoint device;

generating, based on the backend rule, a backend function-level instruction including a reference to an actor-set authorized to communicate with the provider managed server to use the service, the actor-set including the traffic midpoint device; and sending the backend function-level instruction to the provider managed server to configure the provider managed server to enforce the backend rule on communication with the actor-set including the traffic midpoint device.

2. The method of claim 1, wherein determining the relevant rule from the set of rules comprises:

obtaining a user label set describing high-level characteristics of the user device, the user label set specifying dimensions and the user device's value for each dimension, wherein the relevant rule has a used-by portion applicable to the user label set.

3. The method of claim 1, wherein the relevant rule has a provided-by portion and a used-by portion, wherein generating the backend rule comprises:

obtaining a midpoint label set describing high-level characteristics of the traffic midpoint device, the midpoint label set specifying dimensions and the traffic midpoint device's value for each dimension; and generating the backend rule specifying the service, the provided-by portion of the relevant rule, and the used-by portion of the relevant rule specifying the midpoint label set.

4. The method of claim 3, wherein obtaining the midpoint label set comprises:

obtaining a provider label set describing high-level characteristics of the provider managed server, the provider label set specifying dimensions and the provider managed server's value for each dimension;

in response to identifying the traffic midpoint device, assigning the traffic midpoint device a label specifying a value for a role dimension equal to the provider managed server's value for the role dimension; and modifying the provider managed server's value for the role dimension to indicate that the provider managed server is a layer removed from the user device relative to the traffic midpoint device's value for the role dimension.

5. The method of claim 1, wherein sending the backend function-level instruction to the provider managed server comprises:

obtaining a midpoint label set describing high-level characteristics of the traffic midpoint device, the midpoint label set specifying dimensions and the traffic midpoint device's value for each dimension;

generating the actor-set referenced by the backend function-level instruction by enumerating devices having label sets with values matching the traffic midpoint device's values for each dimension of the midpoint label set; and sending the backend function-level instruction and a list of devices in the referenced actor-set to the provider managed server.

6. The method of claim 5, wherein sending the backend function-level instruction further comprises:

identifying a change in an additional label set assigned to an additional traffic midpoint device;

in response to identifying the change in the additional label set, determining that the additional label set matches the midpoint label set of the traffic midpoint device;

updating the actor-set referenced by the backend function-level instruction to include the additional traffic midpoint device; and sending an updated list of devices in the referenced actor-set to the provider managed server.

7. The method of claim 1, wherein the user device is a user managed server, and wherein sending the backend function-level instruction further comprises:

generating, based on the relevant rule, a frontend rule that specifies the service and that is applicable to communication between the user managed server and the traffic midpoint device;

generating, based on the frontend rule, a frontend function-level instruction including a reference to an actor-set authorized to communicate with the user managed server to provide the service, the actor-set including the traffic midpoint device; and sending the frontend function-level instruction to the user managed server to configure the user managed server to enforce the frontend rule on communication with the traffic midpoint device.

8. The method of claim 7, wherein generating the frontend function-level instruction comprises:

obtaining a configuration of the traffic midpoint device, the configuration indicating an effect of the traffic midpoint device on an apparent source network address of communication from the traffic midpoint device to the user managed server;

determining an expected network address of communication to the user managed server based on the configuration; and generating the frontend function-level instruction to specify the expected network address.

9. The method of claim 1, wherein sending the function-level instruction comprises:

obtaining a security configuration of the traffic midpoint device, the security configuration identifying actors allowed to communicate with the traffic midpoint device; and instructing the traffic midpoint device to modify the security configuration based on the backend rule to allow the traffic midpoint device to communicate with the provider managed server.

10. A non-transitory computer-readable storage medium storing instructions executable by one or more processors to perform steps for generating function-level instructions for a provider managed server included in a plurality of managed servers according to a security policy that comprises a set of one or more rules, the steps comprising:

identifying a traffic midpoint device through which the provider managed server of the plurality of managed servers provides a service to a user device;

determining a relevant rule from the set of rules that specifies the service and that is applicable to communication between the provider managed server and the user device;

generating, based on the relevant rule, a backend rule that specifies the service and that is applicable to communication between the provider managed server and the traffic midpoint device;

generating, based on the backend rule, a backend function-level instruction including a reference to an actor-set authorized to communicate with the provider managed server to use the service, the actor-set including the traffic midpoint device; and sending the backend function-level instruction to the provider managed server to configure the provider managed server to enforce the backend rule on communication with the actor-set including the traffic midpoint device.

11. The non-transitory computer-readable storage medium of claim 10, wherein determining the relevant rule from the set of rules comprises:

obtaining a user label set describing high-level characteristics of the user device, the user label set specifying dimensions and the user device's value for each dimension, wherein the relevant rule has a used-by portion applicable to the user label set.

12. The non-transitory computer-readable storage medium of claim 11, wherein the relevant rule has a provided-by portion and wherein generating the backend rule comprises:

obtaining a provider label set describing high-level characteristics of the provider managed server, the provider label set specifying dimensions and the provider managed server's value for each dimension;

obtaining a midpoint label set describing high-level characteristics of the traffic midpoint device, the midpoint label set specifying dimensions and the traffic midpoint device's value for each dimension; and generating the backend rule specifying the service, the provided-by portion of the relevant rule, and the used-by portion specifying the midpoint label set.

13. The non-transitory computer-readable storage medium of claim 10, wherein sending the backend function-level instruction to the provider managed server comprises:

obtaining a midpoint label set describing high-level characteristics of the traffic midpoint device, the midpoint label set specifying dimensions and the traffic midpoint device's value for each dimension;

generating the actor-set referenced by the backend function-level instruction by enumerating devices having label sets with values matching the traffic midpoint device's values for each dimension of the midpoint label set; and sending the backend function-level instruction and a list of devices in the referenced actor-set to the provider managed server.

14. The non-transitory computer-readable storage medium of claim 10, wherein the user device is a user managed server, and wherein sending the backend function-level instruction further comprises:

generating, based on the relevant rule, a frontend rule that specifies the service and that is applicable to communication between the user managed server and the traffic midpoint device;

generating, based on the frontend rule, a frontend function-level instruction including a reference to an actor-set authorized to communicate with the user managed server to provide the service, the actor-set including the traffic midpoint device; and sending the frontend function-level instruction to the user managed server to configure the user managed server to enforce the frontend rule on communication with the traffic midpoint device.

15. The non-transitory computer-readable storage medium of claim 10, wherein sending the function-level instruction comprises:

obtaining a security configuration of the traffic midpoint device, the security configuration identifying actors allowed to communicate with the traffic midpoint device; and instructing the traffic midpoint device to modify the security configuration based on the backend rule to allow the traffic midpoint device to communicate with the provider managed server.

16. A system for generating function-level instructions for a provider managed server included in a plurality of managed servers according to a security policy that comprises a set of one or more rules, the system comprising:

one or more processors; and a non-transitory, computer-readable storage medium storing computer program modules executable by the one or more processors to perform steps comprising:

identifying a traffic midpoint device through which the provider managed server of the plurality of managed servers provides a service to a user device;

determining a relevant rule from the set of rules that specifies the service and that is applicable to communication between the provider managed server and the user device;

generating, based on the relevant rule, a backend rule that specifies the service and that is applicable to communication between the provider managed server and the traffic midpoint device;

generating, based on the backend rule, a backend function-level instruction including a reference to an actor-set authorized to communicate with the provider managed server to use the service, the actor-set including the traffic midpoint device; and sending the backend function-level instruction to the provider managed server to configure the provider managed server to enforce the backend rule on communication with the actor-set including the traffic midpoint device.

17. The system of claim 16, wherein determining the relevant rule from the set of rules comprises:

obtaining a user label set describing high-level characteristics of the user device, the user label set specifying dimensions and the user device's value for each dimension, wherein the relevant rule has a used-by portion applicable to the user label set.

18. The system of claim 16, wherein sending the backend function-level instruction to the provider managed server comprises:

obtaining a midpoint label set describing high-level characteristics of the traffic midpoint device, the midpoint label set specifying dimensions and the traffic midpoint device's value for each dimension;

generating the actor-set referenced by the backend function-level instruction by enumerating devices having label sets with values matching the traffic midpoint device's values for each dimension of the midpoint label set; and sending the backend function-level instruction and a list of devices in the referenced actor-set to the provider managed server.

19. The system of claim 16, wherein the user device is a user managed server, and wherein sending the backend function-level instruction further comprises:

generating, based on the relevant rule, a frontend rule that specifies the service and that is applicable to communication between the user managed server and the traffic midpoint device;

generating, based on the frontend rule, a frontend function-level instruction including a reference to an actor-set authorized to communicate with the user managed server to provide the service, the actor-set including the traffic midpoint device; and sending the frontend function-level instruction to the user managed server to configure the user managed server to enforce the frontend rule on communication with the traffic midpoint device.

20. The system of claim 16, wherein sending the function-level instruction comprises:

obtaining a security configuration of the traffic midpoint device, the security configuration identifying actors allowed to communicate with the traffic midpoint device; and instructing the traffic midpoint device to modify the security configuration based on the backend rule to allow the traffic midpoint device to communicate with the provider managed server.

* * * * *